US010460615B2

(12) United States Patent
     Weems

(10) Patent No.: US 10,460,615 B2
(45) Date of Patent: Oct. 29, 2019

(54) SYSTEMS AND METHODS USING MATHEMATICAL REASONING BLOCKS

(71) Applicant: Rodney A. Weems, Pottersville, NJ (US)

(72) Inventor: Rodney A. Weems, Pottersville, NJ (US)

( * ) Notice: Subject to any disclaimer, the term of this patent is extended or adjusted under 35 U.S.C. 154(b) by 606 days.

(21) Appl. No.: 13/683,408

(22) Filed: Nov. 21, 2012

(65) Prior Publication Data
     US 2013/0266916 A1    Oct. 10, 2013

Related U.S. Application Data

(60) Provisional application No. 61/563,272, filed on Nov. 23, 2011.

(51) Int. Cl.
     *G09B 5/02*    (2006.01)
(52) U.S. Cl.
     CPC ..................... *G09B 5/02* (2013.01)
(58) Field of Classification Search
     CPC .......................................................... G09B 5/02
     USPC .......................................................... 434/188
     See application file for complete search history.

(56) References Cited

U.S. PATENT DOCUMENTS

| 4,895,518 A | 1/1990 | Arnold et al. |
| 2001/0041330 A1 | 11/2001 | Brown et al. |
| 2003/0088533 A1* | 5/2003 | Fortenberry ............ G06F 17/10 |
| | | 706/47 |
| 2004/0191746 A1 | 9/2004 | Maron et al. |
| 2004/0202987 A1 | 10/2004 | Scheuring et al. |
| 2005/0242503 A1* | 11/2005 | Lloyd ........................ A63F 1/04 |
| | | 273/292 |
| 2006/0099563 A1* | 5/2006 | Liu ........................... G09B 7/02 |
| | | 434/350 |
| 2007/0218433 A1 | 9/2007 | Vanova |
| 2008/0163124 A1 | 7/2008 | Bonev et al. |
| 2008/0254432 A1 | 10/2008 | Woolf et al. |
| 2008/0261191 A1 | 10/2008 | Woolf et al. |
| 2009/0018979 A1* | 1/2009 | Yu ........................ G09B 19/025 |
| | | 706/12 |
| 2009/0035733 A1 | 2/2009 | Meitar et al. |
| 2010/0005413 A1 | 1/2010 | Liang et al. |
| 2010/0070443 A1 | 3/2010 | Krebs |

(Continued)

OTHER PUBLICATIONS

List of Interactive Geometry Software by Wikipedia (Internet encyclopedia article) date of publication unknown.

(Continued)

*Primary Examiner* — Thomas J Hong
(74) *Attorney, Agent, or Firm* — Mendelsohn Dunleavy, P.C.; Steve Mendelsohn

(57) ABSTRACT

This invention supplies a method to make the abstract, step-by-step logic of math problems visible via the use of digitized mathematical reasoning blocks, which can be used to construct an interactive teaching program that allows a student to select problem sets from an index of problems, allows the student to view a brief instructional video pertaining to that skill if desired, allows the student to chose the mode of problem presentation (i.e., various learning or test modes), allows the student to work randomly generated problems from within the chosen mode and set by picking mathematical reasoning blocks that represent the various necessary/possible sub-steps in route to the solution of that problem.

29 Claims, 55 Drawing Sheets

(56) References Cited

U.S. PATENT DOCUMENTS

2010/0190142 A1     7/2010   Gal et al.
2010/0190143 A1     7/2010   Gal et al.
2011/0244434 A1*   10/2011   Livne et al. ................. 434/188
2012/0107779 A1*    5/2012   Halton et al. ................ 434/188

OTHER PUBLICATIONS

Adaptive Learning by Wikipedia (Internet encyclopedia article) date of publication unknown.
www.wiki.scratch.mit.edu/wiki/Scratch_Wiki_HomeScratch Wiki—Information about the Scratch programming language and its website history created on Dec. 6, 2008 (internet website).
www.Scratch.mit.edu—Create stories, games, and animations (internet website) date of publication unknown.
www.Alice.org—An educational software that teaches students computer programming in a 3D environment (internet website) date of publication unknown.
Carolyn Kienan, "Learning and Teaching Algebra at the Middle School through College Levels", pp. 707 to 762 in Learning and Teaching Alegbra, published 2007.
Fey and Good, Rethinking the Sequences and Priorities of High School Mathematics Curriculum, pp. 43-52 in the Secondary School Mathematics Curriculum, published 1985.
Pimm, "Symbolls and Meanings in School Mathematics", published 1995.
Web Page entitled "Using the TI-83/TI-84: 7.2 Equation Solver" pointing to a youtube video, downloaded from www.youtube.com/watch?v=9ZS8F6ole38.
Weems, Teaching Math as a Language, Dog Ear Publishing, 2007.

\* cited by examiner

FIG. 1A  Web-Based System
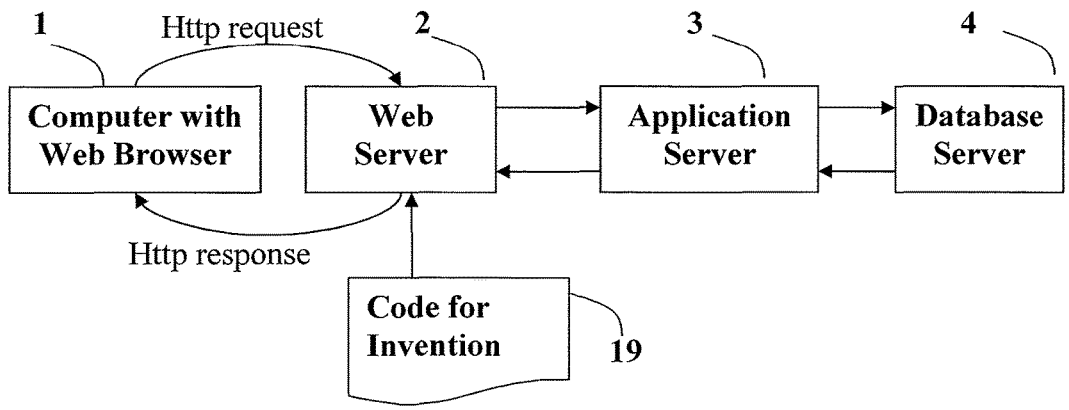
FIG. 1b  Computer-Based System
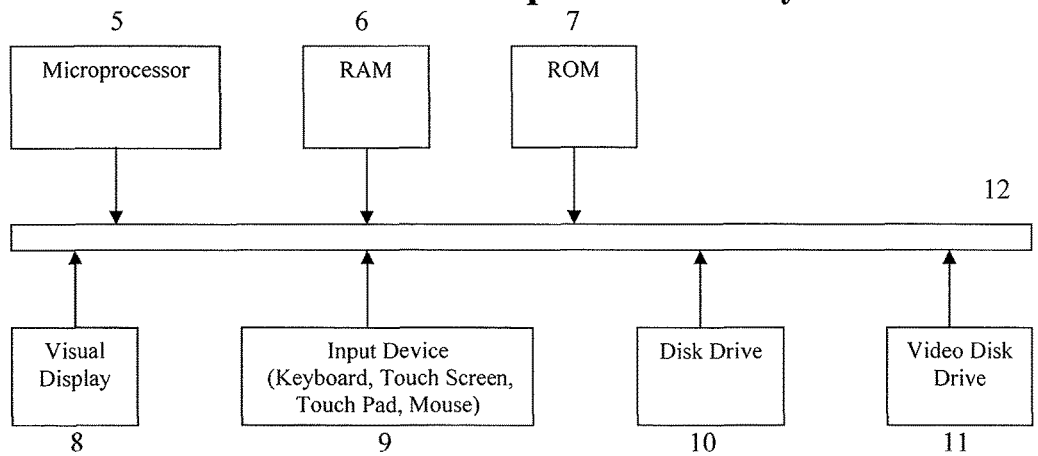
FIG. 1c  Local Area Network Based System
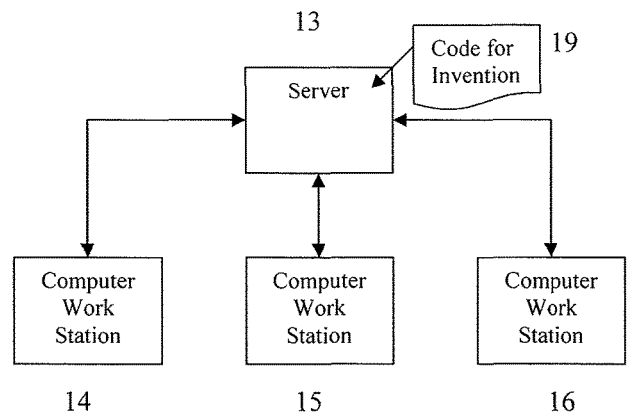

FIG. 6a reasoningArray[formula, substitution, substitution, substitution, check]

FIG. 6b

Amount of simplification → level one: { }, Level two: < > Level three: @ @

1a)     f1•c2^2+ a1               example $2 \bullet 4^2 + 3$

Error Correction Arrays problemArray[0]= ["f1•c2$^2$+ a1"];
exponentErrorArray[0][0]= ["f1•{c2$^2$} + a1","Correct"];
exponentErrorArray[0][1]= ["{f1•c2}$^2$ + a1","Multiplication cannot be done in the exponent step."];
exponentErrorArray[0][2]= ["f1•{c2•2} + a1","You multiplied by two instead of taking the power"]
exponentErrorArray[0][3]= ["{{f1•{c2$^2$}} + a1}","Please show all of your steps"]
exponentErrorArray[0][4]= ["else", You may have made a math error]
mdErrorArray[0][1] = ["<f1•{c2$^2$}> + a1","correct"];
mdErrorArray[0][2] = ["f1•<{c2$^2$} + a1>","Addition cannot be done in the multiplication step"];
mdErrorArray[0][3]= ["<<f1•{c2$^2$}> + a1>","Please show all of your steps"]
mdErrorArray[0][4] = ["else","you may have made a math error"];
asErrorArray[0][0] =["@<f1•{c2$^2$}> + a1@","correct"];
asErrorArray[0][1] = ["else","You may have made a math error"];

FIG. 8

| Error Category and Type | Initial Score | Current Score | 70% | 80% | 80% + Perfect |
|---|---|---|---|---|---|
| Exponent errors | | | | | |
| • Failed to do all Exponents | | | | | |
| • Multiplying instead of Raising Exponents | | | | | |
| • Multiplication/Division Performed Early | | | | | |
| • Addition/Subtraction Performed Early | | | | | |
| • Failed to Show all Steps | | | | | |
| • Incorrectly raised Exponent or Typo. | | | | | |
| Multiplication/Division | | | | | |
| • Failed to do all Multiplication/Division | | | | | |
| • Multiplication/Division not from Left to Right. | | | | | |
| • Addition/Subtraction Performed Early | | | | | |
| • Failed to show all Steps | | | | | |
| • Incorrect Multiplication/Division or Typo | | | | | |
| Addition/Subtraction | | | | | |
| • Failed to do all Addition/Subtraction | | | | | |
| • Incorrect Addition/Subtraction or Typo | | | | | |

| Correct Answers | ☐☐☐☐☐☐☐☐ | |
|---|---|---|
| | | Results |

| Tutorials | Statistics |
|---|---|

| Number |
|---|
| Picture |
| Word |

Tommy finds five marbles on Monday. On Tuesday he loses two marbles. Write an expression that describes these events

FIG 9A

| Correct Answers | ☐☐☐☐☐☐☐☐ | Help |
|---|---|---|
| | | Results |

| Tutorials | Statistics |
|---|---|

| Number |
|---|
| Picture |
| Word |

| ADD |
|---|

| CHECK |
|---|

Tommy finds five marbles on Monday. On Tuesday he loses two marbles. Write an expression that describes these events

FIG 9B

| Correct Answers □□□□□□□□ | Help |
| | Results |

Tutorials | Statistics

- Number
- Picture
- Word

ADD | [           ]

ADD

CHECK

Tommy finds five marbles on Monday. On Tuesday he loses two marbles. Write an expression that describes these events

FIG 9C

| Correct Answers □□□□□□□□ | Help |
| | Results |

Tutorials | Statistics

- Number
- Picture
- Word

ADD | 5 + -2

ADD

CHECK

Tommy finds five marbles on Monday. On Tuesday he loses two marbles. Write an expression that describes these events

FIG 9D

| Correct Answers | ☐☐☐☐☐☐☐☐ | Help |
| | | Results |

| Tutorials | Statistics |

Number
Picture
Word

ADD

CHECK

| ADD | 5 + -2 |
| CHECK | CORRECT |

Next Problem: 2

Tommy finds five marbles on Monday. On Tuesday he loses two marbles. Write an expression that describes these events

FIG 9E

| Correct Answers | ☐☐☐☐☐☐☐☐ | | |
|---|---|---|---|
| | | | Results |

| Tutorials | Statistics |
|---|---|

| Number |
|---|
| Picture |
| Word |

Tommy finds five marbles on Monday. On Tuesday he loses two marbles. Write an expression that describes these events

FIG 10A

| Correct Answers | ☐☐☐☐☐☐☐☐ | Help |
|---|---|---|
| | | Results |

| Tutorials | Statistics |
|---|---|

| Number |
|---|
| Picture |
| Word |

| Subtract |
|---|

| Check |
|---|

Tommy finds five marbles on Monday. On Tuesday he loses two marbles. Write an expression that describes these events

FIG 10B

| Correct Answers ☐☐☐☐☐☐☐☐ | Help |
|---|---|
| | Results |

| Tutorials | Statistics |

| Number |
| Picture |
| Word |

| Subtract | | |

| Subtract |
| Check |

Tommy finds five marbles on Monday. On Tuesday he loses two marbles. Write an expression that describes these events

FIG 10C

| Correct Answers ☐☐☐☐☐☐☐☐ | Help |
|---|---|
| | Results |

| Tutorials | Statistics |

| Number |
| Picture |
| Word |

| Subtract | 5 + -2 |

| Subtract |
| Check |

Tommy finds five marbles on Monday. On Tuesday he loses two marbles. Write an expression that describes these events

FIG 10D

| Correct Answers ☐☐☐☐☐☐☐☐ | Help |
| | Results |

Tutorials | Statistics

- Number
- Picture
- Word

Subtract | 5 + -2

ADD
CHECK

CHECK

You can only use subtraction in this step.

| Correct Answers ☐☐☐☐☐☐☐☐ | Help |
| | Results |

Tutorials | Statistics

- Number
- Picture
- Word

Subtract | 5 + -2

CHECK | Way To Keep Working!

Next Problem: 2

ADD
CHECK

Tommy finds five marbles on Monday. On Tuesday he loses two marbles. Write an expression that describes these events

| Correct Answers | ☐☐☐☐☐☐☐☐ | Directions |
| | | Results |

Games | Tutorials | Stats

Picture
△
Number | Word

Formula
Substitute
Simplify
Solve
Check

| Formula | 5 + 2*1 |
| Exponent | E |
| Mult/Div | 7*1 |

Which comes first, Addition, Subtraction, or Multiplication and Division?

FIG 11H

| Correct Answers | ☐☐☐☐☐☐☐ | Directions |
| | | Results |

Games | Tutorials | Stats

Picture
△
Number | Word

Formula
Substitute
Simplify
Solve
Check

| Formula | 5 + 2*1 |
| Exponent | E |
| Mult/Div | 5+2 |

Which comes first, Addition, Subtraction, or Multiplication and Division?

Correct Answers ☐☐☐☐☐☐☐☐  Results

| Tutorials | Stats |

- Number
- Picture
- Word

Four times a number less three is a second number. If the first number is six, what is the second number?

Correct Answers ☐☐☐☐☐☐☐☐  Help / Results

| Tutorials | Stats |

- Number
- Picture
- Word

- Direct Trans
- Given Form.
- Standard
- Single Change
- Mult Change

Four times a number less three is a second number. If the first number is six, what is the second number?

FIG 13B

Correct Answers ☐☐☐☐☐☐☐☐ | Help | Results

| Tutorials | Stats |

- Number
- Picture
- Word

- Direct Trans
- Given Form.
- Standard
- Single Change
- Mult Change

Direct Trans | |

Four times a number less three is a second number. If the first number is six, what is the second number?

Correct Answers ☐☐☐☐☐☐☐☐ | Help | Results

| Tutorials | Stats |

- Number
- Picture
- Word

- Direct Trans
- Given Form.
- Standard
- Single Change
- Mult Change

Direct Trans | Four times a number less three is a second number.

Four times a number less three is a second number. If the first number is six, what is the second number?

FIG 13D

| Correct Answers | ☐☐☐☐☐☐☐☐ | Directions |
|---|---|---|
| | | Results |

| Tutorials | Stats |
|---|---|

| Number | Direct Trans | Four times a number less three is a second number. |
|---|---|---|
| Picture | | |
| Word | Direct Trans | |

| Direct Trans |
|---|
| Given Form. |
| Standard |
| Single Change |
| Mult Change |

Four times a number less three is a second number. If the first number is six, what is the second number?

FIG 13E

| Correct Answers | ☐☐☐☐☐☐☐☐ | Directions |
|---|---|---|
| | | Results |

| Tutorials | Stats |
|---|---|

| Number | Direct Trans | Four times a number less three is a second number. |
|---|---|---|
| Picture | | |
| Word | Direct Trans | The first number is six |

| Direct Trans |
|---|
| Given Form. |
| Standard |
| Single Change |
| Mult Change |

Four times a number less three is a second number. If the first number is six, what is the second number?

FIG 13F

| Correct Answers | ☐☐☐☐☐☐☐☐ | Directions |
|---|---|---|
| | | Results |

| Tutorials | Stats |
|---|---|

| Number | | |
|---|---|---|
| Picture | Direct Trans | Four times a number less three is a second number. |
| Word | | |
| Formula | Direct Trans | The first number is six |
| Substitute | | |
| Simplify | Formula | |
| Solve | | |
| Check | | |

Four times a number less three is a second number. If the first number is six, what is the second number?

FIG 13G

| Correct Answers | ☐☐☐☐☐☐☐☐ | Directions |
|---|---|---|
| | | Results |

| Tutorials | Stats |
|---|---|

| Number | | |
|---|---|---|
| Picture | Direct Trans | Four times a number less three is a second number. |
| Word | | |
| Formula | Direct Trans | The first number is six |
| Substitute | | |
| Simplify | Formula | 4n-3=s | n=6 |
| Solve | | |
| Check | | |

Four times a number less three is a second number. If the first number is six, what is the second number?

| Correct Answers | ☐☐☐☐☐☐☐☐ | Directions / Results |

Tutorials | Stats

- Number
- Picture
- Word
- Formula
- Substitute
- Simplify
- Solve
- Check

| Direct Trans | Four times a number less three is a second number. |
| Direct Trans | The first number is six |
| Formula | 4n-3=s | n=6 |
| Substitute | | |

Four times a number less three is a second number. If the first number is six, what is the second number?

FIG 13J

| Correct Answers | ☐☐☐☐☐☐☐ | Directions / Results |

Tutorials | Stats

- Number
- Picture
- Word
- Formula
- Substitute
- Simplify
- Solve
- Check

| Direct Trans | Four times a number less three is a second number. |
| Direct Trans | The first number is six |
| Formula | 4n-3=s | n=6 |
| Substitute | 4*6-3=s |

Four times a number less three is a second number. If the first number is six, what is the second number?

| Correct Answers | ☐☐☐☐☐☐☐☐ | Directions |
| | | Results |

Games | Tutorials | Stats

- Picture
- Number | Word
- X-Axis
- Y-Axis
- Cartesian
- Point
- Chart
- Other (1)  (-5) (6)  (8)
-5 -4 -3 -2 -1 0 1 2 3 4 5 6 7 8

| X Axis | Skip count the graph in intervals of 1 |
| Point | Move the points onto the graph |

Graph the following points on the horizontal axis: -5, 1, 6, 8

FIG 14J

| Correct Answers | ☐☐☐☐☐☐☐☐ | Directions |
| | | Results |

Games | Tutorials | Stats

- Picture
- Number | Word
- Formula
- Substitute
- Simplify
- Solve
- Check (1)  (-5) (6)  (8)
-5 -4 -3 -2 -1 0 1 2 3 4 5 6 7 8

| X Axis | Skip count the graph in intervals of 1 |
| Point | Move the points onto the graph |

The points in red are wrong. Please drag them to their proper positions.

Graph the following points on the horizontal axis: -5, 1, 6, 8

FIG 14K

Correct Answers ☐☐☐☐☐☐☐☐ | Directions | Results

Games | Tutorials | Stats

Picture | Number | Word | Formula | Substitute | Simplify | Solve | Check

Number line showing points (1), (-5), (6), (8) above; scale -5 -4 -3 -2 -1 0

CHECK THE SIGN OF THE NUMBER FOR THIS POINT

X Axis — Skip count intervals of 1
Point — Move the points onto the graph

The points in red are wrong. Please drag them to their proper positions.

Graph the following points on the horizontal axis: -5, 1, 6, 8

Correct Answers ☐☐☐☐☐☐☐☐ | Directions | Results

Games | Tutorials | Stats

Picture | Number | Word | Formula | Substitute | Simplify | Solve | Check

Number line showing points (-5), (1), (6), (8); scale -5 -4 -3 -2 -1 0 1 2 3 4 5 6 7 8

X Axis — Skip count the graph in intervals of 1
Point — Move the points onto the graph The points in red are wrong. Please drag them to their proper positions.

Graph the following points on the horizontal axis: -5, 1, 6, 8

| Correct Answers | ☐☐☐☐☐☐☐☐☐ | Help |
| | | Results |

Tutorials | Stats

- Number
- Picture
- Word

Formula | [        ]

FIG 15B

| Correct Answers | ☐☐☐☐☐☐☐☐ | Help |
| | | Results |

Tutorials | Stats

- Number (highlighted)
- Picture
- Word

- Formula
- Substitute
- Simplify
- Solve
- Check

Formula | 3x+5=11

| Correct Answers | ☐☐☐☐☐☐☐☐ | Help |
|---|---|---|
| | | Results |

| Tutorials | Stats |
|---|---|

- Number
- Picture
- Word

- Inv. Exp/root
- Inv. Mult/Div
- Inv. Add/Subt
- Simplify
- Factor
- Quadratic Eq.

| Formula | 3x+5=11 |
|---|---|

FIG 15C

| Correct Answers | ☐☐☐☐☐☐☐☐ | Help |
|---|---|---|
| | | Results |

| Tutorials | Stats |
|---|---|

- Number
- Picture
- Word

- Inv. Exp/root
- Inv. Mult/Div
- Inv. Add/Subt
- Simplify
- Factor
- Quadratic Eq.

| Formula | 3x+5=11 |
|---|---|

You must always include the sign of each number selected.

FIG 15D

| Correct Answers □□□□□□□□ | Help |
|---|---|
| | Results |

| Tutorials | Stats |
|---|---|

| Number |
|---|
| Picture |
| Word |

| Inv. Exp/root |
|---|
| Inv. Mult/Div |
| Inv. Add/Subt |
| Simplify |
| Factor |
| Quadratic Eq. |

| Formula | $3x+5=11$ |
|---|---|

You must always include the sign of each number selected.

FIG 15E

| Correct Answers □□□□□□□□ | Help |
|---|---|
| | Results |

| Tutorials | Stats |
|---|---|

| Number |
|---|
| Picture |
| Word |

| Inv. Exp/root |
|---|
| Inv. Mult/Div |
| Inv. Add/Subt |
| Simplify |
| Factor |
| Quadratic Eq. |

| Formula | $3x+5=11$ |
|---|---|
| Inv. Add/Subt | $3x+5\ \ =11$ |

FIG 15F

| Correct Answers | ☐☐☐☐☐☐☐☐ | Help |
|---|---|---|
| | | Results |

| Tutorials | Stats |
|---|---|

| Number |
|---|
| Picture |
| Word |

| Formula | 3x+5=11 |
|---|---|
| Inv. Add/Subt | 3x+5 -5 =11 -11 |

| Inv. Exp/root |
|---|
| Inv. Mult/Div |
| Inv. Add/Subt |
| Simplify |
| Factor |
| Quadratic Eq. |

FIG 15G

| Correct Answers | ☐☐☐☐☐☐☐☐ | Help |
|---|---|---|
| | | Results |

| Tutorials | Stats |
|---|---|

| Number |
|---|
| Picture |
| Word |

| Formula | 3x+5=11 |
|---|---|
| Inv. Add/Subt | 3x+5 -5 =11 -11 |

You must add or subtract the same thing to both sides

| Inv. Exp/root |
|---|
| Inv. Mult/Div |
| Inv. Add/Subt |
| Simplify |
| Factor |
| Quadratic Eq. |

FIG 15H

| Correct Answers | ☐☐☐☐☐☐☐☐ | Help |
| | | Results |

| Tutorials | Stats |

| Number | Formula | 3x+5=11 |
| Picture | | |
| Word | Inv. Add/Subt | 3x+5 -5 =11 - 5 |
| Inv. Exp/root | Simplify | |
| Inv. Mult/Div | | |
| Inv. Add/Subt | | |
| Simplify | | |
| Factor | | |
| Quadratic Eq. | | |

FIG 15I

| Correct Answers | ☐☐☐☐☐☐☐☐ | Help |
| | | Results |

| Tutorials | Stats |

| Number | Formula | 3x+5=11 |
| Picture | | |
| Word | Inv. Add/Subt | 3x+5 -5 =11 - 5 |
| Inv. Exp/root | Simplify | 3x    = 6 |
| Inv. Mult/Div | | |
| Inv. Add/Subt | | |
| Simplify | | |
| Factor | | |
| Quadratic Eq. | | |

| Correct Answers | ☐☐☐☐☐☐☐☐ | Help |
| | | Results |

Tutorials | Stats

- Number
- Picture
- Word
- Inv. Exp/root
- Inv. Mult/Div
- Inv. Add/Subt
- Simplify
- Factor
- Quadratic Eq.

| Formula | 3x+5=11 |
| Inv. Add/Subt | 3x+5 -5 =11 - 5 |
| Simplify | 3x       = 6 |

FIG 15L

| Correct Answers | ☐☐☐☐☐☐☐☐ | Help |
| | | Results |

Tutorials | Stats

- Number
- Picture
- Inv. Exp/root
- Inv. Mult/Div
- Inv. Add/Subt
- Simplify
- Factor
- Quadratic Eq.

| Formula | 3x+5=11 |
| Inv. Add/Subt | 3x+5 -5 =11 - 5 |
| Simplify | 3x       = 6 |
| Inv. Mult/Div | (3)x     = ( 6) |

Word

| Correct Answers | ☐☐☐☐☐☐☐☐ | Help |
| | | Results |

| Tutorials | Stats |

| Number | | Formula | 3x+5=11 |
| Picture | | | |
| Word | | Inv. Add/Subt | 3x+5 -5 =11 - 5 |
| Inv. Exp/root | | Simplify | 3x     = 6 |
| Inv. Mult/Div | | | |
| Inv. Add/Subt | | Inv. Mult/Div | 1/3 (3)x = 1/3 ( 6) |
| Simplify | | | |
| Factor | | | |
| Quadratic Eq. | | | |

FIG 15M

| Correct Answers | ☐☐☐☐☐☐☐ | Help |
| | | Results |

| Tutorials | Stats |

| Number | | Formula | 3x+5=11 |
| Picture | | | |
| Word | | Inv. Add/Subt | 3x+5 -5 =11 - 5 |
| Inv. Exp/root | | Simplify | 3x     = 6 |
| Inv. Mult/Div | | | |
| Inv. Add/Subt | | Inv. Mult/Div | 1/3 (3)x = 1/3 ( 6) |
| Simplify | | Simplify | |
| Factor | | | |
| Quadratic Eq. | | | |

FIG 15N

| Correct Answers ☐☐☐☐☐☐☐☐ | Help |
| | Results |

| Tutorials | Stats |

| Number | Formula | 3x+5=11 | 1x can be simplified further |
| Picture | Inv. Add/Subt | 3x+5 -5 =11 - 5 | |
| Word | | | |

| Inv. Exp/root | Simplify | 3x = 6 |
| Inv. Mult/Div | Inv. Mult/Div | 1/3 (3)x = 1/3 ( 6) |
| Inv. Add/Subt | | |
| Simplify | Simplify | 1x = 2/3 |
| Factor | | |
| Quadratic Eq. | | |

FIG 15O

| Correct Answers ☐☐☐☐☐☐☐☐ | Help |
| | Results |

| Tutorials | Stats |

| Number | Formula | 3x+5=11 | 1x can be simplified further |
| Picture | Inv. Add/Subt | 3x+5 -5 =11 - 5 | |
| Word | | | |

| Inv. Exp/root | Simplify | 3x = 6 |
| Inv. Mult/Div | Inv. Mult/Div | 1/3 (3)x = 1/3 ( 6) |
| Inv. Add/Subt | | |
| Simplify | Simplify | 1x = 2/3 |
| Factor | | |
| Quadratic Eq. | | |

FIG 15P

| Correct Answers | ☐☐☐☐☐☐☐☐ | | Help |
|---|---|---|---|
| | | | Results |

| Tutorials | Stats |
|---|---|

| Number |
|---|
| Picture |
| Word |

| Inv. Exp/root |
|---|
| Inv. Mult/Div |
| Inv. Add/Subt |
| Simplify |
| Factor |
| Quadratic Eq. |

| Formula | $3x+5=11$ |
|---|---|
| Inv. Add/Subt | $3x+5 -5 = 11 - 5$ |
| Simplify | $3x = 6$ |
| Inv. Mult/Div | $1/3\,(3)x = 1/3\,(6)$ |
| Simplify | $x = 2/3$ |
| Check | Correct! |

1x can be simplified further

FIG 15Q

Next Problem: 2

| Correct Answers ☐☐☐☐☐☐☐☐ | Help |
| | Results |

| Tutorials | Stats |

| Number |
| Picture |
| Word |

Graph the equation y=2x+1 using three points

| Correct Answers ☐☐☐☐☐☐☐☐ | Help |
| | Results |

| Tutorials | Stats |

| Number |
| Picture |
| Word |

| Direct Trans |
| Given Form. |
| Standard |
| Single Change |
| Mult Change |

Graph the equation y=2x+1 using three points

FIG 16B

| Correct Answers | ☐☐☐☐☐☐☐☐ | Help |
| | | Results |

| Tutorials | Stats |

| Number |
| Picture |
| Word |

| Direct Trans |
| Given Form. |
| Standard |
| Single Change |
| Mult Change |

| Given Form. | |

Graph the equation y=2x+1 using three points

FIG 16C

| Correct Answers | ☐☐☐☐☐☐☐☐ | Help |
| | | Results |

| Tutorials | Stats |

| Number |
| Picture |
| Word |

| Direct Trans |
| Given Form. |
| Standard |
| Single Change |
| Mult Change |

| Given Form. | line |

Graph the equation y=2x+1 using three points

FIG 16D

| Correct Answers | ☐☐☐☐☐☐☐☐ | Help |
| | | Results |

| Tutorials | Stats |

| Number |
| Picture |
| Word |

| Given Form. | line |
| Formula | |

| Formula |
| Substitution |
| Simplify |
| Solve |
| Check |
| Repeat |

Graph the equation y=2x+1 using three points

FIG 16E

| Correct Answers | ☐☐☐☐☐☐☐☐ | Help |
| | | Results |

| Tutorials | Stats |

| Number |
| Picture |
| Word |

| Given Form. | line |
| Formula | y=2x+1 |

| Formula |
| Substitution |
| Simplify |
| Solve |
| Check |
| Repeat |

Graph the equation y=2x+1 using three points

FIG 16F

| Correct Answers ☐☐☐☐☐☐☐☐ | Help |
| | Results |

| Tutorials | Stats |

| Number | | Given Form. | | line | | Graph the |
| Picture | | | | | | equation |
| Word | | Formula | | y=2x+1 | x=1 | y=2x+1 |
| Formula | | | | | | using three |
| Substitution | | | | | | points |
| Simplify | | | | | | |
| Solve | | | | | | |
| Check | | | | | | FIG 16G |
| Repeat | | | | | | |

| Correct Answers ☐☐☐☐☐☐☐☐ | Help |
| | Results |

| Tutorials | Stats |

| Number | | Given Form. | | line | | Graph the |
| Picture | | | | | | equation |
| Word | | Formula | | y=2x+1 | x=1 | y=2x+1 |
| Formula | | Subsitution | | | | using three |
| Substitution | | | | | | points |
| Simplify | | | | | | |
| Solve | | | | | | FIG 16H |
| Check | | | | | | |
| Repeat | | | | | | |

| Correct Answers | ☐☐☐☐☐☐☐☐ | Help |
|---|---|---|
| | | Results |

| Tutorials | Stats |
|---|---|

| Number | Given Form. | line | Graph the equation y=2x+1 using three points |
|---|---|---|---|
| Picture | | | |
| Word | Formula | y=2x+1   x=1 | |
| Formula | Substitution | y=2*1 +1 | |
| Substitution | | | |
| Simplify | | | |
| Solve | | | FIG 16I |
| Check | | | |
| Repeat | | | |

| Correct Answers | ☐☐☐☐☐☐☐☐ | Help |
|---|---|---|
| | | Results |

| Tutorials | Stats |
|---|---|

| Number | Given Form. | line | Graph the equation y=2x+1 using three points |
|---|---|---|---|
| Picture | | | |
| Word | Formula | y=2x+1   x=1 | |
| Formula | Substitution | y=2*1 +1 | |
| Substitution | Exponents | E | |
| Simplify | Mult/Div | y=2 +1 | |
| Solve | Add/Subt | y=3 | FIG 16J |
| Check | | | |
| Repeat | | | |

| Correct Answers □□□□□□□□ | Help |
|---|---|
| | Results |

Tutorials | Stats

| | Given Form. | line | Graph the equation y=2x+1 using three points |
|---|---|---|---|
| Number | Formula | y=2x+1  x=1 | |
| Picture | Subsitution | y=2*1 +1 | |
| Word | Exponents | E | |
| Formula | Mult/Div | y=2 +1 | |
| Substitution | Add/Subt | y=3 | FIG 16K |
| Simplify | | | |
| Solve | | | |
| Check | | | |
| Repeat | | | |

| Correct Answers □□□□□□□□ | Help |
|---|---|
| | Results |

Tutorials | Stats

| | Given Form. | line | Graph the equation y=2x+1 using three points |
|---|---|---|---|
| Number | Formula | y=2x+1  x=1 | |
| Picture | Subsitution | y=2*1 +1 | |
| Word | Exponents | E | |
| Formula | Mult/Div | y=2 +1 | |
| Substitution | Add/Subt | y=3 | FIG 16L |
| Simplify | Chart | x \| y | |
| Solve | | | |
| Check | | | |
| Repeat | | | |

| Correct Answers | ☐☐☐☐☐☐☐☐☐ | Help |
|---|---|---|
| | | Results |

| Tutorials | Stats |
|---|---|

| Number | Given Form. | line | Graph the equation y=2x+1 using three points |
|---|---|---|---|
| Picture | Formula | y=2x+1  x=1 | |
| Word | Subsitution | y=2*1 +1 | |
| X-axis | Exponents | E | |
| Y-Axis | Mult/Div | y=2 +1 | |
| Cartesion | Add/Subt | y=3 | FIG 16M |
| Chart | Chart | x  y | |
| Point | | 1  3 | |
| Other | | | |

| Correct Answers | ☐☐☐☐☐☐☐☐ | Help |
|---|---|---|
| | | Results |

| Tutorials | Stats |
|---|---|

| Number | Given Form. | line | Graph the equation y=2x+1 using three points |
|---|---|---|---|
| Picture | Formula | y=2x+1  x=1 | |
| Word | Subsitution | y=2*1 +1 | |
| Formula | Exponents | E | |
| Substitution | Mult/Div | y=2 +1 | |
| Simplify | Add/Subt | y=3 | FIG 16N |
| Solve | Chart | x  y | |
| Check | | 1  3 | |
| Repeat | | | |

FIG 16S

Correct Answers [ ][ ][ ][ ][ ][ ][ ][ ]   Help   Results

Tutorials | Stats

- Number
- Picture
- Word
- X-axis
- Y-Axis
- Cartesion
- Chart
- Point
- Other Cartesion | Point Graph showing points (3,7), (2,5), (1,3) on Cartesian plane with x-axis from -4 to 8 and y-axis from 1 to 7.

Graph the equation y=2x+1 using three points

FIG 16T

Correct Answers [ ][ ][ ][ ][ ][ ][ ][ ]   Help   Results

Tutorials | Stats

- Number
- Picture
- Word
- Formula
- Substitution
- Simplify
- Solve
- Check
- Repeat Cartesion | Point | Check Correct Graph showing line through points (3,7), (2,5), (1,3) on Cartesian plane with x-axis from -4 to 8 and y-axis from 1 to 7.

Graph the equation y=2x+1 using three points

SYSTEMS AND METHODS USING MATHEMATICAL REASONING BLOCKS

STATEMENT OF RELATED CASES

This application claims priority to and the benefit of U.S. Provisional Patent Application No. 61/563,272, filed on Nov. 23, 2012, which is incorporated herein by reference in its entirety.

BACKGROUND

Field

The present disclosure relates generally to automated systems and methods for student instruction and teacher training and, more specifically but not exclusively, to systems and methods using mathematical reasoning blocks.

Description of the Related Art

This section introduces aspects that may help facilitate a better understanding of the embodiments disclosed herein. Accordingly, the statements of this section are to be read in this light and are not to be understood as admissions about what is in the prior art or what is not in the prior art.

American elementary school math students score among the top children from industrialized countries on tests designed to measure mathematical knowledge. Yet, by the end of high school, they find themselves among the lowest performers on such standardized tests. The American educational system needs a remedy for this situation so that at-risk students can find success in pre-algebra and algebra courses—the gateway subjects to college and the foundation of the technical expertise needed to solve many of the world's most pressing problems.

An inability to balance intuitive, whole-language approaches to teaching mathematics with more-traditional, analytic approaches is, in many ways, at the root of the entire problem. Whether because of student laziness, poor teacher pedagogy, technological limitations or the failure of imagination, mathematics often ends up being taught and grasped in large, memorized chunks. The problem becomes that students who memorize math problem solutions like phrases in a phrase book often find themselves lacking a sense of the individual parts making up the solutions as wholes. They fail to acquire knowledge of how to rearrange these smaller constituent parts to express new ideas or solve new problems.

Most computerized instruction now takes place in one of several modes, each characterized by some form of this imbalance.

In one mode, instruction is highly traditional. It occurs at the surface of the subject, resulting in multiple-choice environments that are overly mechanical and prone to intuitive guess-work on the part of students—a complete overemphasis on intuitive wholes.

In another traditional mode, programs have been designed that try to ensure an understanding of the steps involved in solving a math problem. But current attempts at success with this mode have resulted in rigid, unalterable templates that eliminate flexibility in the solution of problems.

Graphing calculators or geometric-sketchpad type environments—with their holistic, global linking of functional table-graph-algebraic representations—provide the most ubiquitous and modern example of the imbalance that results from this overemphasis on systems of wholes. Students may manipulate whole representations—entire graphs or tables or equations. But it is the device or program that automates the computations in and among representations, taking much of the actual analytic work out of users' hands so they can focus on the meaning behind a given real life problem or situation.

This functional table-figure/graph-algebraic approach to teaching mathematics is supported by a body of academic work that spans the mid-1980s to the present. According to Kieran (2007, p. 709), Fey and Good (1985) formulated the stance that dominates mathematics pedagogy in the U.S. today. Their idea was: "that practicing manipulative skills should be replaced with the study of families of elementary functions, a shift that 'places the function concept at the heart of the curriculum' (p. 49)." The emphasis is on real world situations that have relationships that can be described and modeled in functional terms.

Not everyone agrees with this approach. Exemplifying the opposition's stance is Pimm (1995). He writes, "There is currently a rapid process of redefinition of algebra, triggered I feel more by the potentialities of these new [digital] systems and the drawbacks of an over-fragmented mathematics curriculum than by any novel epistemological insight." (p. 104). Kieran summed up the situation that has resulted in U.S. educational circles today, writing, "The orientation towards the solving of realistic problems, with the aid of technological tools, allows for an algebraic content that is less manipulation oriented" (p. 710). Students are able to concentrate on the meaning of what is being done, but computers and calculators are doing most of the doing.

In *Teaching Math as a Language* (2007) and in seminars before and after the publication of that book, the inventor agreed with this stance, arguing that like a language, mathematics has both structure and meaning and that the math educational community needed to find a balance between the abstract syntactical, grammatical, analytical based concerns of traditional mathematics and the realistic functional, meaning-based, holistic concerns of the now-dominant reform-math approaches.

Whether a person embraces the function-based realism that has prevailed in U.S. math pedagogy for the last twenty years, the purported high-abstraction of traditional approaches that is experiencing a small resurgence or a balance between both schools, in the end the real question boils down to one of scalability. For despite the widespread acceptance of reform-math approaches, no one has been able to scale theory up into widespread practice in a way that produces measureable results. As the U.S. looks towards the coming decades of the twenty-first century, there remains this final and most important of all math educational needs, a solution to improving math education that is easily scalable. Thus, new and improved systems and/or methods that provide a math pedagogy that is not just theoretically sound but strongly scalable need to be developed to answer these needs.

References that generally discuss these areas of education include the following.

Fey, J., & Good, R. (1985). Rethinking the sequence and priorities of high school mathematics curricula. In C. Hirsch & M. Zweng (Eds.), *The secondary school mathematics curriculum (Yearbook of the National Council of Teachers of Mathematics)* (pp. 43-52). Reston, Va.: National Council of Teachers of Mathematics.

Kieran, C. (2007). Learning and teaching algebra at the middle school through college levels: building meaning for symbols and their manipulation. *Second handbook of research on mathematics teaching and learning: a project of the National Council of Teachers of Mathematics* (pp. 707-762). Charlotte, N.C.: Information Age Pub.

Pimm, D. (1995). *Symbols and meanings in school mathematics*. London and New York: Routledge.

Weems, R. (2007). *Teaching math as a language*. Indianapolis, Ind.: Dog Ear Publishing.

SUMMARY OF SOME SPECIFIC EMBODIMENTS

Various embodiments disclosed herein are directed at creating an interactive, computerized learning environment that overcomes the shortcomings of existing tools and methods. According to one embodiment provided is an interactive, machine-based learning environment that implements a method of generating and using mathematical reasoning blocks for math education.

In one embodiment, mathematical reasoning blocks are computerized, block-like images that are used as visible markers for mathematical axioms, theorems, and procedural functions. For example, each block may have a titled icon when visible in the reasoning area and, when dragged into the work area, the titled icon and a place for the entry of mathematical work. The mathematical work can include, without limitation, free-form mathematical expressions or verbal expressions, or the performance of mathematical actions. Mathematical actions may include graphing. After a problem set is chosen and a specific problem is presented, selected blocks may be dragged into the work area where they can be stacked one block atop another in an attempt to construct the steps for solving the problem.

As long as the axioms, theorems, and procedures around which a set of blocks are designed are mathematically consistent, the blocks can be employed to meet at least some of the math educational needs indicated above.

In another embodiment, mathematical reasoning blocks are designed to balance both the constructivist concerns that drive much of the new-math/whole-math agenda with the traditional concerns that are often in opposition to that agenda. For example, the mathematical reasoning blocks may be designed to balance the insistence on freedom to explore on the one hand with analytical restraint on the other hand.

In yet another embodiment, mathematical reasoning blocks do not exist in a set template. Thus, a user has the freedom to attempt dragging and dropping them in any sequence desired to solve a problem. In contrast, because of the way the axioms, theorems, and procedural functions, which underlie them logically interlock, the ways in which the blocks can be arranged in route to a problem solution are constrained. Thus, one result of certain embodiments is freedom bounded by constraint, allowing the blocks to supply a strong alternative to the imbalances prevalent in current multi-choice and template-driven, algebraic teaching systems.

In yet another embodiment, mathematical reasoning blocks may also address the tendency in math education towards the imbalance of passive rather than active, computerized learning environments. Using the blocks invites every user to participate in constructing their own understanding of a problem by literally constructing the problem solution—kinesthetically, visually, and intellectually. In the preferred embodiment of this invention, the computerized logic of the system will supply an answer to a step only after the student has made a measurable effort at a solution.

As a byproduct of some of the above embodiments, the statistics generated on student performance allow incremental changes in sub-skills to be tracked, as opposed to just tracking the changes in the outcome of solving a particular type of problem as a whole. This means that no student can act passively on homework, in a physical class, or during online instruction without the behavior being documented in such a way that teachers can address the situation quickly.

Another benefit of certain embodiments of mathematical reasoning blocks stems from the fact that these embodiments can use a very small subset of a given subject's many available axioms, theorems, and procedural functions. As a consequence, some embodiments of mathematical reasoning blocks provide a remedy for the failure of competing or uncoordinated groups to agree upon which mathematical skills are most critical and to embrace a unified style of working mathematical problems at the introductory level.

This is possible because some embodiments of mathematical reasoning blocks are designed to leverage a deeply-held attitude common to the majority of experienced computer users: The unconscious understanding that, in a computerized environment, the user has little choice, but to abide by the rules imposed by that system. By tacitly accepting this constraint, the user unconsciously embraces the rules embedded in that system and begins to internalize those rules.

In various embodiments, the corresponding subsets of axioms, theorems, and procedural functions that make up a mathematical reasoning block environment can come from any number of combinations. For each embodiment, the choice of the respective small subset depends on the pedagogical perspectives and values a designer wishes to instill in students and teachers. Regardless of the choices the program instantiates, both student and teacher users gradually internalize the balance they represent—the program acting as a Trojan horse of sorts to bring agreement between competing camps, circumventing the polarizing battles and inefficiencies that often impede progress.

In some embodiments, mathematical reasoning blocks may also address the inability of many students to visualize the abstract procedures and solution paths required to use math successfully.

One of the fundamental questions regarding the teaching of secondary-school mathematics is: Is there a way to overcome a deficit of concrete-experiences without having to go back and recapitulate (as is now done with manipulatives) the time-consuming childhood play experience that provides the concrete embodiment of so many math skills—blocks, Legos, Lincoln Logs, erector sets, and the social environment in which that play takes place? The embodiments of mathematical reasoning blocks provide a novel, inventive, useful, affirmative answer to this question.

In some embodiments, the mathematical reasoning blocks may also provide a timely answer to a demand for effective, touch-screen-friendly educational environments. This demand is projected to increase with the continued proliferation of iPads, Smartboards, Smartphones, etc. Mathematical reasoning blocks, in various embodiments, can leverage these technologies to provide a more-visual, kinesthetic, and exploratory approach to teaching secondary school and early college mathematics.

Advantageously, when mathematical reasoning blocks are used during classroom instruction and not just in one-on-one, student-to-computer tutorial sessions, they help to solve one of the most important pedagogical problems: the problem of scaling, which is related to the problem of teacher training and retention. Although numerous competing theories of how to teach mathematics exist, teacher-training hurdles make it difficult to scale those theories and their associated methods up to a local, state, or national level. Various embodiments of the method of using mathematical reasoning blocks to teach mathematics not only provide an environment that trains students but also one that simultaneously mentors and trains teachers as well.

Although the mathematical reasoning block interface is designed to be highly intuitive, the knowledge for teaching math embedded in that system is not. As the program mediates the interaction between students and their teachers, it continuously exposes these users to an automated, expert system that is designed to (i) help users break the problems down into appropriate "knowledge-size" pieces, (ii) tutor users to spot the typical errors made by students, and (iii) aid some users, e.g., teachers, to give differentiated instruction that appropriately connects students' interests and cognitive levels to the problem-solving tasks at hand.

Thus, various embodiments help to address the four shortfalls in the prior educational art: 1) an inability to consistently balance the demands of whole math verses analytical math approaches to teaching, 2) a failure to embrace a uniform style of working math problems at the introductory levels, 3) a failure to make abstract ideas visually concrete, and 4) an inability to scale-up currently available options for successfully teaching mathematics.

According to one embodiment, a method for providing an interactive mathematics learning environment to a student using a machine, e.g., a computer, having a memory for storing a set of mathematical reasoning blocks is provided. The machine is configured to (i) generate and display on a display a question prompt related to a type of mathematics problem and (ii) generate and display at least a subset of the set of mathematical reasoning blocks in a reasoning section of the display. The display is configured to include the reasoning section, a workspace section, and a problem section, and possibly other sections as well. The machine is configured to (i) sense a selection of one of the subsets of the set mathematical reasoning blocks that are displayed by the student in the reasoning section of the display, (ii) copy the selected one of the subsets of the set of mathematical reasoning blocks into the workspace section of the display, (iii) sense information the student enters into the mathematical reasoning block in the workspace section, (iv) generate an output based on the information entered, and (v) repeat some or all of the prior steps, stacking selected mathematical reasoning blocks in the reasoning section of the display, until the question is solved.

In some embodiments of the above method, a student can select a type of problem on the machine and the machine can generate the question based on the type of problem. The student can enter a level of competence, and the machine can generate the question based on the level of competence.

In some embodiments of any of the above methods, the subset of the set of mathematical reasoning blocks can include only the mathematical reasoning blocks needed to solve the question. Alternatively, the subset of the set of mathematical reasoning blocks can include more mathematical reasoning blocks than are needed to solve the question.

In some embodiments of any of the above methods, the set of mathematical reasoning blocks can include logical reasoning blocks, text reasoning blocks and graphical reasoning blocks.

In some embodiments of any of the above methods, the machine is configured to determine whether the selected one of the subset of the set of mathematical reasoning blocks was selected in error and, if so, then advise the student that an error was made.

In some embodiments of any of the above methods, the machine can be configured to also optionally maintain statistics of the errors made.

In some embodiments of any of the above methods, the machine can be configured to iteratively repeat the prior steps for new questions, after the previous question has been answered by the student.

Some embodiments of any of the above methods can be implemented using a computer-based system, such as, without limitation, web-based, intranet-based, or standalone PC-based. They may also be implemented on machine readable medium. For example, the present invention may include a machine-readable medium, having encoded thereon program code, wherein, when the program code is executed by a machine, the machine implements a machine-based method for providing an interactive mathematics learning environment to a student using the machine, said machine having a memory configured to store a set of mathematical reasoning blocks. The machine-based method may comprise: the machine generating and displaying on a display a prompt with a question related to a type of mathematics problem; the machine generating and displaying at least a subset of the set of mathematical reasoning blocks in a block reasoning area of the display, with the display being configured to have the block reasoning area, a work area, and a problem presentation area; the machine sensing a selection of one of the subset of the set of mathematical reasoning blocks that are being displayed in the block reasoning area of the display; the machine sensing the validity of the selection; if invalid, the machine failing to display the selected one of the subset of the set of mathematical reasoning blocks outside the block reasoning area of the display; and the machine failing to allow entry of information into the selected one of the subset of mathematical reasoning blocks; if valid, the machine displaying the selected one of the subset of the set of mathematical reasoning blocks outside the block reasoning area of the display; and the machine sensing information entered into the selected one of the subset of mathematical reasoning blocks in the work area section to cause an output to be generated based on the information entered.

These and other features, aspects, and advantages of various embodiments will become better understood by one of ordinary skill in the relevant art with reference to the following detailed description, appended claims, and accompanying drawings:

BRIEF DESCRIPTION OF THE DRAWINGS

Reference herein to "one embodiment" or "an embodiment" means that a particular feature, structure, or characteristic described in connection with the embodiment can be included in at least one embodiment disclosed and claimed herein. The appearances of the phrase "in one embodiment" in various places in the specification are not necessarily all referring to the same embodiment, nor are separate or alternative embodiments necessarily mutually exclusive of other embodiments. The same applies to the term "implementation."

FIG. 1A-1C show block diagrams of exemplary systems in which various embodiments can be practiced and/or implemented.

FIGS. 6A and 6B are illustrations of arrays that can be used for extrinsic lesson error correction in one embodiment of the disclosure.

FIG. 8 is an illustration of an end-of-lesson statistics screen based on the order of operations lesson in one embodiment of the disclosure.

FIGS. 9A-9E illustrate one of two contrasting addition exercises based on one possible set of math reasoning blocks.

FIGS. 10A-10F illustrate a second of two contrasting addition exercises based on one possible set of math reasoning blocks.

FIGS. 11A-11J show screenshots of a lesson on simplification by the order of operations based on one embodiment of the disclosure.

FIGS. 13 A-13J are illustrations of a lesson on direct translation problems based on one embodiment of the disclosure.

FIGS. 14A-14M are screenshots of a lesson on graphing points based on one embodiment of the disclosure.

FIGS. 15A-15Q are illustrations of a lesson on solving equations based on one embodiment of the disclosure.

DETAILED DESCRIPTION

Figure 2:
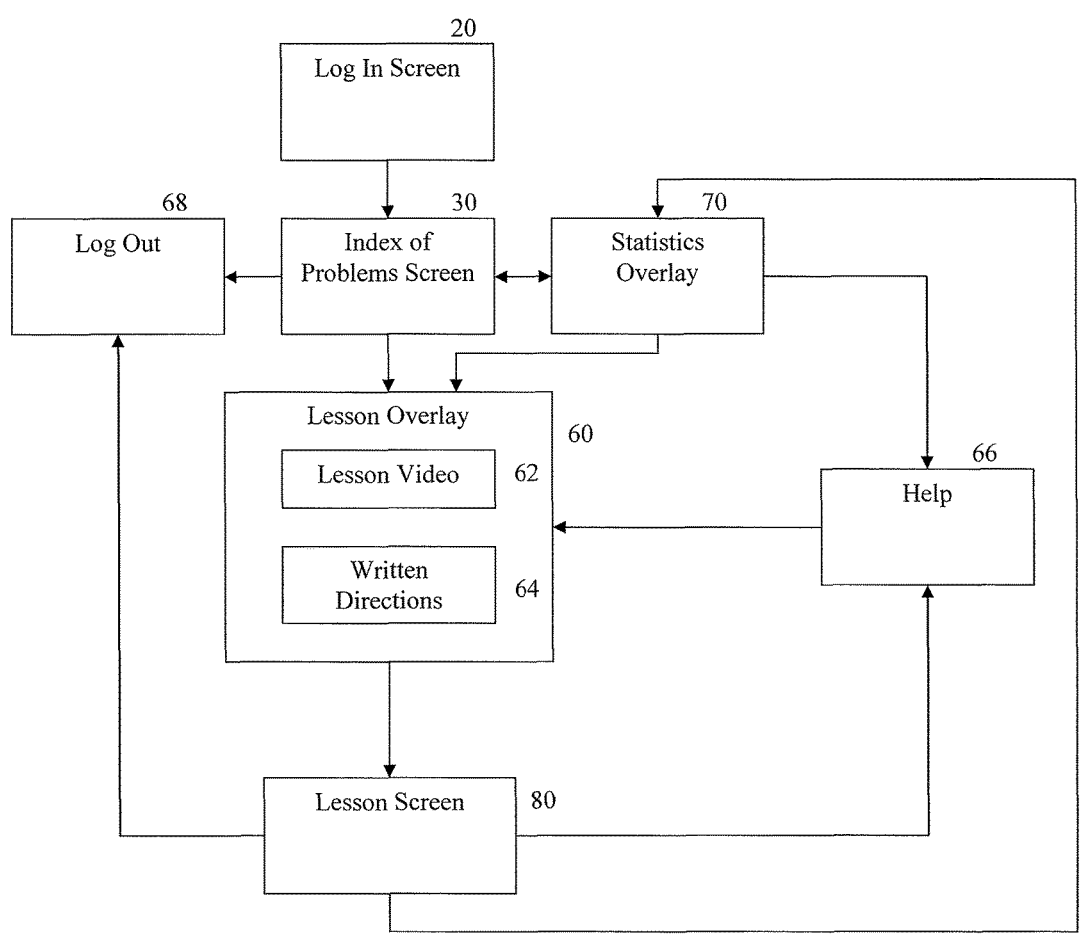
FIG. 2 shows a flowchart of an interactive learning system according to one embodiment of the disclosure.

One embodiment may be an online system FIG. 1A. This system may be comprised of a machine-based device operating a web browser with client-side processing capabilities 1. A web server 2 containing a browser-compatible, coded-based aspect of this embodiment may supply that aspect to a machine-based device, assisted by an application server 3 and a data base server 4 used to store statistics long-term. The code for the invention may be provided from memory 19.

This is only one embodiment, and many other embodiments are possible. By way of example, stand-alone PC embodiments as shown in FIG. 1B and intranet embodiments as shown in FIG. 1C may also be used.

Referring back to FIG. 1A, an interactive learning system 19 supplied by the web server and in accordance with an aspect of this embodiment is shown in FIG. 2. The online system 19, accessible via a web browser, may include an initial login screen 20. Once an account is entered via the login screen, an index of problems 30 may then be displayed.

The index of problems 30 may be composed of various sub-elements, to be described in further detail in a later section. These sub-elements may allow access to specific lessons 90, each lesson possibly preceded by an overlay 60 associated with that lesson. The overlay may include a video component 62 and a written component 64. These components may introduce the lesson in accordance with an aspect of an embodiment.

While the lesson screen 80 is displayed, the system may provide access to help via a button 66. In one embodiment the help button allows the system to redisplay the lesson overlay 60 where the original lesson video component 62 or written component 64 may be referenced for help. When the overlay is closed, in one embodiment the system returns to the problem last presented.

An embodiment, may allow for full or partial completion of the lesson. In either case, the system may then proceed to a second overlay, the statistics overlay 70. In some embodiments, the overlay displays the fine-grained statistical results from the lesson. At this point, the system may also allow the user a choice of a) repeating this lesson 60 or b) returning to the index of problems 30 to choose another problem set or c) stopping the tutorial session 68, both via the lesson screen 60.

Following is a detailed description of the elements in this example of one possible embodiment.

Computerized Platforms

As previously described, some embodiments can operate on a web based platform, a standalone PC platform or on an intranet platform. An example of a standalone computer platform is shown in FIG. 1B. This off-line system may use a computerized device requiring no connection to the internet in order to use the embodiment. The computer's microprocessors 5, RAM 6 and ROM 7 may be used to run an offline version of software in accordance with the various aspects of the embodiment, with a visual display 8 available for viewing interface screens generated by this invention. This offline embodiment may also include an input device such as a keyboard, touch screen, touch pad or mouse 9. Other embodiments might include and use disk drives 10 or video disc drives 11 to facilitate the use of the invention.

In accordance with an aspect of another embodiment, a local area network as shown in FIG. 1C may be used to allow users access to one embodiment of a learning system described herein. The local area network server 13 and the networked computer work stations 14, 15, 16 may be used in combination with each other to supply the computational, memory, displays and input elements that may be used in an embodiment.

One embodiment of this invention is the web based system shown in FIG. 1A and previously described. It may use a client-side language to facilitate speed in processing a user's responses during a web browser session 1 and may use a database server to store long-term statistics. Another online embodiment of this invention may use a server-side language, which may employ the use of a web server 2 and an application server 3, in addition to a computerized web browser 1 and database server 4 for handling long-term statistics.

The Index of Problems Screen (FIG. 2 item 30)

Figure 3:
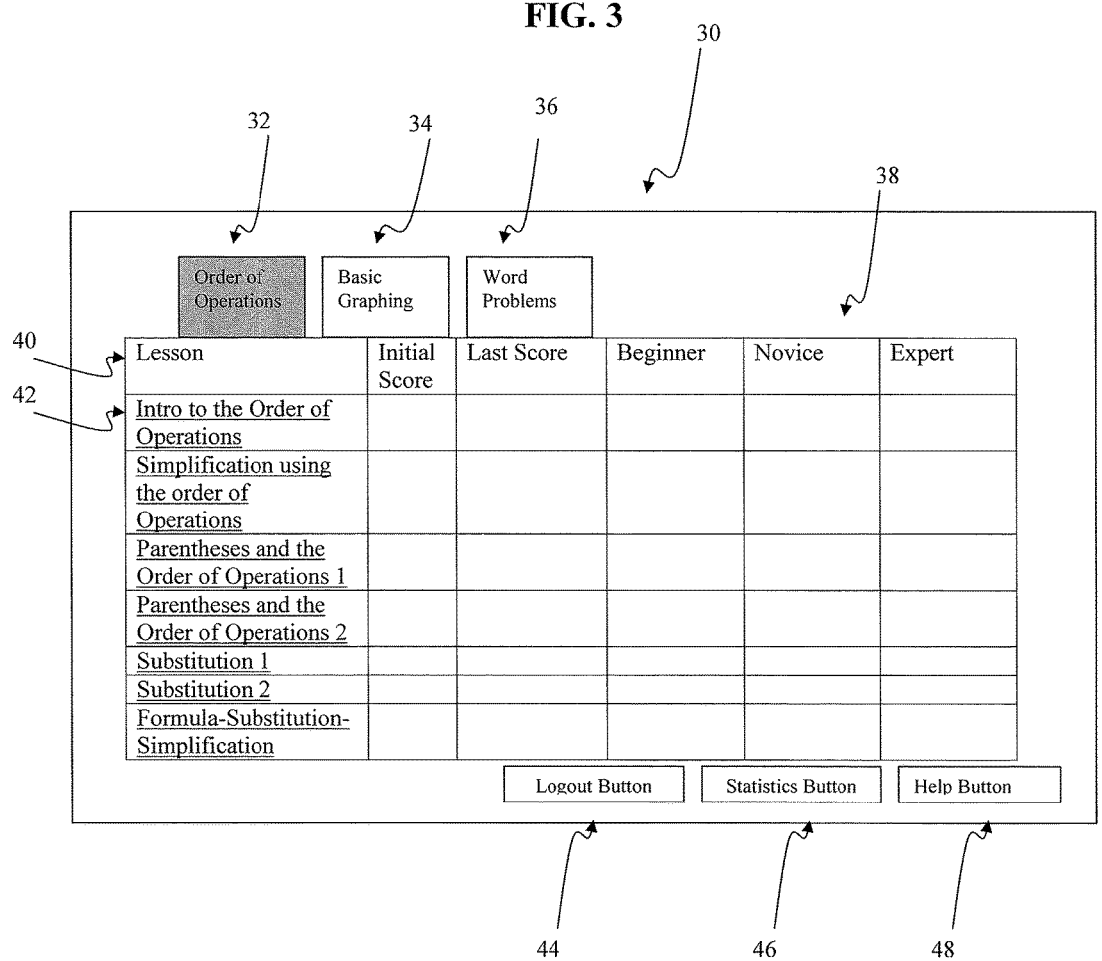
FIG. 3 is an illustration of a template for the tutorial lesson panel, which comprises one element of an embodiment of the disclosure.

In accordance with an aspect of one possible embodiment, and as illustrated in FIG. 2, the first screen presented after the login screen 20 may be the index of problems screen 30. One embodiment of the index of problems screen is shown in FIG. 3. This screen may be organized into major sets of problems analogous to chapters. The system may allow these chapters to be accessed by tabs. Three examples of possible tabs are: The Order of Operations 32, Basic Graphing 34 and Word Problems 36.

Each tab may be associated with an array with column headings. FIG. 3 shows one example of a possible array with labeled column headings 40. In one embodiment, the column labeled Lesson is a list of available lessons in the selected chapter. Each lesson title may be an active link that will access the lesson named by that title. One example of such a lesson is Intro to the Order of Operations 42.

Additional title headings 38 in an embodiment may refer to statistics collected when the problems in a selected lesson are worked. This possibility will be discussed further when statistics are discussed in detail in a later section.

There may be a logout button 44 that logs the user out of the system when pressed. There may also be a statistics button 46 that accesses the statistics screen referred to in FIG. 2, item 70. In one possible embodiment, this statistics screen may give finer grained statistics than the general statistics array with column headings 40 displayed above this button. Additionally, there may be a help button 48 that accesses the lesson overlay referred to in FIG. 2, item 60. In one possible embodiment, this overlay may provide help by providing access to written and video elements.

The Lesson Screen (FIG. 2 Item 80)

Figure 4:
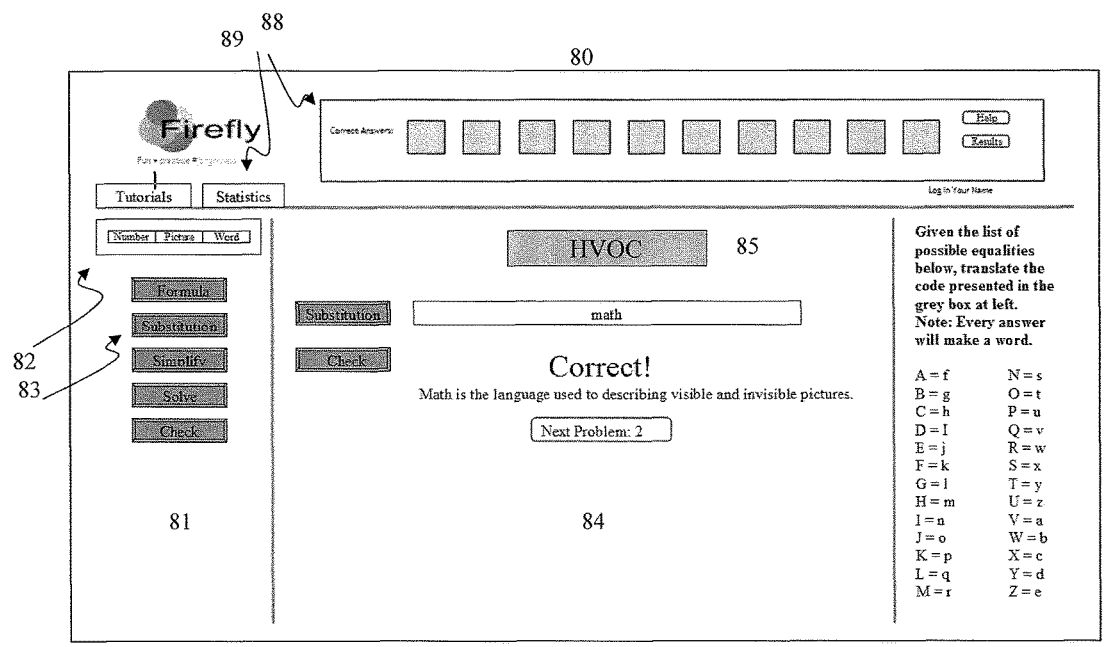
FIG. 4 is an illustration of a template for the basic lesson/exercise screen, which comprises one element of an embodiment of the disclosure.

After the lesson overlay 30 closes, in one possible embodiment the system presents the lesson screen 80. FIG. 4 illustrates the basic elements of a embodiment of the lesson screen 80: the work area 84, the block reasoning area 81, a few examples of possible math reasoning block icons resting in that area 82, the problem presentation area 86, and a statistics area 88 with a statistics tab 89 that gives access to gross and fine grained statistics, respectively.

The work area 84 in one embodiment is the section of the screen allocated for mathematical reasoning blocks to be stacked to construct the solution to a problem. In some embodiments of this invention, the uppermost section of the work area may also be used to present simple problems 85 that fall naturally into the flow of the work area.

The problem presentation area 86 in one embodiment is the section of the screen where the system may present the statement of problems that require words and/or pictures to be properly stated. These types of problems may or may not fall naturally into the flow of the work area.

In the statistics area at the top of the screen 88 in one embodiment, gross problem statistics may be tracked, such as the number of the current problem or the fraction of a completed problem that was correct. The statistics tab 89 may access an overlay screen FIG. 8 that displays more finely grained statistics. One embodiment of an overlay screen will be described in detail in a later section.

The block reasoning area 81 in this example of an embodiment is the section of the screen where the system may allow secondary mathematical reasoning blocks 83 associated with a given problem to be accessed during the construction of a solution to that problem.

In some embodiments these secondary mathematical reasoning blocks may be accessed via base-level mathematical reasoning blocks 82 once the first problem of a lesson has been initiated. In one embodiment, several types of secondary mathematical reasoning blocks may be available: such as, and without limitation, logical reasoning blocks, text reasoning blocks, and graphical reasoning blocks. In this one embodiment, each group may be accessible via the primary mathematical reasoning blocks 82 labeled number, word and picture respectively.

In another embodiment, Tertiary mathematical reasoning blocks may also be selected in the block reasoning area 81, via selection of certain secondary mathematical reasoning blocks. Tertiary math reasoning blocks may represent specific instances of the procedures represented by secondary mathematical reasoning blocks or may have other functions. One possible embodiment might have a secondary mathematical reasoning block titled Solve with tertiary blocks accessible through it titled linear, factor, integrate and differentiate.

In accordance with an aspect of one embodiment, the mathematical reasoning block may be displayed with an icon in the block reasoning area 81. When the mathematical reasoning block is moved into the work area 84, a place for the entry of mathematical work may also be added.

In accordance with one embodiment, the icon may be implemented as a label. The place for entry of mathematical work may be implemented as a code-defined child-node that permits mathematical work to be performed in the parent block.

The Lesson Flow

Figure 5:
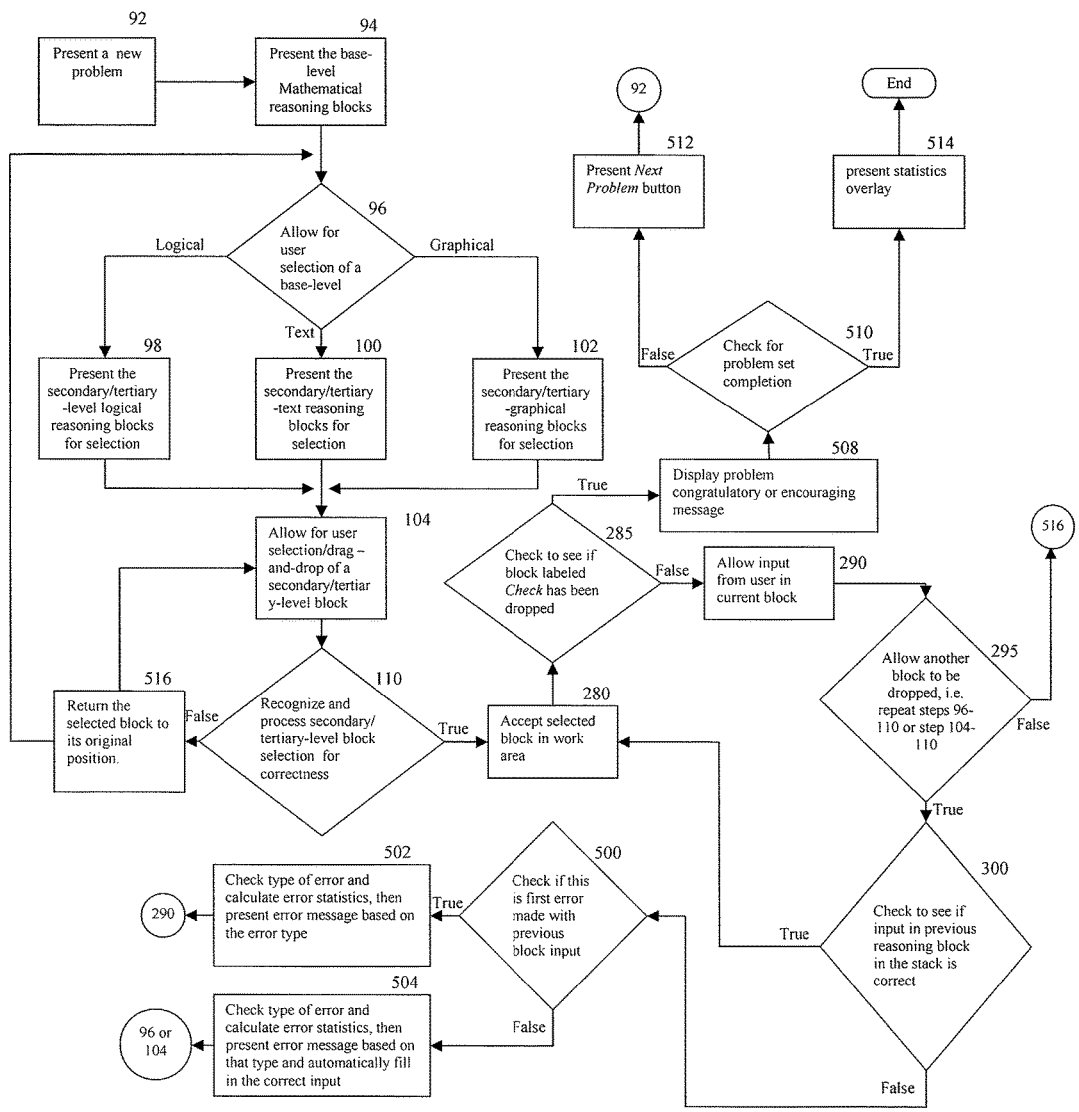
FIG. 5 shows a flowchart of the logic followed in presenting a basic lesson that can be used in one embodiment of the disclosure.

FIG. 5 illustrates the general flow of one embodiment of a lesson presented in the lesson screen. The flow in an embodiment may begin with the presentation of a new problem 92.

In one embodiment, the problems in the problem library for a given lesson may occur in a fixed sequence with no variability in the problems presented. In another embodiment of this invention, the problems in the problem library can be scrambled before presentation. Though the problems may be similar each time, the order in which the problems are presented changes. In one preferred embodiment of this invention, the type of library and the type of selection process varies, depending on the type of lesson being taught.

The base-level mathematical reasoning blocks may also be displayed and available for selection 94. In one preferred embodiment, one of three primary reasoning blocks may be selected 96, after which the system then displays a set of secondary mathematical reasoning blocks belonging to the category selected 98, 100 or 102.

A user may select one of these blocks and drag and drop it into the workspace 104. The system may then check for the correctness of the block 110, comparing the block dragged to the blocks the logic of the system expects might correctly be dragged and dropped in this position. The logic of the procedures that may be used to check the correctness of block placement is explained in detail in a later section.

If the block dragged is correct for that position, then it is accepted in the work area 280. In one preferred embodiment, the system logic may also note the identity of the block to see if it is a Check block or not 285, a Check block in such an embodiment being a mathematical reasoning block designed to check if the solution to a problem is correct.

If the mathematical reasoning block is not a Check block, the input portion of the block may become visible and enabled to accept input 290. In this example of one preferred embodiment, once the user has entered an answer for the current reasoning block another mathematical reasoning block may then be selected and dropped 295.

In one preferred embodiment, if the system's logic determines that the next block selected for dragging is incorrect for this particular section of the problem, then the block may fail to drop. In such an embodiment, the block may return or appear to return to its original position 516 and the system may allow the user to select another block.

If, on the other hand, the block selected for dragging is correct for this particular section of the problem, then in such an embodiment the system may check to see if the user-input to the previous block is correct 300. If the system determines that the data entered into the previous block is correct, then the block may drop and be added to the stack 280.

If the system determines that the data entered into the previous block is incorrect, then the current block may again fail to drop. In one embodiment, it will then return to its original position or appear to return to its original position. Instead of the drop, an error message may also appear over the problem presentation area.

The error message displayed may depend on if the system's records indicate that this is the first error for checked input to the previous block or the second error for checked input 500. If this is the first error for the previous block, then the error type may be determined by the system, error statistics may be calculated and a hint may be displayed to help the user 502 make a second attempt at entering a proper answer 290.

If this is the second error for the previous block, then in one preferred embodiment the error type may be determined by the system and error statistics may be calculated. In this instance of a second error, one preferred embodiment may present an error box explaining why the error was made. The system may also enter the correct answer into the previous mathematical reasoning block 504 so that the user can continue working 516

In summary, up until the final step of a problem, the system check of the correctness of a user entry into a mathematical reasoning block in one preferred embodiment may be initiated by attempting to drop the next block in the solution sequence. Selecting and attempting to drop a new block into the work area may initiate the system's error checks on user input in the preceding block. The mechanism for checking user errors in one such embodiment will be explained in detail in a later section.

Note: The preceding six paragraphs provide an explanation for how the system's logic may deal with wrong answers in one embodiment. In various other embodiments, the correct answer and error explanation might be supplied immediately after a single errant input, or they might be supplied only after three, four or more errant entries by the user. Also they might never be supplied, depending on the use to which the mathematical reasoning block teaching or testing system was being put.

In one preferred embodiment, when a user supplies a correct answer in the current block 290 followed by a correctly chosen and dropped block for the next step of the problem 295, then the lesson flow may be relatively simple: The system may check to see if the previous input was correct. Finding it so, the work area may then accept the new block in the next available stack position 280. From that point on, the system may allow the user to repeat this process of entering input, selecting and dropping blocks to initiate error detection, supplying or not supplying error messages—repeating this process until the user finally reaches a problem solution.

Reaching what the user believes is a valid problem solution marks the final section of logic in the lesson flow of this example of one preferred embodiment of a mathematical reasoning block instructional system. If the solution is incorrect when the user selects, drags and drops the Check block to check this solution, then the flow of the lesson may, instead, follow the flow outlined in the error-checking portion of this section.

If, on the other hand, the solution in an embodiment is correct when the block is dropped 295, 300, 280 and 285, then the logic that ends a problem or problem set may become active: First a congratulatory message may be displayed saying that the problem is completely correct. If there were errors in the problem, an encouraging message may be displayed 508. In a preferred embodiment of this invention, the encouraging messages may be randomized so that they do not seem pro forma.

The logic of the system may then check to see if the problem set is at an end 510. If it is not the end of the problem set, then a next problem button may be presented 512. When it is selected in one embodiment, the lesson screen may then display a new problem 92. If it is the end of the problem set, then the statistics overlay screen may instead be presented 514 and the lesson may come to an end.

Mathematical Reasoning Blocks

In one embodiment of the present invention, there are three basic types of mathematical reasoning blocks: logical reasoning blocks, text reasoning blocks, and graphical reasoning blocks. In one preferred embodiment of this invention, logical reasoning blocks control the procedural reasoning associated with various numeric and algebraic representations, text reasoning blocks control the procedural reasoning associated with various text representations and graphical reasoning blocks control the procedural reasoning associated with various graphical representations. But in other embodiments, there is no reason that a single block-type could not be invested with some or all of the properties of any combination of these three block elements so that embodiments of mathematical reasoning block systems composed of only one or two block types might also be constructed. In other embodiments of the present invention, the logical reasoning blocks can be used alone to teach basic concepts.

In one preferred embodiment of a system, mathematical reasoning blocks and their operation are structured around the propositional reasoning codified by Aristotle. According to Aristotle, a proposition has a hypotheses p and a conclusion q. A basic proposition has the structure: If p then q, which is abbreviated p→q. But an embodiment of a mathematical reasoning block system may also employ other types of propositional logic.

In this example of a preferred embodiment, the important principle borrowed from Aristotle is that these propositions may be chained: If a person is given: p→q and q→w, a person can conclude p→w. Therefore if one mathematical reasoning block represents the first proposition and a second block represents the second proposition, these blocks may be stacked to arrive at a conclusion.

All mathematical axioms, theorems and procedures for secondary school mathematical subjects may be structured as Aristotelian propositions, which is what makes this example of a preferred embodiment of mathematical reasoning blocks possible. The only question is which axioms, theorems and procedures from among many possible choices a person would like to use to structure an embodiment of an instructional environment.

The rule for stacking blocks in one preferred embodiment of a mathematical reasoning block set is that the propositions must be stacked so that the conclusion (last element) of a prior block matches the hypothesis (first element) of the following block. The axioms, theorems and procedures a person chooses to use in forming such a set of mathematical reasoning blocks must be able to be used to accomplish all problem tasks proposed in the various problem sets, while also meeting the last-first condition just mentioned. This embodiment of a basic set, which shall hereafter be referred to as single-reference blocks, forms the basis for one preferred embodiment of this invention.

A second possible embodiment among many possible embodiments of a mathematical reasoning block set illustrates the flexibility available in structuring mathematical reasoning block environments: Note that the hypotheses of the propositions a person might chose to program into a mathematical reasoning block environment may have more than one condition that must be meet before a conclusion can be drawn. From here on, sets of mathematical reasoning blocks that contain blocks having hypotheses containing multiple, explicit conditions shall be referred to as multi-reference blocks.

For example, consider the proposition: If p and q then w, which in abbreviated form is p,q→w. In this example of one possible embodiment of a multi-reference block, two reasoning blocks would need to be stacked (one to support p and one to support q) before including the p,q→w-block as the next block in the stack. In some embodiments of mathematical reasoning block systems with properly selected sets of single-reference blocks, any given block is referencing the block just prior to it in the stack. With multi-reference blocks this, by definition, is not true. Therefore in a preferred embodiment of a system employing multi-reference blocks, it should be determined if the pertinent blocks to which the hypothesis of a multi-reference block may apply have been dropped.

In one embodiment, this may be accomplished by requiring that the blocks immediately preceding a multi-reference block are in one-to-one correspondence with the multiple conditions of a multi-block's hypotheses. But this method has limitations if used exclusively.

Therefore in another example of one preferred embodiment of a mathematical reasoning block set, both in single-reference block sets and in sets containing multi-reference blocks: Selecting blocks or block elements in the work area is one effective way to specify which blocks or which elements of a block a newly selected reasoning block will refer to when it is dragged into the work area.

A third consideration that may influence an embodiment of mathematical reasoning blocks is the sheer number of ways a mathematical expression can be written. This problem of permutations arises because in real-life classrooms, students are often allowed to change the order of elements in a mathematical expression without specifying that they have done so or what the reasoning was that allowed them to do so. It is simply understood by one skilled in the art of mathematics that this has happened.

In one embodiment of a mathematical reasoning block environment, such arbitrary movement can be accounted for by writing functions that standardize the order of elements in a mathematical expression before error checking is done on such elements. Many preferred embodiments of this invention may do this to some degree anyway, for instance by eliminating all spaces in an expression before error checking begins. But the notion of allowing students to perform multiple actions that may be unaccounted for by a reasoning block goes against the pedagogical thinking behind reasoning blocks This is not to say that in some embodiments of mathematical reasoning blocks multiple actions cannot be tracked and accounted for by single blocks.

One alternative to using a standardizing function may be to provide explicit blocks to account for use of the symmetric property of equality, the commutative properties of addition and multiplication, and the associative properties of addition and multiplication. In other embodiments, other methods of dealing with non-standard input may also be employed, such as writing functions that may take into account a variety of symbolic arrangements beyond the obvious arrangements.

But in the following examples of some mathematical reasoning block embodiments in operation, there is a strict adherence to order: The order in which problem elements are introduced is the order in which they should be used from the beginning to the end of the problem.

Two final elements that may be included in some embodiments of mathematical reasoning blocks should be noted. These are primarily stylistic elements specific to one preferred embodiment of the mathematical reasoning block environment:

1) Not all mathematical reasoning blocks need to be selected from the block reasoning area. Certain blocks in certain situations may also be selected from the work area itself, if they are already in the work area.

2) Some secondary-level reasoning blocks may change their names when dragged into the work area, becoming the tertiary blocks needed in that situation. There is no need for this automatic change; its inclusion is a pedagogical choice meant to simplify the block reasoning area to facilitate the ability of beginning students to handle an embodiment of mathematical reasoning blocks more easily.

These five properties, included in this example of one preferred embodiment of mathematical reasoning blocks, will be further illustrated in examples 1 through 8.

Mathematical Reasoning Block Input

Throughout this detailed description of one preferred embodiment of an interactive learning system structured around mathematical reasoning blocks, reference has been made to inputting data into a reasoning block. The meaning of the phrase inputting data into a block may change from block type to block type.

In one preferred embodiment of logical reasoning blocks, the input may be understood to mean an alpha-numeric-symbolic expression or a set of alpha-numeric-symbolic expressions. One exception to this generality occurs with the Check block, which may take a left-click as an input. In another embodiment of logical reasoning blocks, the Check box may also be made to receive alpha-numeric-symbolic input.

The input to these reasoning blocks may be entered via a variety of methods, exemplified but not limited to the following examples. The input may be typed in via a virtual or physical keypad or keyboard. The input may be entered by selecting part or all of another alpha-numeric-symbolic string displayed in the problem presentation area. For work area elements, selections may be made from the input area of any mathematical reasoning block in the work area or from the problem prompt if it is in the work area.

In other embodiments of this invention, the input may be made via a voice recognition interface so that the user need only speak the data he wishes to input. It may also be made using a virtual pencil of some type, possibly aided by character recognition software.

In one preferred embodiment of text reasoning blocks, the input may be an alpha-numeric expression or a set of alpha numeric expressions. The input options may be the same as those for logical reasoning blocks, with the exception that if a selection-type entry is made, the selection may come from the problem presentation area. Also, in some embodiments there may be no Check block among the text reasoning blocks.

In a preferred embodiment of graphical reasoning blocks, graphical input may be allowed. This input may be of a selection-drag-and-drop-elements kind, of a selection-and-drag-elements kind or of a text kind. In another embodiment, the entry may include other types of input such as click input or combinations of these and other types of input.

In some embodiments, there may be a Check block among the graphical reasoning blocks.

The eight examples in the example section will illustrate in detail these elements of one preferred embodiment. Other embodiments of each of these reasoning block types may contain variations on this example of one preferred embodiment of mathematical reasoning blocks.

Error Detection with Logical Reasoning Blocks

The logic of a system designed to detect errors in logical reasoning block selection-drag-and-drops or in logical reasoning block inputs may take one of three forms: extrinsic error checking, intrinsic error checking or a mix of both. A preferred embodiment of a mathematical reasoning block system uses a mix of both types of error checking.

Extrinsic error checking may be the easiest to program, but it may also be extremely work-intensive. In its most rigid embodiment but not the only possible embodiment, extrinsic error checking involves specifying every possible type of error that may be of concern at every step of a problem, each step and possible errors associated with that step being defined/bracketed by a specific mathematical reasoning block. Extrinsic error checking may also involve accompanying each error with an appropriate error message.

In some embodiments this specification may be hardwired into the programming via if-then or case statements for each new problem. In other embodiments it may be specified via arrays referenced to specific problems, such as the array in FIG. 6a for an expected sequence of reasoning blocks that are to be received into a stack; or via a set of arrays, such as those displayed in FIG. 6b for handling the likely errors associated with the simplification of problem 1a, where the variable values are generated by random number statements.

Depending on the structure a programmer chooses for writing such a set of arrays, a function may be written that processes that structure. One embodiment of such a function for processing a set of arrays such as those in FIG. 6b may be written so that it converts phrases such as $f1 \cdot \{c2^2\} + a1$ into their regular expression equivalents, then compares the resulting regular expressions against user input in various simplification blocks, in this case in the exponent block.

Using the array structure, control statements may then be used that loop through the correct answer and all possible errors embodied in the array associated with any given simplification step—simplification of exponents, simplification of multiplication/addition or addition/subtraction.

The alternative to extrinsic error checking is intrinsic error checking. Intrinsic error checking is based on the recognition that specifying the set of possible errors in a rule driven system is a combinatorics problem. If a person clearly identifies the rules driving a system, then listing the number of ways those rules can be combined and recombined may be automated.

As applies to this example of one preferred embodiment, once a programmer specifies an intrinsic way of identifying if a sequence of stacked blocks is allowable, then there is no need to specify possible sequences by hand. Checking if a specified path is correct may be automated.

With regard to intrinsic error correction of the placement of single-reference mathematical reasoning blocks in this example of one preferred embodiment: A new block's hypothesis should match a preceding block's conclusion or an error results. With an example of one preferred embodiment of multi-reference mathematical reasoning blocks: The multiple elements of a new block's hypothesis should match a selection of blocks preceding its placement in the work area.

With regard to intrinsic error correction of algebraic inputs to a preferred embodiment of these blocks: A person may automate the production of all the possible sequences in which evaluation rules or solution rules may be used as an algebraic expression is evaluated/solved (including the incorrect evaluation and solution rules students are prone to employ), then each of those alternative possibilities may be converted into a regular expression and that expression compared to a user's input to determine if there is a match.

Figure 7:
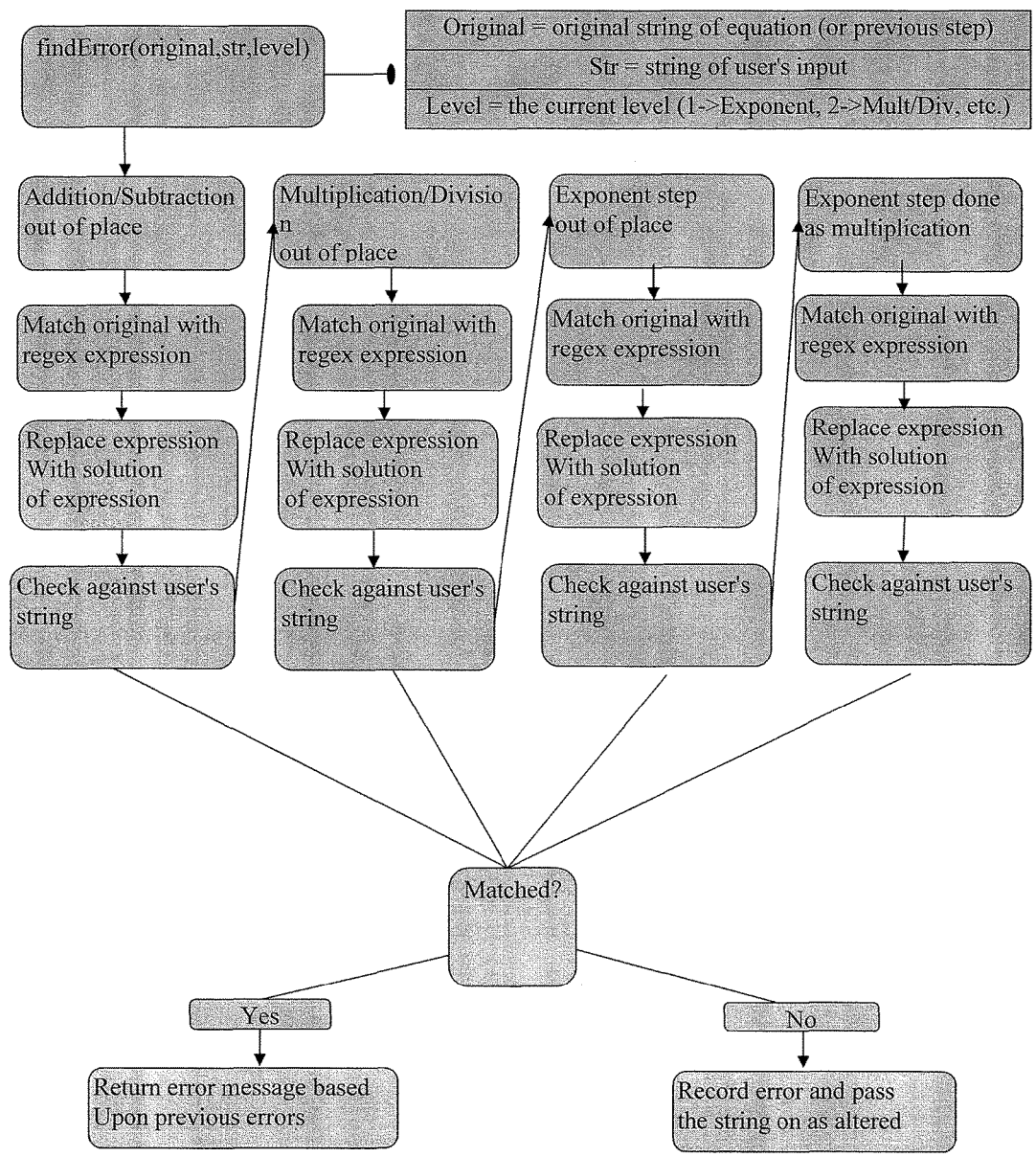
FIG. 7 charts the logic used for intrinsic lesson error checking in one embodiment of the disclosure.

In a preferred embodiment, as long as the automatic generation of possible ways of evaluating/solving an expression takes place in an organized fashion, then the various branches of the combinatoric paths that describes those combinations may be paired with the type of error that will produce the branches on that portion of the tree. This allows automated error checking for algebraic expressions. See FIG. 7A for the flow chart of one example of a preferred embodiment of intrinsic error checking for the steps in simplification by the order of operations.

The method of intrinsic error correction is considerably less work-intensive when it is applied to a large batch of problems. But developing an intrinsic error checking algorithm for a small batch of problems may be prohibitively work-intensive. Therefore, a preferred embodiment of mathematical reasoning blocks may use a combination of both intrinsic and extrinsic error correction, the ratio between the two types of error correction varying with a number of design considerations that apply to a given exercise and reasoning block environment.

Finally, in some preferred embodiments of a mathematical reasoning block instructional system, error comments are seldom generated when the wrong logical reasoning block is dragged-and-dropped, regardless of whether extrinsic or intrinsic error location methods are used. In such embodiments, the system may tend to use error location merely to reject the acceptance of a block into the work area. An error may cause the block to appear to float back to the reasoning area from which it was dragged, with no error message appearing.

In one preferred embodiment, when a block already internal to the work area is selected by left or right-clicking, an erroneous click may also produces no response. In the case outlined in this and the preceding paragraph, this is because designers felt that the generation of too many error messages would have a negative impact on student motivation.

Error Detection with Graphical and Text Reasoning Blocks

The previous section covered extrinsic and intrinsic error correction for logical reasoning block placement and alphanumeric user entry in one preferred embodiment of logical reasoning blocks. One additional comment should be made before leaving the subject of extrinsic error correction. Graphical reasoning block input and text reasoning block input may generally be described by so few cases that a preferred embodiment of these types of reasoning blocks tends to use intrinsic error correction for detecting input errors and generating error messages associated with graphical and text reasoning blocks.

As in the section on logical reasoning blocks, comments for graphical reasoning blocks are not always generated when the wrong graphical reasoning block is dragged-and-dropped or clicked in an embodiment. However, some text reasoning blocks are used to indicate the choice of a particular mathematical model. In some embodiments, in this case it is pedagogically important to let users know when they have chosen an incorrect model for handling a given problem. In some such embodiments, when one text reasoning block should have been dropped instead of another, it is helpful for the system to display error messages in the problem presentation area.

Statistics

In one preferred embodiment of a mathematical reasoning block teaching system, two types of statistics may be collected and displayed—gross statistics and fine-grained statistics.

The gross statistics collected/generated for a given exercise may include but are not exclusive to: The percent of problems correct for the first problem set played, the number of problems correct for the most recent problem set, the number of problems attempted for the most recent set, the percent of problems correct for the most recent set, the running average of the last four percent-correct scores and the number of times an exercise was practiced.

One example of a preferred embodiment of a gross statistics display is FIG. 3 item 40, labeled: Initial Score; Last Score; Beginner (which may be shaded when a topic's four-run average ranges from 70-79%, Novice (which may be shaded when a four-run averages ranges 80% or higher, with no perfect scores) and Expert which may be shaded when a four-run average ranges 80% or higher, with at least one perfect score.

Note: In this example of one embodiment the running average of the last four percent-correct scores for an exercise equals the average of the last one, two or three scores if an exercise has been practiced only once, twice or three times. But other methods of computing this and other statistics may also be used in an embodiment of mathematical reasoning blocks.

FIG. 4 item 88 shows an example of an alternate display of gross statistics. In one possible embodiment, this display may be used to indicate the number of problems worked during a problem set and the amount of credit received for each problem—0, ¼, ½, ¾ or full credit. ¼ to ½ of a point may be lost for each procedural error made during the working of a problem. The standard problem set in this example of one preferred embodiment of this invention is ten problems long, each square in this display representing one problem.

The fine-grained statistics, on the other hand, move below the level of the gross number of problems worked or the gross percent of problems correct during a particular exercise or over a series of such exercises. Though they may take many forms, they look at the user's performance on specific sub-skills that are associated with a particular mathematical reasoning block or the total list of such skills associated with a sequence of reasoning blocks used to solve a problem as a whole.

For instance, in an example of a possible embodiment of a simplification by the order of operations exercise, three sub-skills might be involved: simplifying exponents, simplifying multiplications and divisions, and simplifying additions and subtractions. Because each of these skills may be represented by a mathematical reasoning block, the types and rates of errors a user makes when performing these skills may be tracked by a mathematical reasoning block system, in particular the finer-grained sub-skills associated with these errors may be tracked.

FIG. 8 is an example of one preferred embodiment of a fine-grained statistics overlay FIG. 2 item 70 that may appear immediately after a lesson is completed. Viewing the error arrays in FIG. 6b shows how the error checking arrays might relate to a fine-grained statistics overlay.

The list of potential errors in this display is not definitive because the types of fine-grained errors that may be tracked depend on the mathematical reasoning blocks used to form the foundation for solving problems and the style of working problems embodied by a given set of blocks. They also depend on the types of errors for which the system may be designed to check.

For instance, the designer might feel that not all exponents need to be simplified in the same step. Instead, the designer might feel that multiple mathematical reasoning blocks should be used for exponent simplification until all exponents have been accounted for. Though this might not eliminate error one (failing to work all exponents in a single step), it would alter the relative rate at which the error occurred in a mathematical reasoning block environment, changing the meaning of that particular statistic.

Whatever the choice of which fine-grained errors to track might be, in order to track them accurately error checking procedures may be coded to look for them in a preferred embodiment of a mathematical reasoning block system. In a preferred embodiment, each problem may also have a fine-grained, possible-error profile to allow counters to keep track of what errors where made verses what errors might have been made during the working of a problem. This is because not every problem contains the possibility of making every type of error.

For example, using the problem in FIG. 6b ($2 \cdot 4^2 + 3$) and the associated error statistics chart in FIG. 8 for such a simplification problem, the fine-grained, possible-error profile for the Exponent reasoning block in this problem may be encoded by the following array: exponentPossibleErrorsProfile[0, 1, 1, 0, 1, 1].

Aligning this array with the full list of fine-grained errors for the exponent block displayed in FIG. 8, the first 0 may be construed to mean this problem has only one exponent, so this error is not possible in this problem. This is because if one exponent is worked, all exponents have been completed for this problem. Failing to work the one exponent would mean that some other procedural mistake had been made.

Again, aligning the exponentPossibleErrorsProfile array with the full list of fine-grained errors for the exponent block displayed in FIG. 8, the second number in the array, 1, may be construed to mean that in this problem it is possible the user might err by multiplying the base by the exponent instead of raising the base to the exponent, and so on.

Other possible-error profile arrays for this example might be:

mdPossibleErrorsProfile[0,0,1,1,1] and
asPossibleErrorsProfile[0,1]

These error possibilities need not be encoded only by arrays, in other embodiments they may also be incorporated into sets of case statements or if-then statements that codify tests for these same decisions, where 1 is equivalent to true and 0 is equivalent to false.

A preferred embodiment of this system is able to provide a comprehensive, portrait of possible errors in a given subject (say pre-algebra) because once the most critical reasoning blocks and their associated skills/sub-skills/error-possibilities are introduced, they may be employed on most future problems, allowing a preferred embodiment of a mathematical reasoning block instructional system to track student performance and improvement on fine-grained skills over time.

EXAMPLES

Following are eight examples of how mathematical reasoning blocks may be used in various possible embodiments. The first two contrasting examples are simplified mathematical reasoning block environments, each involving only two blocks. These first two examples illustrate elementary instances of how the choice of axioms used in a reasoning block environment may shape the thinking of learners, even at the most rudimentary levels.

Example 1

In this example of one possible embodiment, a lesson overlay appears that presents written instructions and a video explanation of the skills the user will need to complete the upcoming problem set: In this problem set the user is directed to describe a sequence of events using positive and negative numbers. Once the lesson overlay is dismissed, the first problem is presented in the problem area of the lesson screen: Tommy finds five marbles on Monday. On Tuesday he looses two marbles. Write an expression that describes these events. See FIG. 9a.

The user is given a choice of three base-level reasoning blocks. When the Number reasoning block is selected, two secondary-level reasoning blocks specific to the embodiment in this example appear in the block reasoning area—a logical reasoning block titled Add and a second logical reasoning block titled Check. See FIG. 9b.

If the user drags the Check reasoning block into the work area, the system will refuse it at this point because the problem has not yet been worked. A preferred embodiment of the system presents no error message at this point because, as stated previously, too many error messages for reasoning blocks dropped in error might be disheartening to the user.

When the Add reasoning block is dragged and dropped into the work area, the block is accepted as the first block in the work area and an input text box appears beside it in a corresponding position, awaiting user input. See FIG. 9c.

Once a user inputs an attempted answer, the Check button can then be dragged into the work area. In this example, how the button behaves in the work area depends on data supplied in an explicit set of arrays.

problem[0]=["Tommy finds five marbles on Monday. On Tuesday he looses two marbles."]
answer[0]=["5+−2"];
add[0]=["5+2", "Is a loss represented by a positive number?"];
add[1]=["−2+5", "This sum is correct, but the order of the numbers is incorrect."];
add[2]=["5−2"], "Technically, there is no such thing as subtraction. Please use addition to expression your answer"];
add[3]=["other", You may have made a math or typing error. Please check your work."];

If the answer "5+−2" is entered, as shown in FIG. 9d, then the function necessary for processing these arrays would eliminate all spaces in the input and check it against answer [0] after converted it into a regular expression. The answer being correct, the program would accept the Check icon, display a message of "Correct!" and display a next problem button just below that. See FIG. 9e.

If the user's input fails to match answer[0], then the function necessary for processing these arrays, having eliminated all spaces in the input, would loop through the add[n] array, converting add[n][0] to its regular expression equivalent and comparing it to the user's modified input. When a match is found, the associated error message add[n][1] would appear in an error message box in the problem area, then the user would be given a second chance to provide the correct input.

One important item of note remains: The last array element in the preferred embodiment of a set of such arrays may function as a safety net, a sort of catch all in case the user makes an unusual error. That is the function of add[3].

Example 2

This example of one possible embodiment would begin just as the last example began, with the lesson overlay appearing then (when prompted by the user) moving to the lesson itself. The same first problem as in the last example is presented in the problem area of the lesson screen: Tommy finds five marbles on Monday. On Tuesday he looses two marbles. Write an expression that describes these events. See FIG. 10a.

The difference between these two examples is evident once the user selects the Number base-level reasoning block, causing the associated secondary-level reasoning blocks for this example of an environment to display a logical reasoning block titled Subtract and a second logical reasoning block titled Check. See FIG. 10b.

After dragging and dropping the Subtraction block from the block reasoning area into the work area, FIG. 10c, the user may enter the most intuitively obvious answer to this problem by using subtraction. In this case the student does not need to have knowledge of the fact that the addition of a negative number is the equivalent of subtraction.

If a user enters "5+−2" as an answer FIG. 10d, then when the user attempts to drag and drop the Check reasoning block into the work area, the drop fails and the block appears to return to the block reasoning area. See FIG. 10e.

As in the last problem, an explicit array of errors associated with this problem is then processed by a function until the appropriate error is discovered and displayed in a message box appearing in the problem area. See FIG. 10e.

problem[0]=["Tommy finds five marbles on Monday. On Tuesday he looses two marbles."]
answer[0]=["5−2"];
add[0]=["5+2", "Is a loss represented by a positive number?"];
add[1]=["−2+5", "This sum is correct, but the order of the numbers is incorrect."];
add[2]=["5+−2"], "Technically, this is correct. But please use the shortcut of subtraction to express your answer."];
add[3]=["other", You may have made a math or typing error. Please check your work."];

When the correct answer, "5−2," is entered, then the system responds to the drag and drop of the Check reasoning block by producing the display "Correct!" The system also displays a next problem button to allow the user to advance to the next problem. See FIG. 10f.

These two example problems highlight types of choices a designer has when picking the reasoning blocks intended to characterize working in a given reasoning block system.

The examples also highlight the degree to which the different choices of axioms, theorems and procedures used to construct an embodiment of a mathematical reasoning block system directly affect the underlying reasoning/understanding students must use to solve problems by controlling the pallet of choices students have during the solution of a problem.

It is easy to solve a problem when unlimited choices and resources are at hand. Real problem solving begins when a person is confronted with limited choices/resources but also the pressing demand that the required task should still be accomplished—which is the normal state of human affairs.

The next example is an order of operations problem, using screen shots from an online, preferred embodiment of this invention for teaching pre-algebra or algebra.

Example 3

Figure 11A:
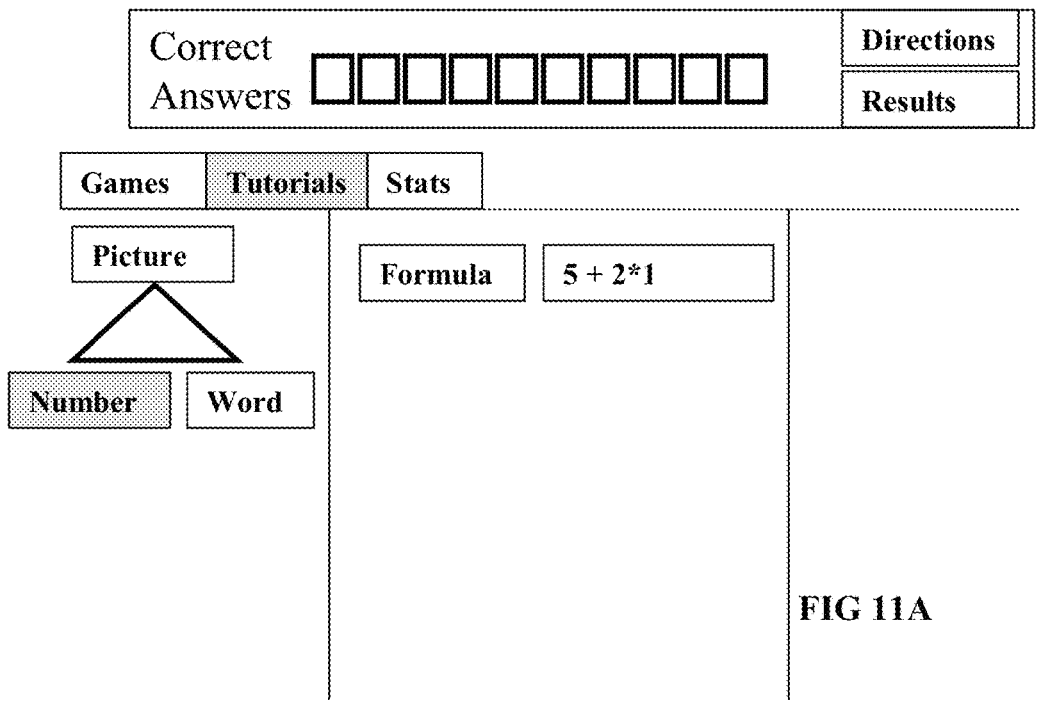

This example of one possible embodiment begins with a lesson overlay. Once the lesson overlay is dismissed the first problem is presented in the work area of the lesson screen. In this case, 5+2·1 must be simplified. See FIG. 11a.

Figure 11B:
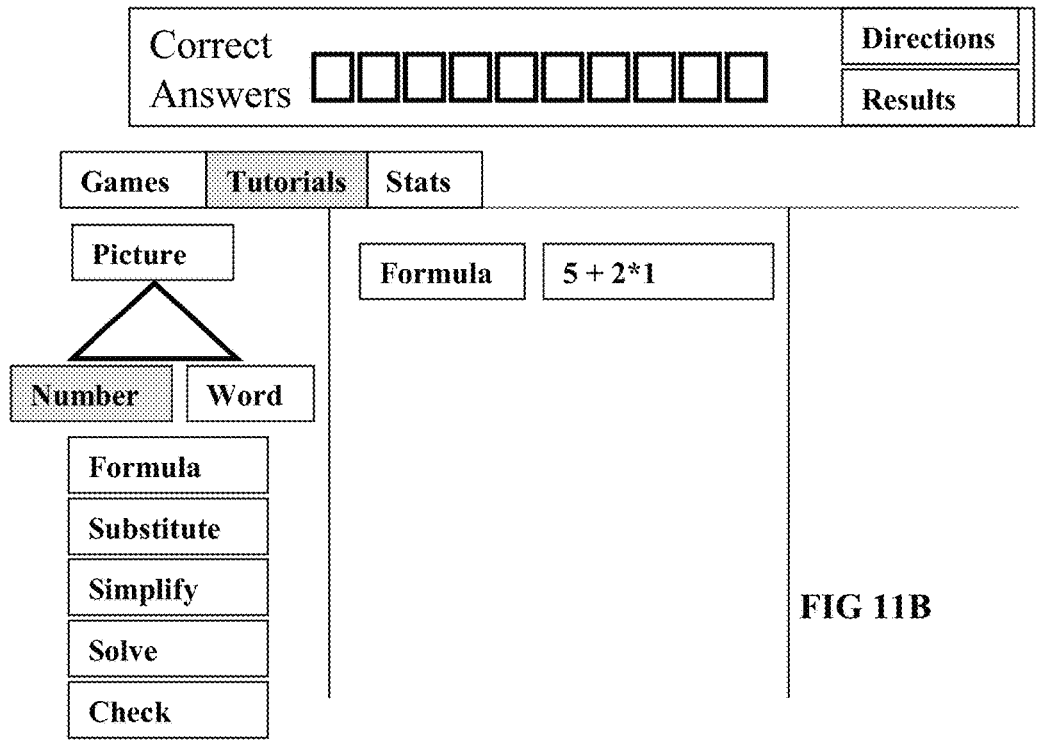

Here, a numeric expression is at the heart of the problem, so the user may begin by selecting the base-level button titled Number. This causes five secondary-level blocks to be displayed, one of which is the Simplify block. See FIG. 11b.

In one possible embodiment, if the Simplify block is selected, then a set of tertiary blocks may be displayed, each tertiary block indicating one of the steps necessary for simplifying an algebraic expression. In one embodiment of this invention the blocks might represent the procedures for simplifying Parentheses, Exponents, Multiplication, Division, Addition and Subtraction—the traditional PEMDAS procedures taught in most schools across the United States.

In another possible embodiment, selecting the Simplify block may cause no change in the blocks displayed in the block reasoning area. Instead, the Simplify block may be dragged into the work with no overt change in its title at all. The system would recognize what specific step of the simplification process the user is on, but the system would give no overt clue as to what that step might be. Such an embodiment might be desired in certain testing situations.

Figure 11C:
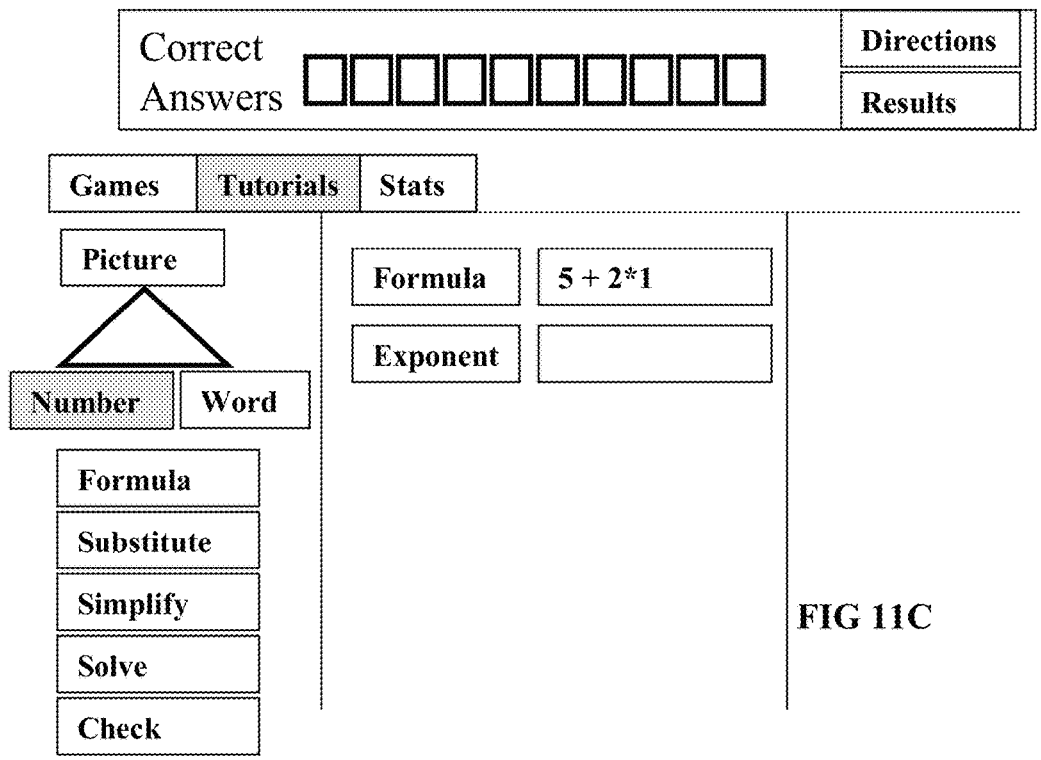

In this example of a preferred embodiment, no tertiary blocks are displayed when the Simplify block is selected. But when a Simplify block is dragged and dropped into the work area it automatically changes to either an Exponent FIG. 11c, Mult/Div or Add/Subt button. This selection of blocks and the method of display are stylistic and pedagogical choices.

Stylistically, the choice not to use a tertiary, PEMDAS block set in this example of an embodiment has to do with the desire to speed up and simplify the work flow. Pedagogically, the choice has to do with the desire to avoid certain errors in student understanding that tend to result when the PEMDAS procedures are used.

Figure 11D:
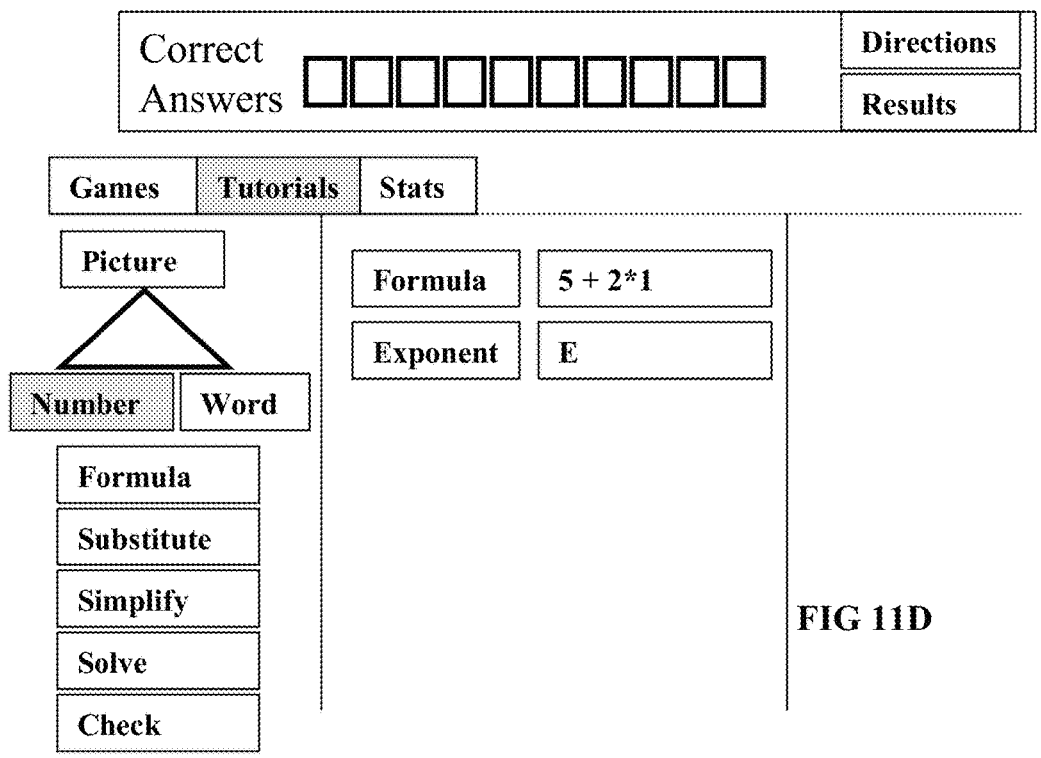

Once the first Simplify block is dropped, the user might then type in a capital or small E FIG. 11d. In this example of an embodiment, this arrangement is available at every step of a problem where no operations are represented. In a problem absent multiplications and divisions, M/D is required as an input. In problems where no additions or subtractions are present, A/D is required as an input. This arrangement is meant to ensure users are always explicitly thinking about all three simplification steps, even if some of those steps do not require explicit work to be shown.

Figure 11E:
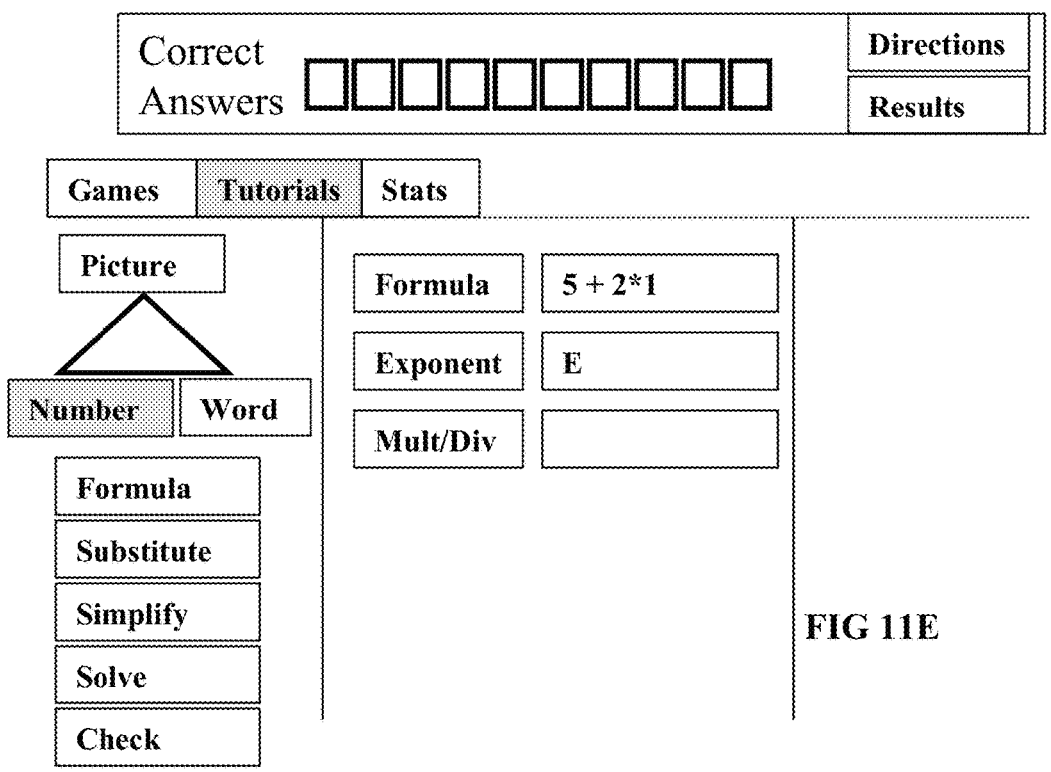

When the next Simplify block is selected, dragged and dropped into the work area, the system initiates a check of the user's input in the last text area. The system checks this answer against either an implicitly determined (answer generated by a function) or against an explicitly determined answer for correctness. In this case the answer is correct, so the block drops, and the system stacks it in the work area. Once dropped, the block then displays the title of the next procedure in the simplification process, which in this case is Mult/Div. See FIG. 11e.

Figure 11F:
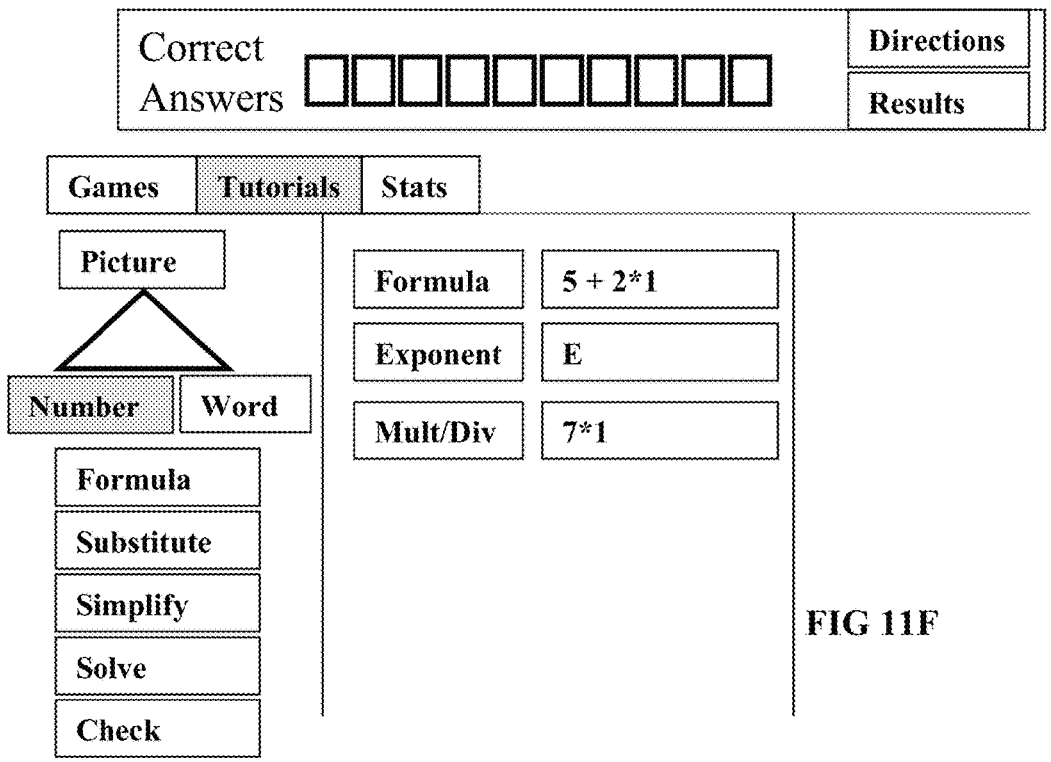

The user might then type 7.1 into the Mult/Div block's text area. See FIG. 11f. When the next Simplify block is selected, dragged and dropped into the work area, the system once again initiates an explicit or implicit check of the user's input in the last text area. In this example, the user has made an error typical of many pre-algebra students—simplifying a problem from left to right, as if reading an English sentence. When the user attempts to drag the next Simplify block into the work area, the system flags the error and displays an error block with an error message in the problem presentation area. See FIG. 11g.

Figure 11I:
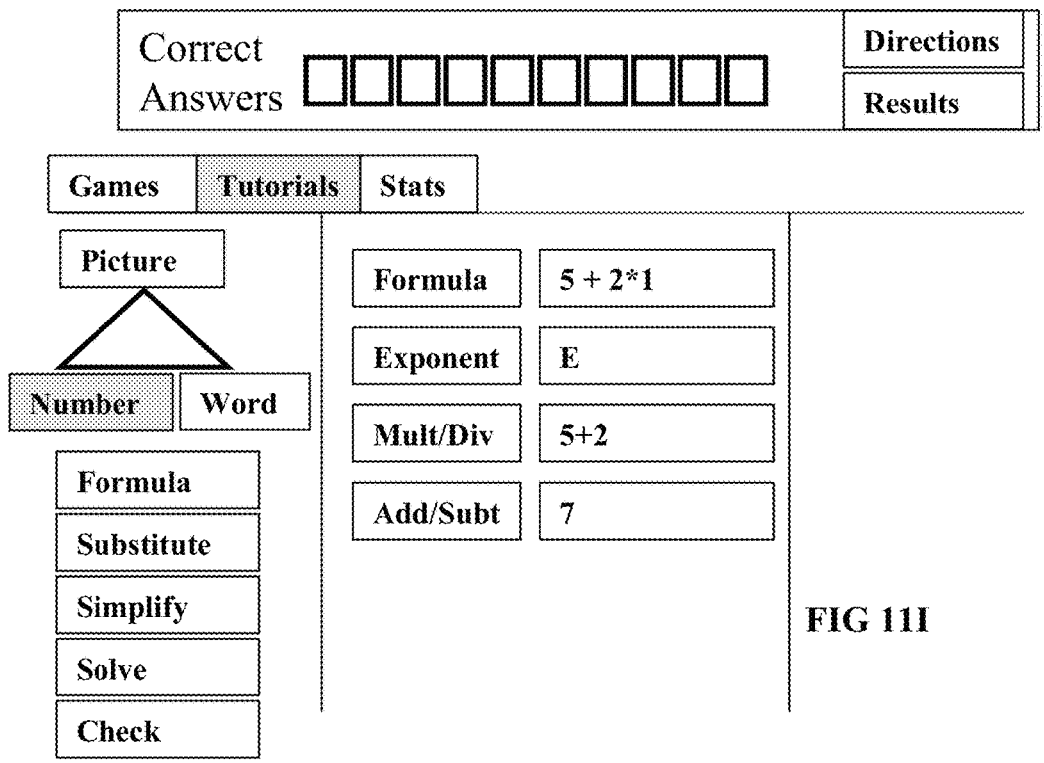
Figure 11J:
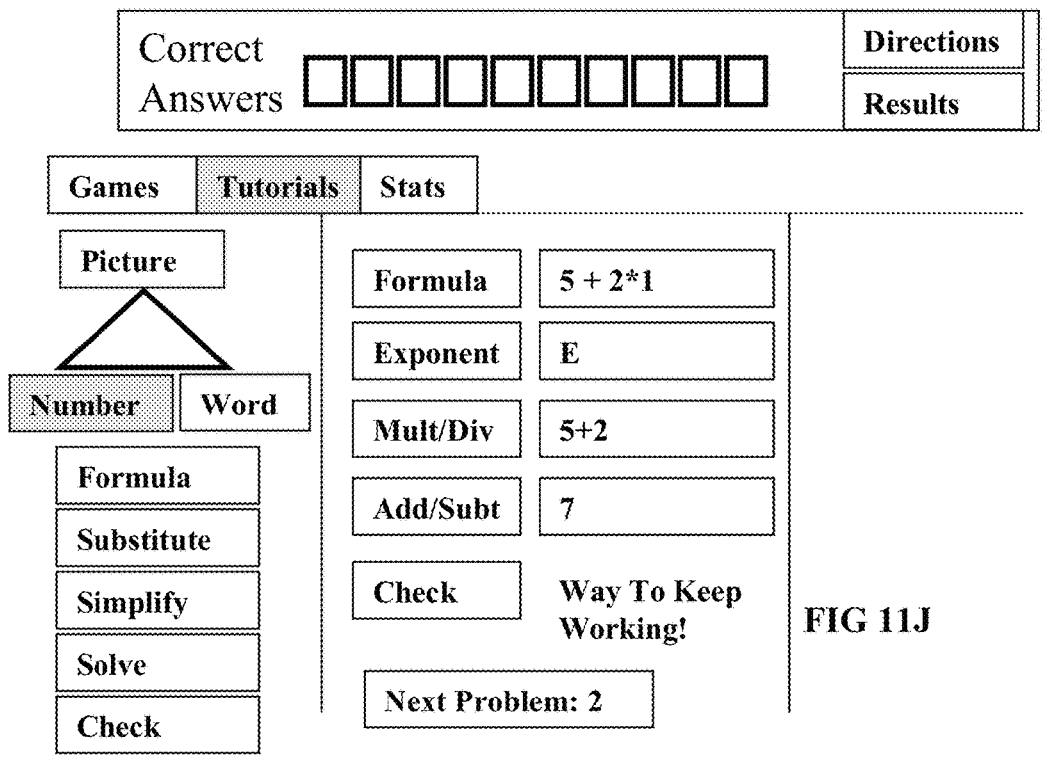

In this example of an embodiment, the system allows the user to alter his or her first answer or enter a completely new answer in the text area of the block that is currently active. In this case, the user alters the answer to 5+2. See FIG. 11h. When the next Simplify block is selected, dragged and dropped into the work area, again the system initiates an error check. Because the answer is now correct, the previous error message disappears and the block drops and displays Add/Subt along with a text entry area, where the user then enters a 7. See FIG. 11i.

The user may now attempt to drag and drop a Check block. Because the answer in this example is correct but had one error along the way, the check block drops and displays the message Way to keep working! along with a next problem button, which will bring the user to the next problem in the problem set when selected. The first block in the statistics area also displays ¾ to indicate that one error was made during the simplification of this first problem, causing a deduction of ¼ of a point.

The next example of an embodiment illustrates how selecting previous blocks placed in the work area or how selecting portions of previous blocks placed in the work area can be used in conjunction with the dragging and dropping of mathematical reasoning blocks to shape how the blocks work in a preferred embodiment of this invention.

Example 4

Figure 12A:
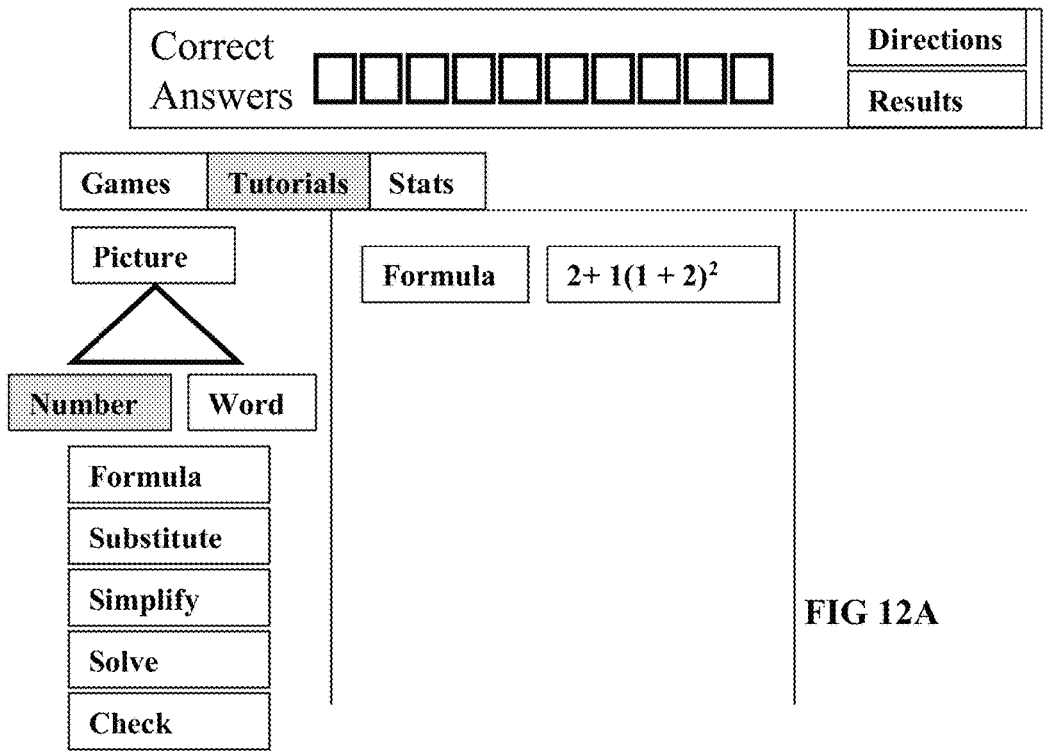
FIG. 12A-12J show screenshots of a lesson on simplification by the order of operations with parentheses based on one embodiment of the disclosure.

This example of an embodiment begins with a lesson overlay. Once this overlay is dismissed, the first problem is presented in the work area. In this case, the problem is to simplify the expression $2+1(1+2^2)$. See FIG. 12a.

Figure 12B:
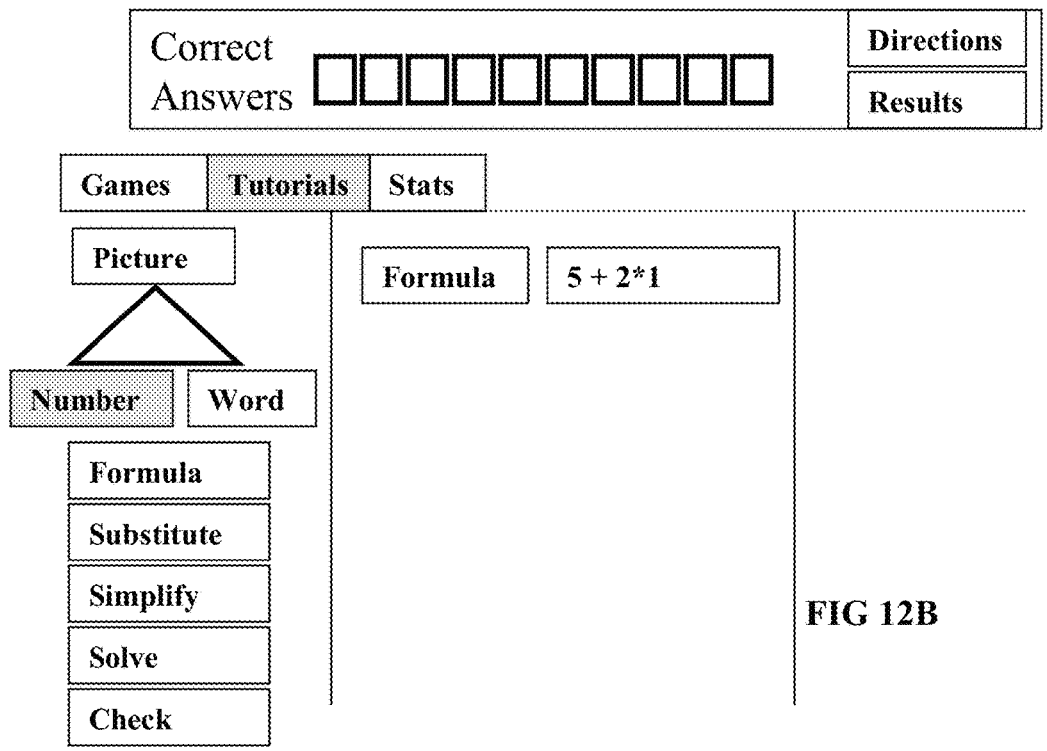

In this example of an embodiment, the base-level Number block may be selected to display the selection of secondary-level number blocks to be used in the simplification process. See FIG. 12b.

Figure 12C:
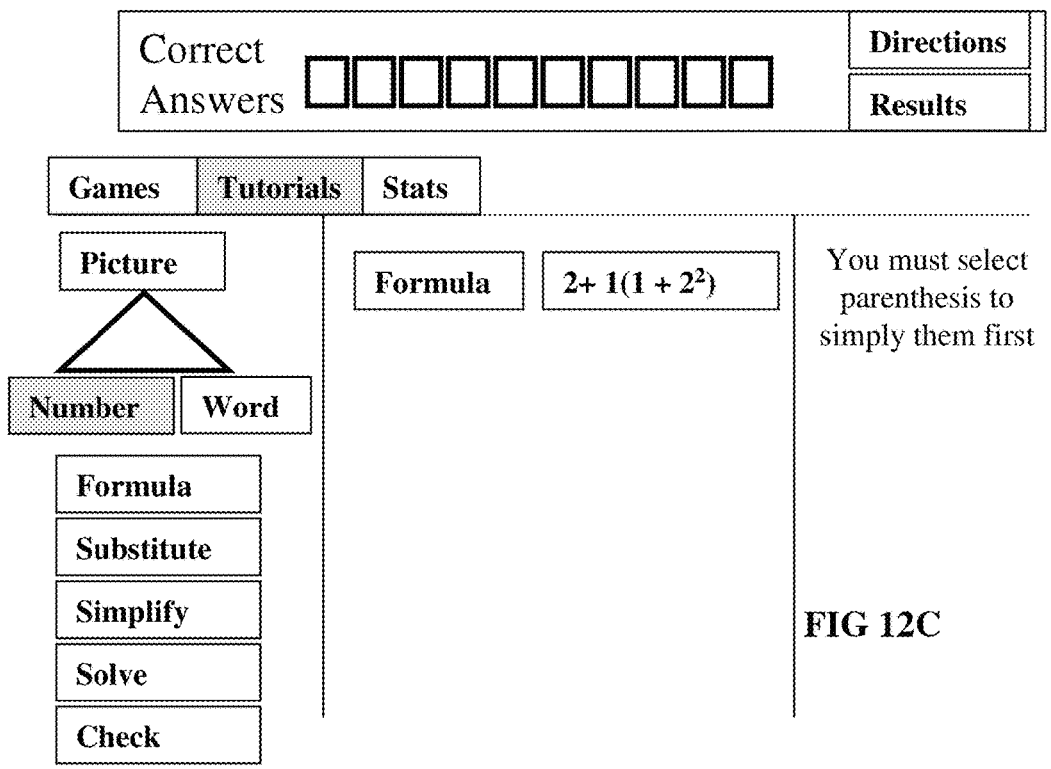

If the user then proceeds to drag a simplification block into the work area at this point (as in example 3), an error message results: "You must select parentheses to simplify them first." See FIG. 12c.

Figure 12D:
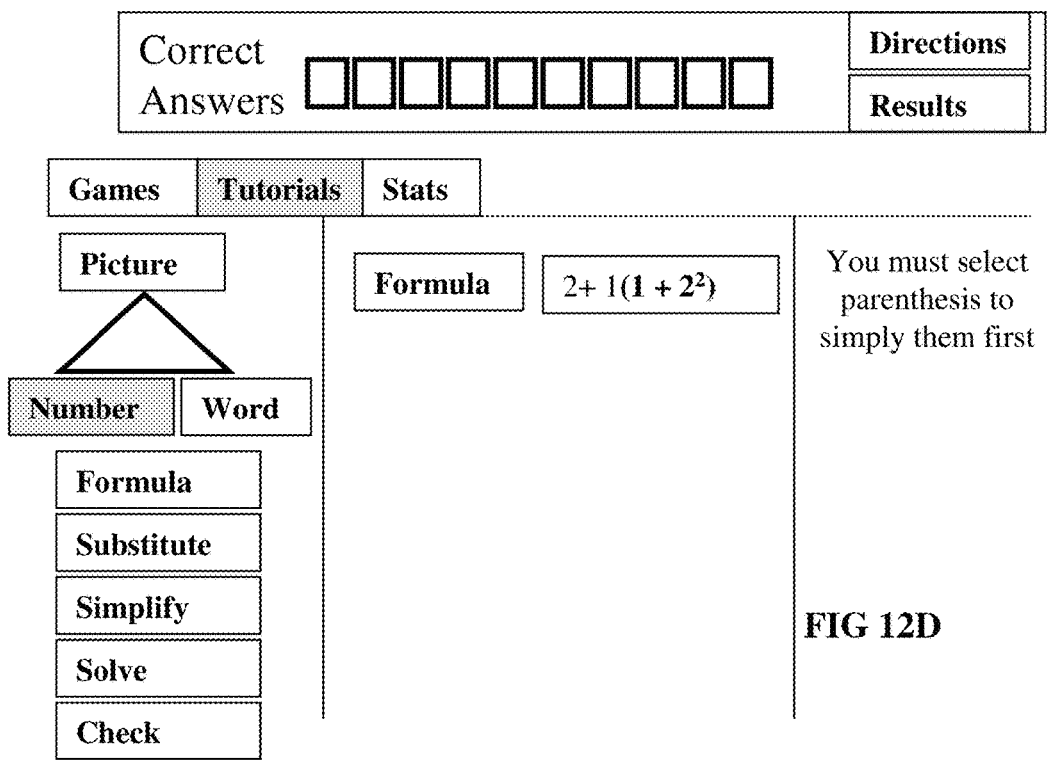

This is because in this example of an embodiment, rather than use a separate parentheses block to mediate the simplification of parentheses, the program requires that all parentheses be selected and then simplified using three basic simplification blocks: Exponents, Mult/Div and Add/Subt. Thus, in this example of an embodiment the parentheses should be selected before initiating the drag and drop of a Simplify block. See FIG. 12d.

Figure 12E:
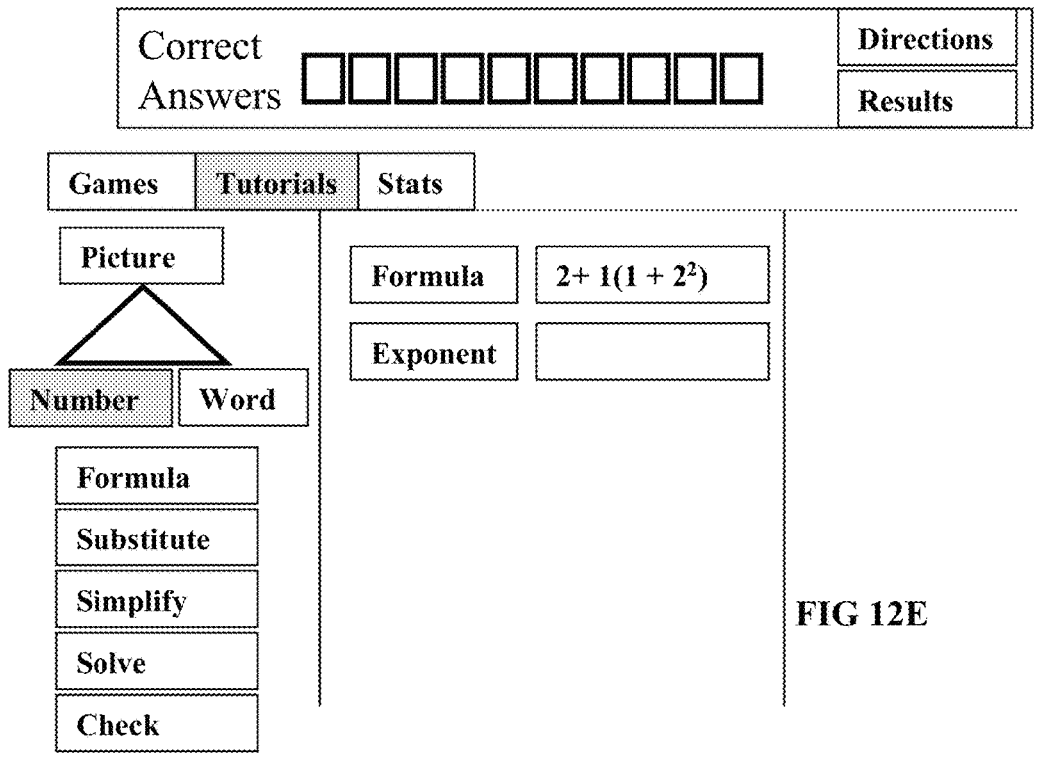
Figure 12F:
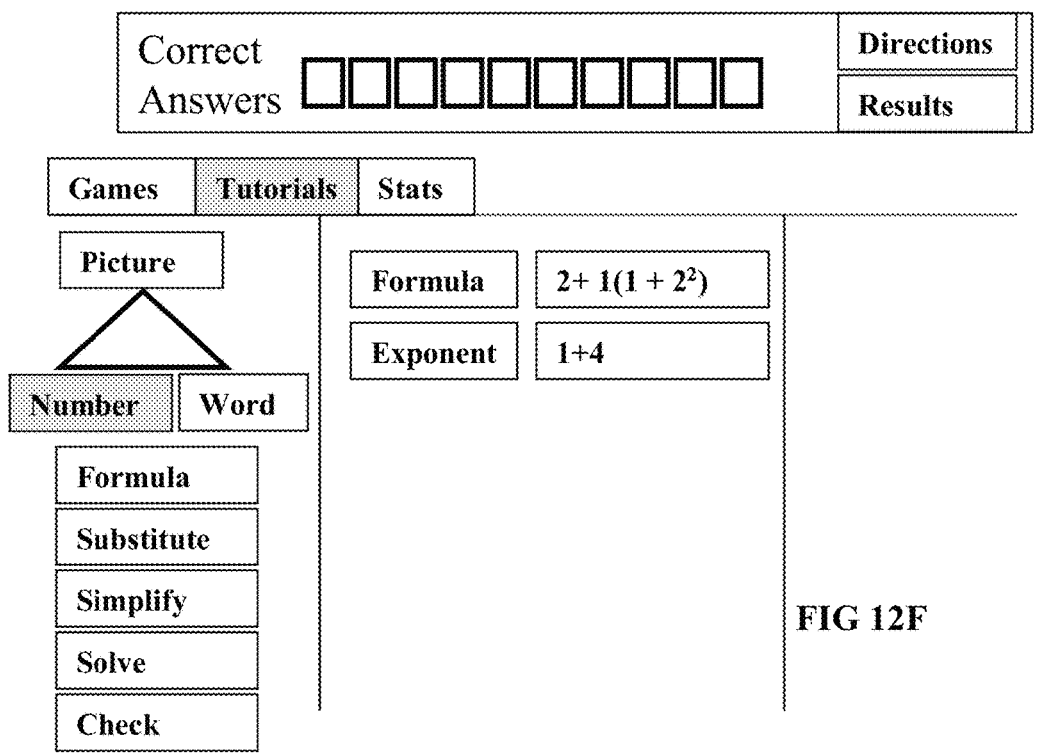
Figure 12G:
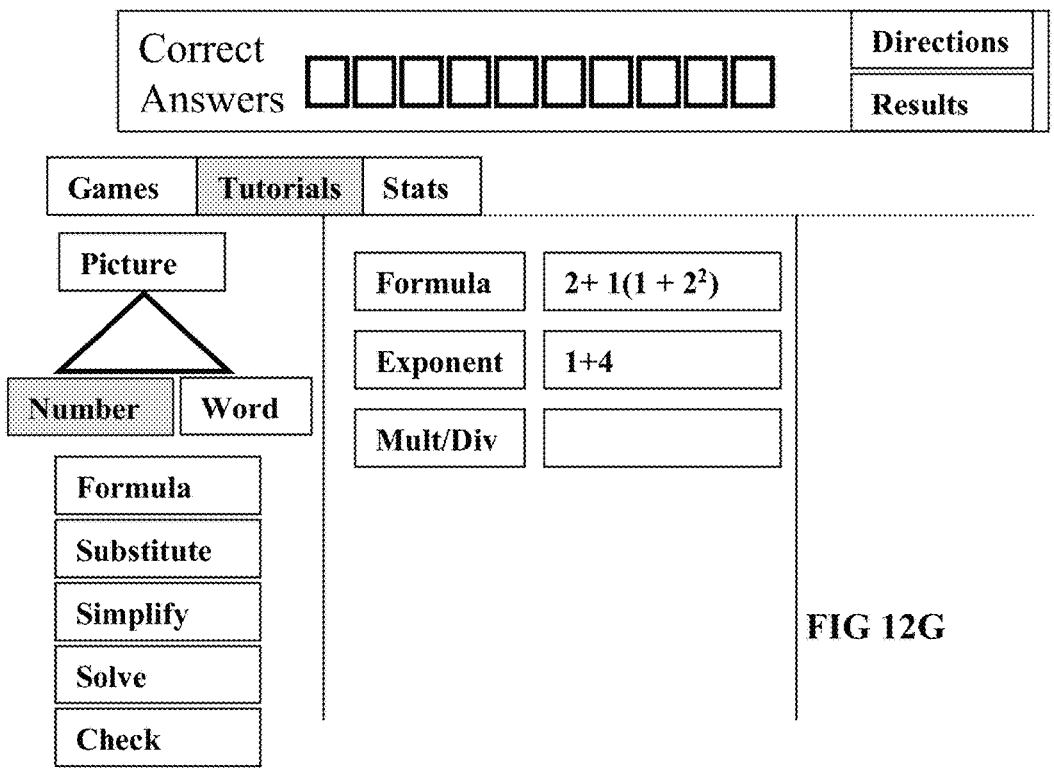
Figure 12H:
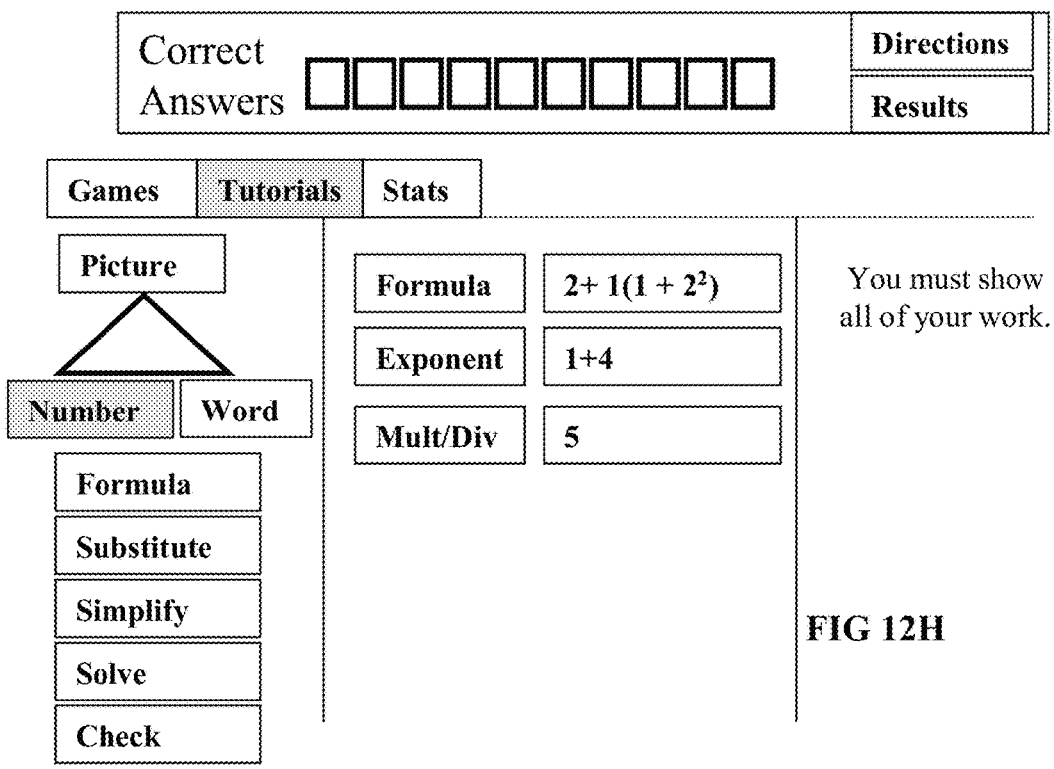

After a parentheses is selected and the subsequent drag and drop of a Simplify block is accomplished, the Simplify block changes into an Exponent block and a text input element appears beside the block, below the parentheses to be simplified in the work area. See FIG. 12e. In this example of an embodiment, the location of the selection is used by the system to determine the location of the text input element that appears. The sequence of simplifications that takes place at this point in the example applies only to the contents of the parenthesis selected. For instance, in this example the expression $1+2^2$ is simplified to 1+4 in the exponent step. See FIG. 12f. Then another Simplify block is selected, dragged and dropped into the work area. See FIG. 12g. If an errant entry is then made in the block, and a subsequent Simplify block is selected dragged and dropped, an error message appears in the problem presentation area. See FIG. 12h.

Figure 12I:
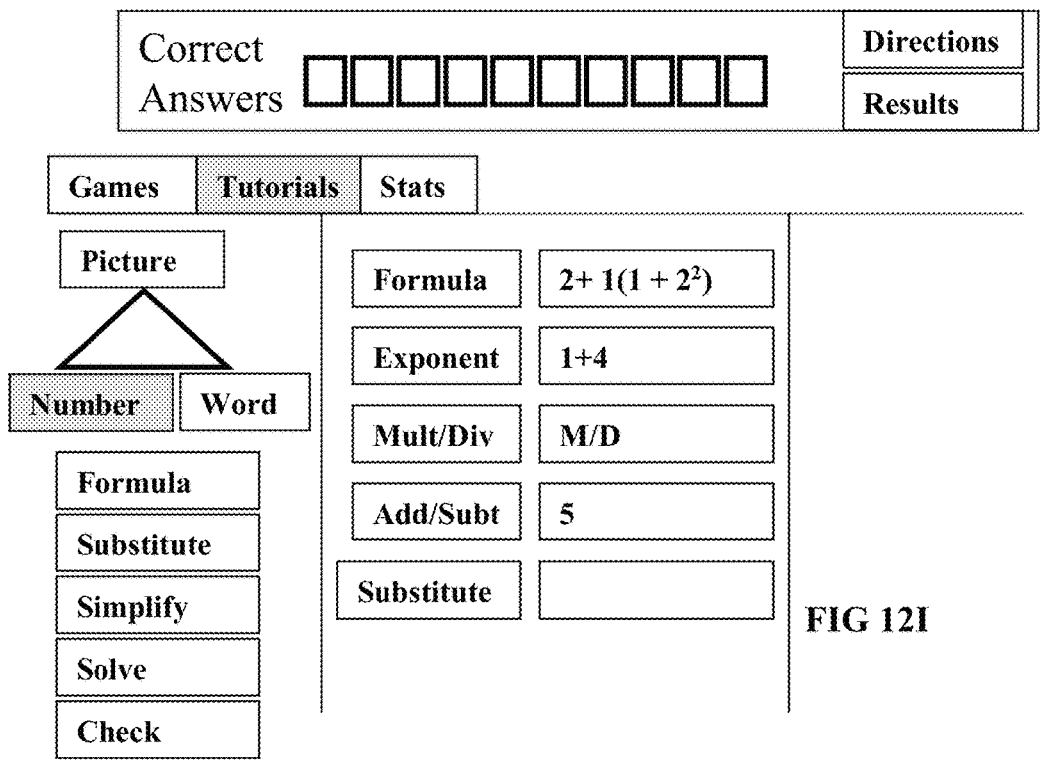
Figure 12J:
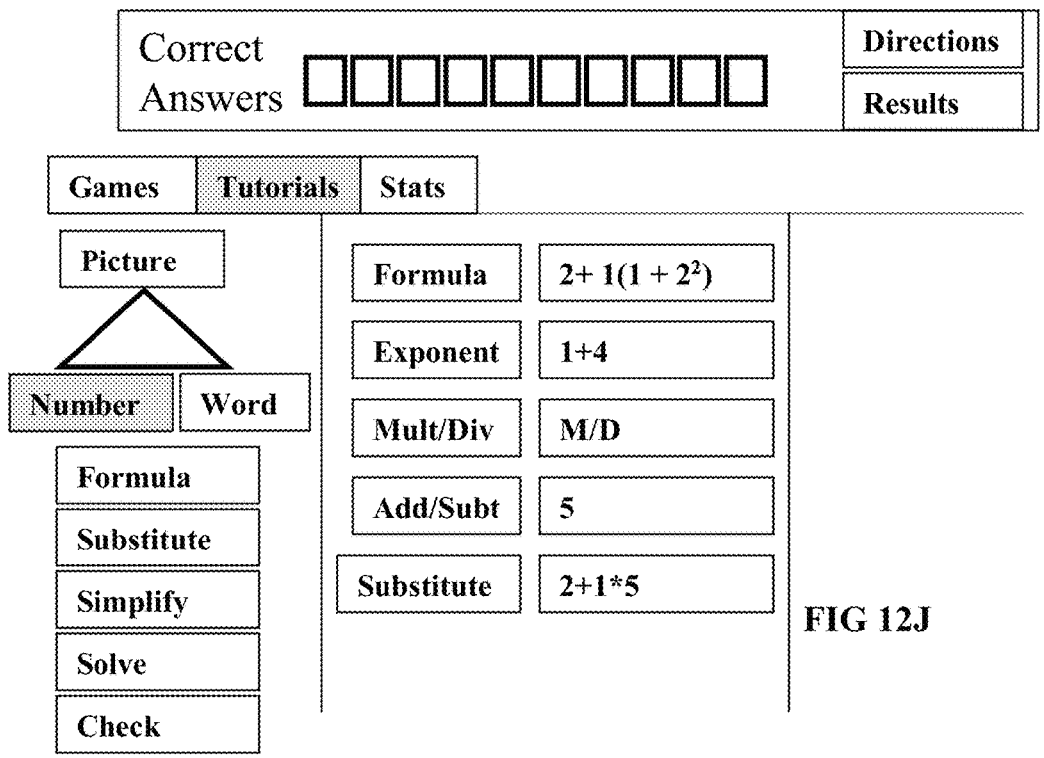

This sequence of steps—with the potential for errors at each step—continues until all three steps in the simplification process are correctly completed. At that point, a substitution block is dropped into the work area. See FIG. 12i. In this example of a possible embodiment, the block is used to reconstruct the problem for the final sequence of three simplifications by taking the original problem $2+1(1+2^2)$ and substituting the 5 in for $(1+2^2)$ to yield the expression 2+1·5. See FIG. 12j.

From that point onwards, the simplification of this expression parallels the simplification of expressions described in example 3 until the problem is complete.

This example of an embodiment illustrates one of several ways the selection of previously dropped reasoning blocks or the selection of elements in previously dropped reasoning blocks may be used to shape the way reasoning blocks work in a preferred embodiment of this invention.

The next example illustrates how text reasoning blocks can be integrated into a preferred embodiment of this invention for teaching beginning secondary-school math students how to work with words problems.

Example 5

This example of an embodiment begins with a lesson overlay. In this example the directions in the overlay mention that all formulas in this exercise should use the variable n for the first number and s for the second number. Once the lesson overlay is dismissed, the system presents the first problem in the problem presentation area: "Four times a number less three is a second number. If the first number is six, what is the second number?" See FIG. 13a.

The initial aspects of this problem are word-intensive; therefore, the user should begin by selecting the base-level button titled Words. In this example of a preferred embodiment, the five blocks that appear are: Direct Trans., Given Form., Standard, SingleChange and Mult-Change problems. See FIG. 13b.

Other embodiments of this invention might chose different constituent elements for secondary-level text reasoning block sets, for instance sets including Consecutive Integer blocks, Distance-Rate blocks, Percent blocks, etc. Regardless of the constituent blocks chosen, the blocks should be general enough in their functionality to allow for the handling of large numbers of different word problem types with as small a number of secondary-level elements as possible.

Choosing from among the set of secondary-level reasoning blocks in this example of an embodiment of this invention, the user selects, drags and drops a Direct Trans. block into the work area. See FIG. 13c.

After an initial reading of a word problem, many students will falter because they are unable to pick out the key words that will eventually be translated into the equations necessary to solve the word problem. Therefore, one embodiment of text reasoning blocks may require that students identify and input the various phrases from the word problem that will eventually translate into formulas or parts of formulas. To begin, the phrase that represents the main formula may be dealt with. Then all phrases that result in subordinate equations may be dealt with.

The text input for a text reasoning block may be entered in various ways. A preferred embodiment may allow automatic pasting of the required input into the text area of a text reasoning block when the user selects the text from the problem display area and then mouses-up—in this case the user selecting the primary phrase "Four times a number less three is a second number" and mousing-up. See FIG. 13d.

A second mathematical reasoning block may now be dragged into the text area. In this example of an embodiment the second reasoning block will trigger the error checking procedures necessary to check if the text input in FIG. 13d is correct. Upon the attempted dropping of this second reasoning block into the work area, in one example of an embodiment the system may parse the problem stored in memory in an array element such as the following:

problemArray[0]=["@@a2 times a number less b2 is a second number@@. If @the first number is n2@, what is the second number?", "a1·n−b1=s", "n=n1"], where a1=4, a2="Four", b1=3, b2="three", n1=6 and n2="six".

The system may use a function to search for the primary phrase designated by @@ . . . @@. The system checks to see if the string between the double @'s matches the string just entered in the text input area of the Direct Trans. block. Because it does, in this example the next mathematical reasoning block would be allowed to drop into the work area.

Because there is a subordinate text phrase indicating a subordinate equation, this example of an embodiment requires that another Direct Trans. block be dragged by the user into the work area. This second block presents a text input area that appears dark gray when the block is dropped. Dark grey is a highlight color meant to differentiate the secondary equation from the primary equation in this case. See FIG. 13e.

Having determined that the phrase "the first number is six" represents a subordinate equation in this example, the user chooses to type this short phrase into the text area. See FIG. 13f. When the user attempts to drop the next block, the action again initiates the error checking procedures associated with problemArray[0], causing the system to search for a subordinate phrase bracketed by single @'s. It then compares this phrase to the user input, which in this case matches the bracketed phrase.

The next block the system might accept for dropping may be a formula block (displayed after the base-level Number block is selected) because all direct translation problems are composed of phrases that translate directly into mathematical formulas. This is the first example where a formula block has been illustrated dropping into the work area, therefore the possibilities surrounding such a drop should be discussed in detail.

In most instances where a Formula block may be dropped into the work area, a primary formula and one or more subordinate formulas are involved. The question then becomes, how should they be handled?

In one embodiment, the system may require that one Formula block (with its associated text input area subsequently displayed in full) be dropped into the work area for each equation that will result from the translation of each of the phrases entered in the Direct Trans. blocks. But this is an inefficient use of screen space, especially if a mathematical reasoning block system is running on a hand-held device.

In another embodiment, one Formula block may be dropped into the work area to accept a formula translation of the main text phrase. When that block is left-clicked, the system may truncate the text input area of the Formula block so that it extends only far enough to display the full primary formula. The remainder of the line may become a second, highlighted input area ready to accept input of the first subordinate formula.

Another left-click of the Formula block may cause a similar truncating of the text input area, allowing for the full display of this first subordinate formula and the appearance of a highlighted text input area for the input of a second subordinate formula. And so on until all appropriate text phrases have been translated into their equivalent equations/formulas. Our design experience shows that such an embodiment generally allows easy handling of one primary equation and up to three subordinate equations.

A preferred embodiment of this system, automates the second alternative just discussed. After all the required Direct Trans. blocks have been correctly filled in with their primary and subordinate text phrases, dropping a Formula block into the work area may cause the block to display so that it is automatically divided into an appropriate number of appropriately sized text input areas—one text input area for the main formula and highlighted text input areas for whatever subordinate formulas remain (up to three subordinate formulas). See FIG. 13g.

The user may then enter the translation of each of the associated Direct Trans. block phrases into the appropriate portions of the Formula blocks now subdivided into text input areas, in this case 4n−3=s into the primary formula input area and n=6 into the subordinate formula input area. See FIG. 13h.

In the next step of the problem, the subordinate formula may be substituted into the primary formula. Therefore the user selects a Substitution block, drags and drops it into the work area (FIG. 13I), where the appropriate substitution is then entered. See FIG. 13j.

From that point onward, the problem is simplified in three steps and checked by using the Simplify and Check blocks, in the manner discussed in earlier examples, until the problem is complete.

The next example illustrates the use of some of the graphical reasoning blocks in one possible embodiment of this invention for teaching pre-algebra, algebra or other courses.

Example 6

Figure 14A:
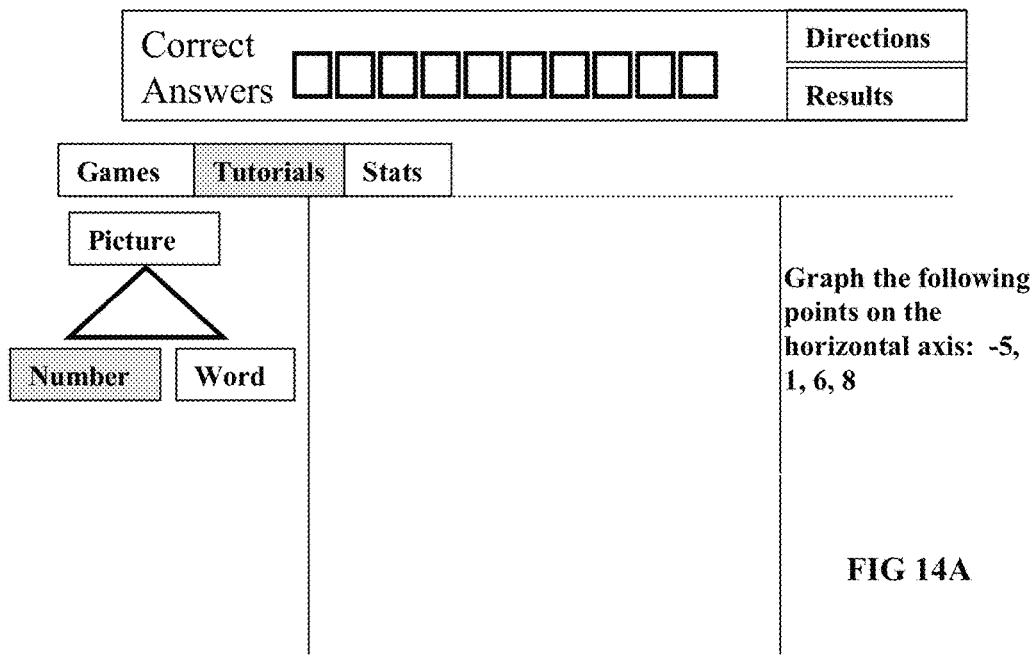

This example of an embodiment begins with a lesson overlay. Once the lesson overlay is dismissed, the first problem is presented in the problem presentation area: Graph the following points on the horizontal axis: −5, 1, 6, 8. See FIG. 14a.

Figure 14B:
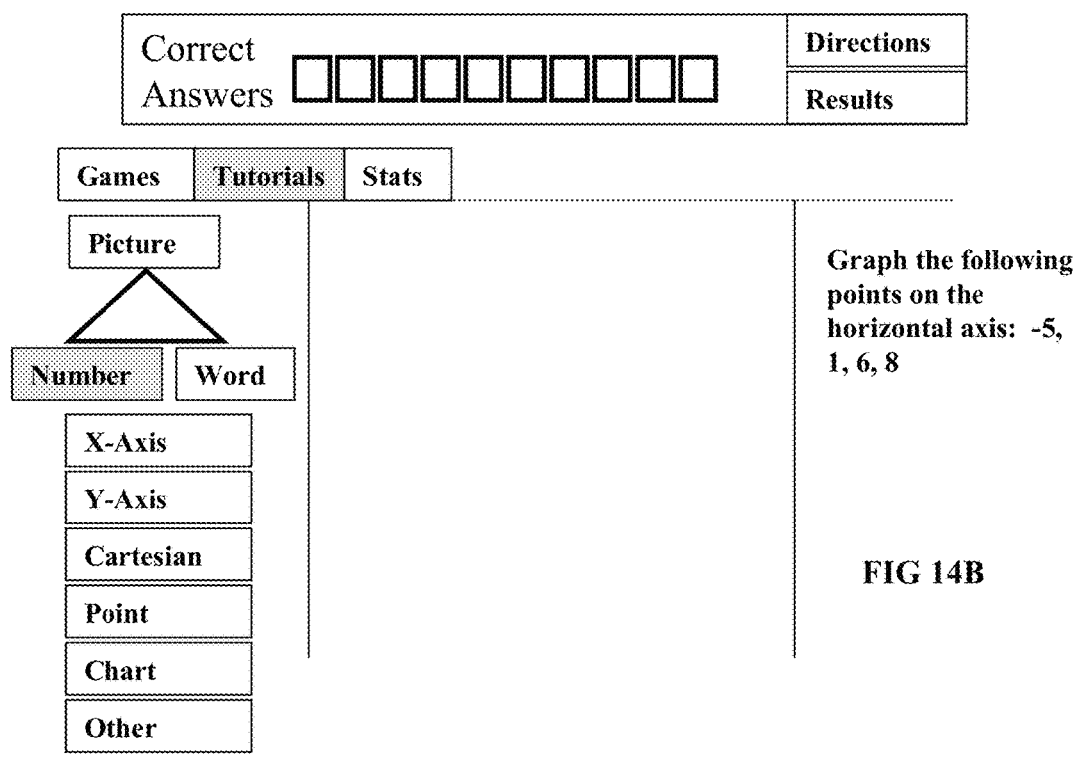

This problem primarily involves graphing, so the user may begin by selecting the base-level button titled Picture. This causes six secondary-level blocks to be displayed, one of which is the x-axis block. See FIG. 14b.

Figures 14C, 14D:
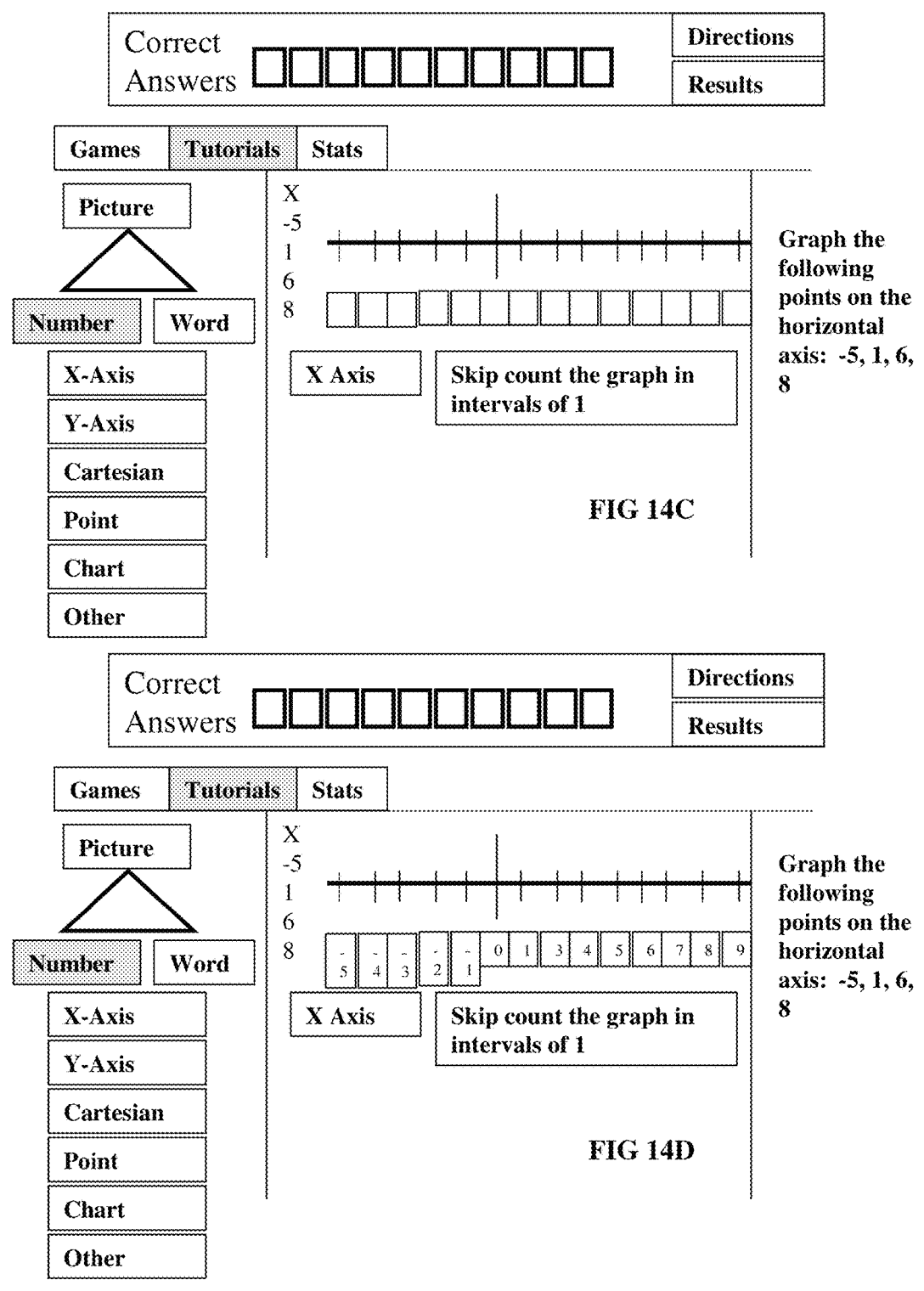

Selecting, dragging and dropping this x-axis block into the work area causes the system to display an x-axis graph and a chart of the problem's x-coordinates to the left of the graph. Also, a set of text boxes is displayed below the graph, along with directions to fill in the blocks by skip counting. See FIG. 14c.

If this was a paper-based graph, the student would be required to label the increments on the axis. In this example of an embodiment the input boxes of the graphical reasoning block allow the user to label the graph in the same way. See FIG. 14d.

After the graph has been labeled in this example of one possible embodiment, the chart elements must be changed to draggable, point elements before the elements can be graphed. Thus, the user should select, drag and drop the Point block, which causes the chart elements of the graphical reasoning block to be changed to point elements in preparation for dragging.

The drag and drop of the Point block also causes the error checking routines to operate on the input elements of this graphical reasoning block. The system compares the contents of the input boxes of the x-axis block with the expected coordinates for those boxes. If any of the boxes fail to match the expected input, then boxes with errant input have their borders highlighted in red.

Figures 14E, 14F:
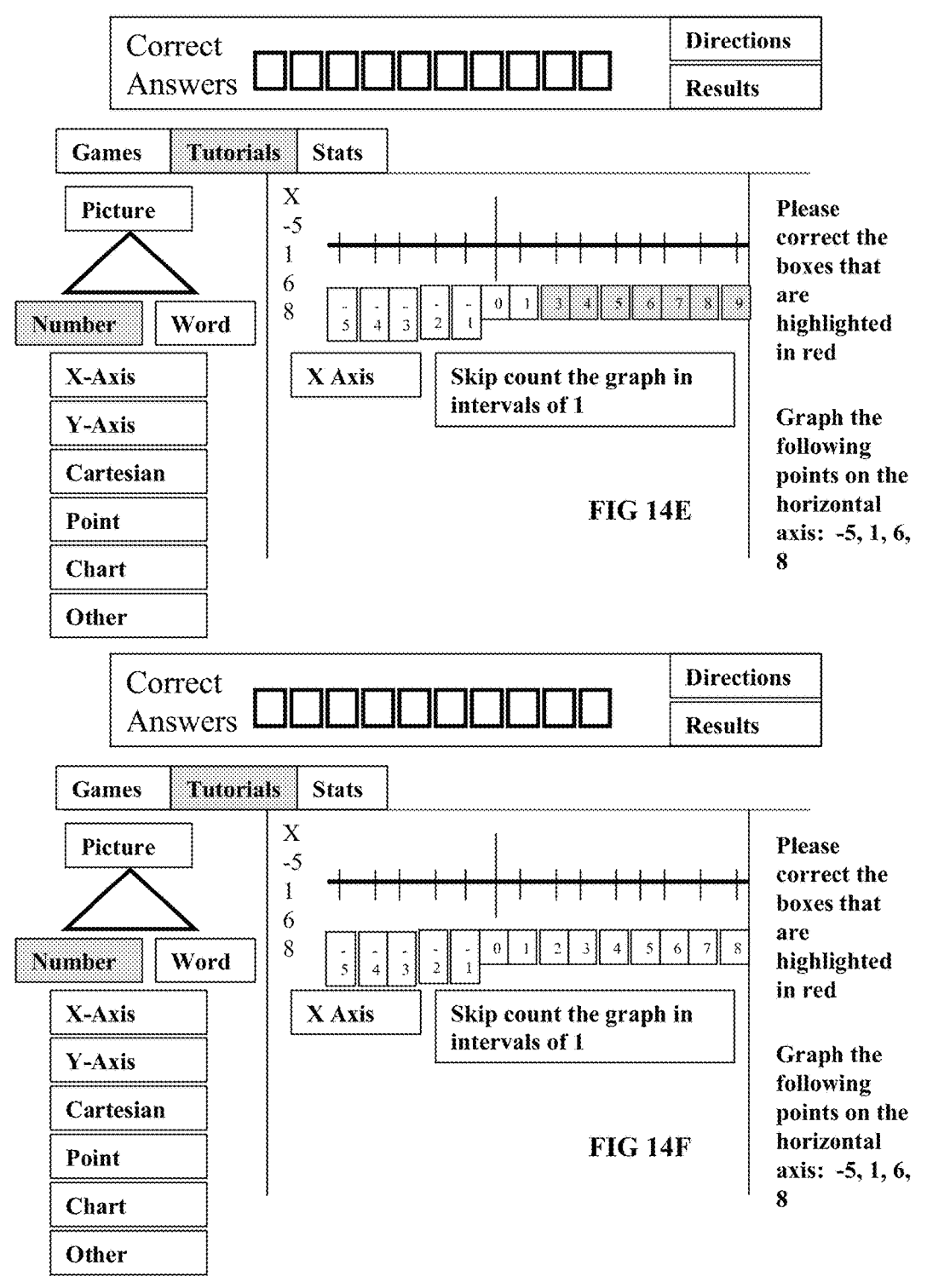

In this example, the expected interval is explicitly specified as one and the expected coordinates to be entered in the input boxes are generated by a function based on an increment of one. Because there is a counting error after the coordinate labeled one in the graphical reasoning block, all the blocks after that receive a red border, the Point block fails to drop, and an error message appears in the problem presentation area. See FIG. 14e.

Figures 14G, 14H:
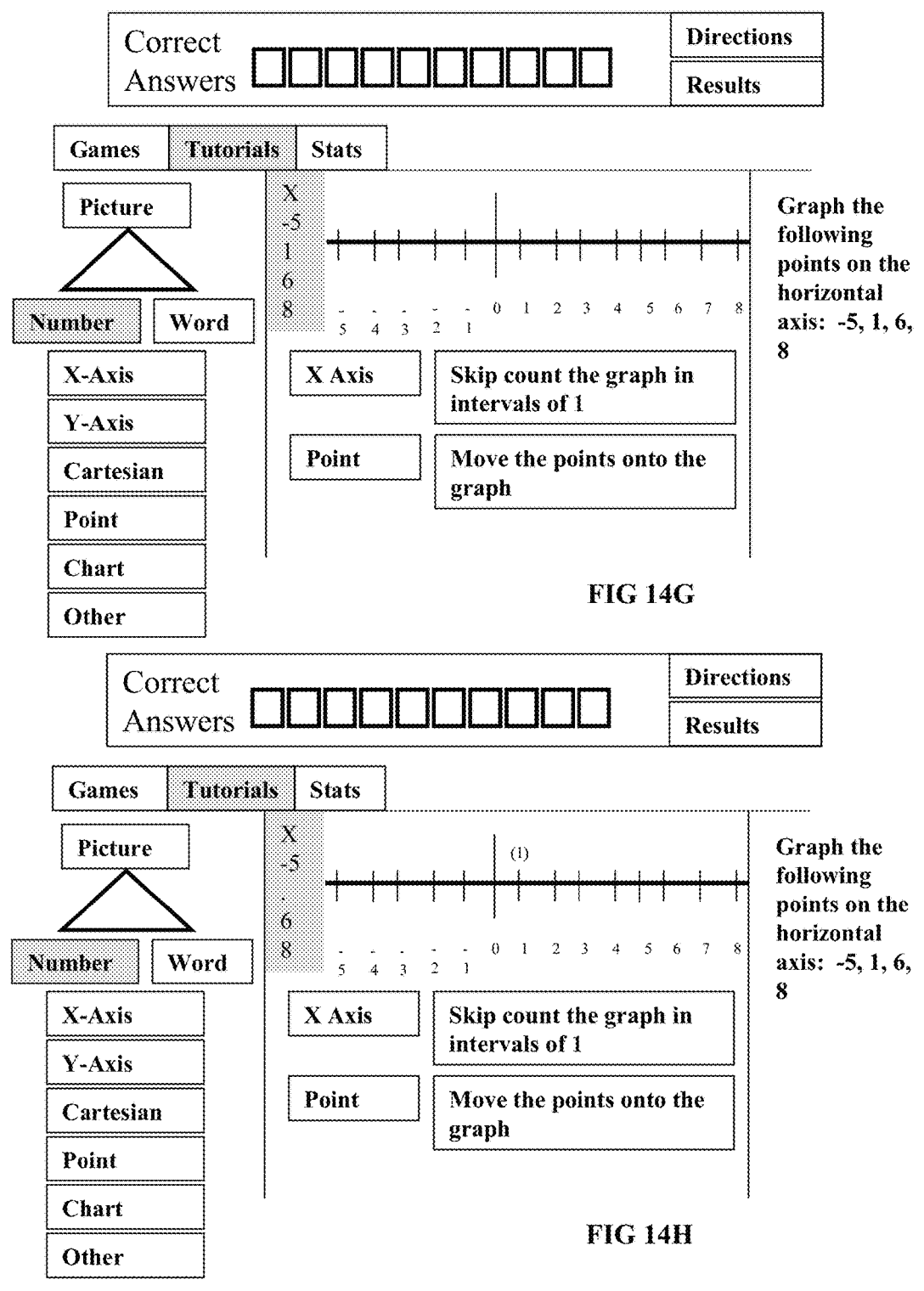

The system gives the user a chance to correct the errant blocks and then to select, drag and drop a new Point block. In this example all input boxes are label correctly on the second attempt (FIG. 14F), so the second attempt to drag and drop the Point block is successful. The point block is accepted into the work area, the error message disappears from the problem presentation area, and a message appears in the work area, telling the user to drag and drop the newly created point elements onto the graph. See FIG. 14g.

The points may be dragged and dropped in any order. In this example the point with a coordinate of one is dropped first. See FIG. 14h. The remaining elements are dropped after that, the −5 point element being dropped in the wrong place. See FIG. 14i.

In order to check to see if his or her graph is correct, the user may now select the Check box by first selecting the Number button and then selecting, dragging and dropping the Check block that appears among the other secondary-level logical reasoning buttons. Because the −5 point element was dropped in the wrong place, that point turns red, the check block fails to drop and an error message is displayed: "The points in red are wrong. Please drag them to their proper positions." See FIG. 14j.

When the user hovers over the misplaced point to move it to a new position, a message appears just below the point, giving a hint as to what might be wrong. In the case of number lines there are only a few possible errors: A point with a negative coordinate or zero being placed in a positive position, a point with a positive coordinate or zero being placed in a negative section, or a point with a negative or positive coordinate being placed on the correct side but in the wrong position.

Error messages for the first two cases are covered by the error message in this example: Check the sign of the number for this point. See FIG. 14k. In this embodiment, no error message is displayed for the third type of error, beyond the error message already displayed in the problem presentation area.

Figure 14M:
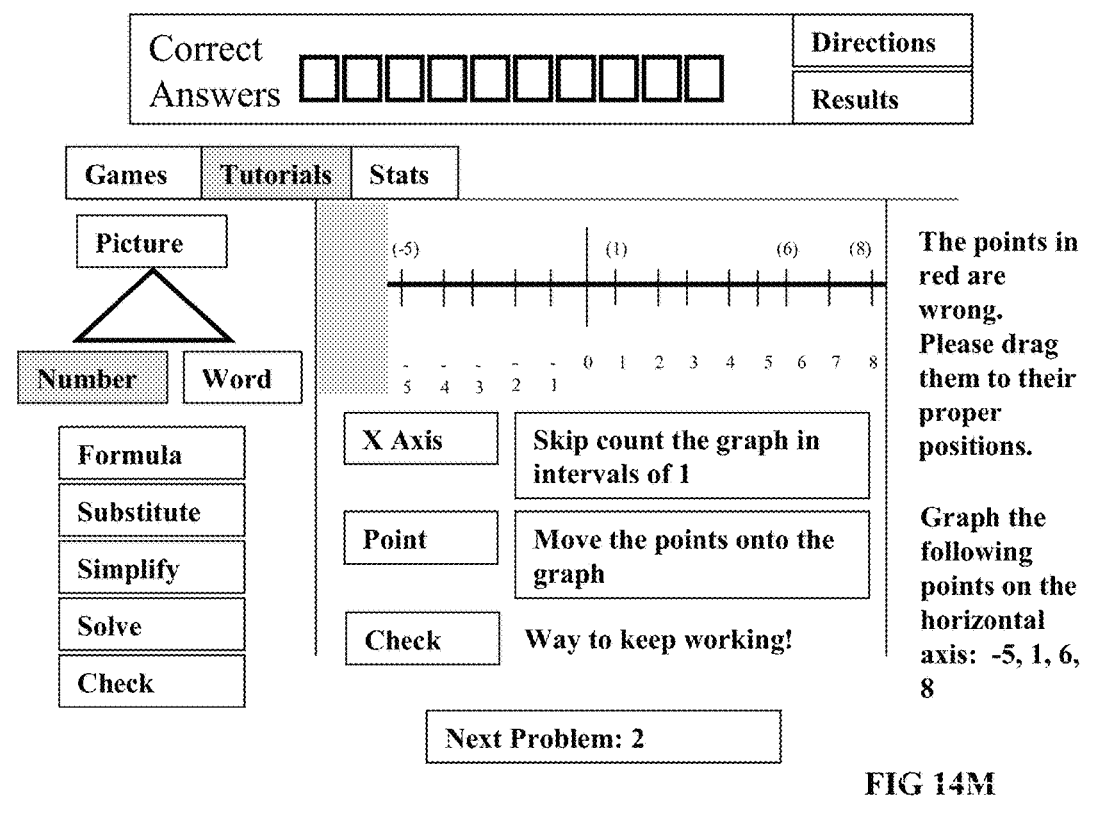

Once the user makes a second attempt at repositioning all points that were originally misplaced (FIG. 14l), then another attempt may be made to drag and drop a Check block. In this case the attempt at dropping is successful. The block is displayed in the work area and a message of Way to keep working! appears in the work area along with a next problem button. See FIG. 14m.

Like all reasoning block subsets, graphical reasoning block sets can be constructed from a variety of axiomatic, theorem-based and procedural choices, depending on the preferred embodiment and concerns with logical consistency. Regarding the choice of blocks employed to construct the secondary-level Picture blocks used in this example, the reason there are both Chart blocks and Point blocks is based on a pedagogical concern.

That concern: The mathematical reasoning of many students includes only the notion that charts are lists of coordinates. Many students fail to understand that charts also double as lists of points. Constructing a system where users are required to explicitly switch between both types of blocks, alters the reasoning students should use to complete graphing problems, which also alters the elements of understanding students take away from executing such exercises.

The next example illustrates a preferred embodiment used for a lesson in solving basic linear equations.

Example 7

This example of an embodiment begins with a lesson overlay, where the student is instructed to solve the following equations using mathematical reasoning blocks. Once the lesson overlay is dismissed, the first problem is presented in the problem presentation area: Formula . . . 3x+5=11. See FIG. 15a.

The formula presented for the first problem is primarily numeric, so the user may select the Number block. Based on this selection, the system displays five secondary-level number blocks in the block reasoning area. See FIG. 15b.

Recognizing the need to solve this equation, the user may select the Solve block. This selection causes this example of a system embodiment to display six tertiary-level reasoning blocks associated with the solution of equations: Inverses of Exponents and Roots, Inverses of Multiplication and Division, Inverses of Addition and Subtraction, Simplification, Factoring, and Quadratic Equations. See FIG. 15c.

This set of blocks represents one preferred embodiment among many possible embodiments. In general, there are three styles used in teaching students to solve elementary linear equations. One style involves using the reflexive property as a precursor to each simplification step. This results in a style where the reflexive property is always the middle of three successive steps. A second style uses one line, which is modified, then simplified to produce a third line at each stage of the equation. The third style is a hybrid of these two styles, using the first style when dealing with addition and the second style when doing multiplication.

A mathematical reasoning block system could be used to teach students to solve equations using any of these styles, but a different set of blocks would be required to accommodate each of the different styles. This example of one preferred embodiment forgoes using a reflexive property block, preferring instead the second style, which requires the explicit use of inverses.

In this example of an embodiment, the elements to which an inverse reasoning block applies should be selected before the inverse-type reasoning block is dropped into the work area. In this example of an embodiment, both the numbers' digits and their associated signs, if there are any signs, should be selected. Other embodiments may handle the situation differently.

FIG. 15d illustrates an example of a situation where the user has selected the numbers to which the inverse block applies, but not the signs. When the user then attempts to drag the Inv. Add/Subt reasoning block into the work area, an error message appears.

The user then revises the selection. First +5 is selected, then the user may left-click the Formula block to set the selection. Second 11 is selected, then the user may left-click the Formula block again to set that selection. See FIG. 15e.

Several other selection errors may also occur: The selection of the 3 and +5 or the selection of 3 and 11. All of these errors may be checked for and error messages provided by using either an explicit error array for this class of problem or by using an implicit function structured to check all of these cases for this class of problem: $ax\pm b=c$ or $mx\pm b=y$.

When the user follows these actions by then selecting, dragging and dropping the Inv. Add/Subt reasoning block into the work area, the associated text input area for the newly dropped reasoning block appears. In this example of an embodiment, the input area may be divided into four segments, two that contain portions of the original equation and two that are highlighted and are available for data entry by the user. See FIG. 15f.

The user now enters what he/she believes is the proper inverse into the highlighted areas, in this example the entries are $-5$ and $-11$. See FIG. 15g. These are incorrect entries and produce an error message when there is an attempt to drop the next reasoning block into the work area. See FIG. 15h.

The error checking to detect such an error can be implemented explicitly or implicitly or using a combination of both. Regardless of the method, it is a combinatorics problem. In this example of an embodiment, the input options for the additive inverse for $ax+b=c$ are the correct answer $[-b,-b]$ and the likely wrong answers $[-b,-c]$, $[-c,-c]$ and the catch all $[n1,n2]$, each wrong answer coupled with an appropriate error message or hint to nudge the user towards a correct second input attempt.

The user corrects the input error, changing the $-11$ to a $-5$ and then drops the next appropriate reasoning block, the simplify block in this case. See FIG. 15i. The user simplifies this expression and types in the appropriate simplified statement. See FIG. 15j.

Note that in this case the user chose to enter a large number of spaces so that the expressions in the inverse block and the expression in the simplification block remain aligned. It is possible to error-check such statements because all statements may be automatically reduced to a standard format before any comparisons are made. The strictness of this standard may vary depending on the preferred embodiment.

The user now drops the next appropriate block, which may be accepted because error checking notes the previous entry is correct. They then select the 3 and the 6 in this statement by double clicking the simplify block for each selection. See FIG. 15K. Paralleling the previous sequence for addition, the user now selects drags and drops the block for the inverse of multiplication and division. This block may be segmented into four parts, two containing slightly altered forms of the equation in the previous block and two highlighted segments for accepting the inverses for this step. See FIG. 15l.

FIGS. 15m through 15p show the remaining steps in this problem. The block placement and operation continues to follow the same pattern it did with addition. The sequence concludes with the placement of a check block, which indicates a correct answer and displays a button allowing the user to select it to move to the next problem.

The final example presented here is designed to show how the three types of mathematical reasoning blocks illustrated in prior examples—logical, text and graphical—can be combined to create a system where most standard, secondary school mathematics problems can be solved.

Example 8

In these examples of embodiments, additional mathematical reasoning block may be introduced to add addition breadth and effectiveness to a teaching system. Because many mathematical procedures are iterative, a block may be introduced that allows for work repetition. In this example of a preferred embodiment, such an example of an iterative block is called the Repeat block, and is classed as a secondary-level logical (Number) reasoning block.

Figures 16O, 16P:
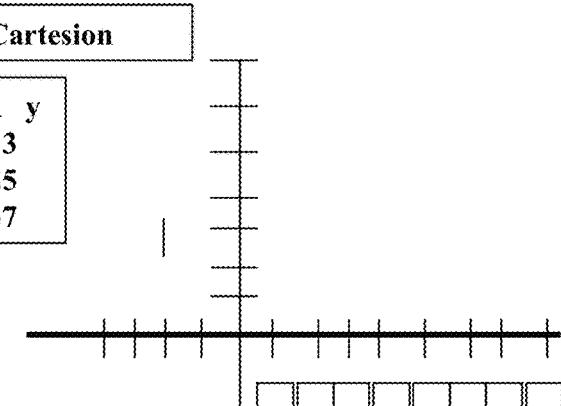
FIGS. 16A-16T are illustrations of a lesson on graphing formulas based on a preferred embodiment of this invention.

This example begins with a lesson overlay that explains what this problem set entails. When the overlay is displaced, the first problem appears. See FIG. 16a. It is primarily a word problem, requiring the selection of the base-level Word block (FIG. 16b), then the Given Form. block, which is subsequently dragged and dropped into the work area. See FIG. 16c.

The key work in this example is line, designated in the stored version of the problem by @@line@@ for the parsers to locate. The equation in the stored version of the problem is identified by @y=2x+1@, telling the system for this class of problem it is the appropriate entry for the formula block. See FIG. 16d through FIG. 16f.

Right clicking the formula block may cause the text input portion of the block to divide itself into, paralleling the action in previous examples (unless an incorrect entry has been made, in which case an error message may appear in the problem presentation area instead). One side of the text input portion continues to contain the equation just entered; the other side is highlighted and open for the entry of a subordinate equation. In most given formula problems, the value of this equation is specified. But when it is not specified, the user may make one up. In this case the user may type in x=1. See FIG. 16g.

Selecting, dragging and dropping the next block, a Substitution block (FIG. 16h), the user may then enter the equation y=2·1+1, substituting 1 in for x. See FIG. 16i. This statement may then be simplified in the manner explained in example 3 about simplification by the order of operations. See FIG. 16j.

The main difference in this example is that at the end of the three-step simplification process, rather than selecting the Check block for dragging and dropping, the user may select the base-level Picture block, which in this example causes the secondary-level picture blocks to display. See FIG. 16k. Then the user may select, drag and drop the Chart block. See FIG. 16l.

The user may then left-click the Formula block and the Add/Subt block to enter the data from this problem into the input area of the Chart block. See FIG. 16m. In this example, correctly entering data into the chart block saves that data in chart form for later use. If the user then selects the Cartesian block, a chart will appear beside it populated with any previous data the user has entered, along with a Cartesian grid for graphing.

The prime differentiating element in this example is that the user may desire to repeat this process several more times. Therefore, at this point the user may select the Repeat block. Left-clicking on the basic-level Number block brings up the secondary-level Number blocks (FIG. 16n), from which the user may select, drag and drop the Repeat block, which brings the user back to the display illustrated in FIG. 16o.

This process may be repeated several more times. At the end of the final repetition, rather than exiting the secondary-level display of picture blocks after entering the x and y elements for the chart, the user may select, drag and drop a Cartesian block. This causes the work area to change appearance (via an overlay, a hidden element or some other mechanism appropriate to the programming environment). What appears is the Cartesian block alongside an x-y chart containing the coordinates the user entered earlier a Cartesian graph ready for the entry of appropriate increments. See FIG. 16p.

Figure 16Q:
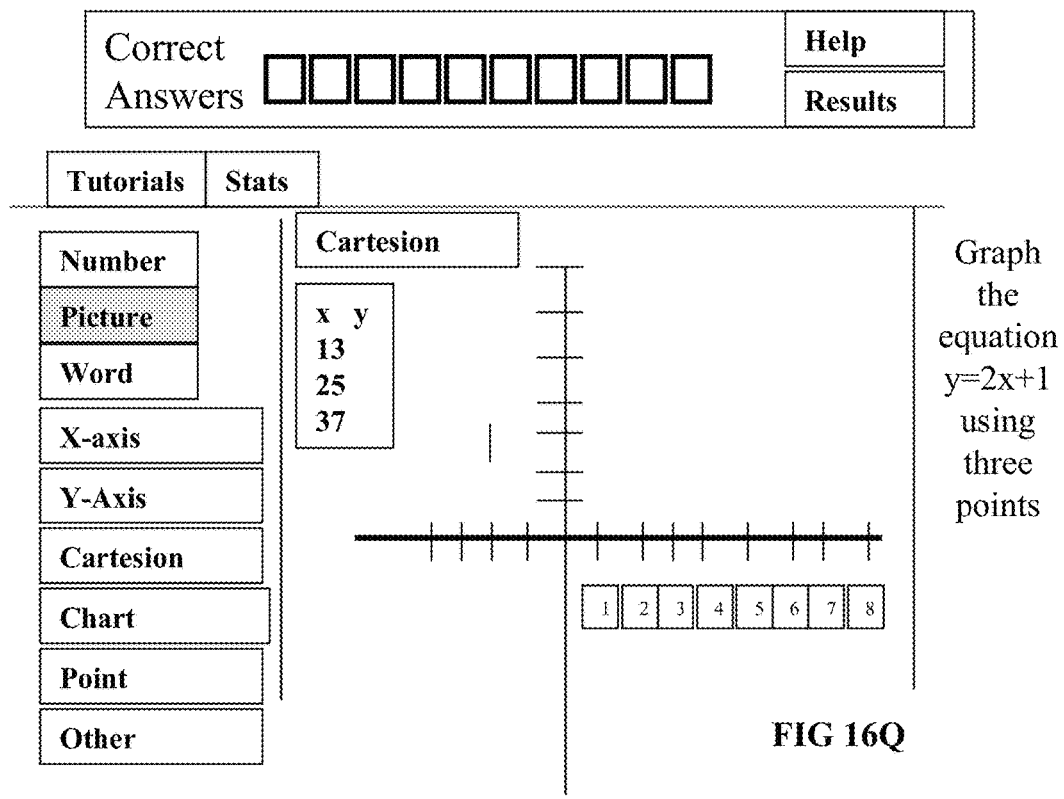
Figure 16R:
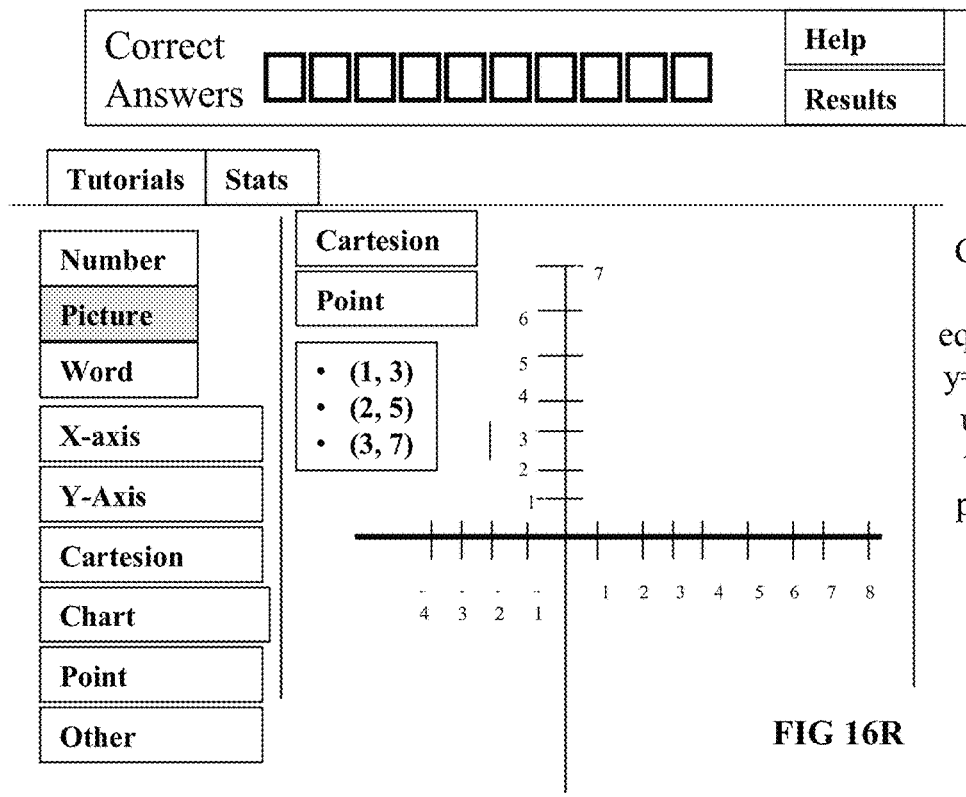

As in the previous graphing example, the user may enter the appropriate increment labels. See FIG. 16q. Then a Point block may be selected, dragged and dropped in the work area to change the coordinates in the chart to points ready for graphing. See FIG. 16r. Each of these points may then be selected, dragged and dropped onto the appropriate place on the graph. See FIG. 16s. Finally, the user may then return to secondary-level Number blocks and select, drag and drop the Check block to complete the problem. See FIG. 16t.

As Kurt Godel's Incompleteness Theorem showed, no finite set of axioms, theorems, procedures or rules (represented by mathematical reasoning blocks in this environment) can handle every mathematical question that can be posed. However, as these examples of possible embodiments illustrate, that does not preclude the possibility that small sets of blocks, when thoughtfully selected, can be used to deal with a large number of useful problems. That, in the end, is the beauty of all useful mathematical systems: A small number of predetermined rules can produce/handle surprising degrees of complexity in novel and unexpected ways.

Given this final example, a person can begin to imagine students who quickly become highly proficient at a small number of skills using mathematical reasoning blocks. More importantly, once they have mastered those basic skills and mathematical models, they may then use those skills to answer any number of high-level, exploratory problems—providing a much needed balance between traditional and constructivist approaches to teaching mathematics.

CONCLUSION

Although the present invention has been described in considerable detail with reference to certain preferred versions thereof, other versions are possible. Therefore, the spirit and scope of the appended claims should not be limited to the description of the preferred versions contained therein. All features disclosed in this specification (including any accompanying claims, abstract, and drawings) may be replaced by alternative features serving the same, equivalent or similar purpose, unless expressly stated otherwise. Unless expressly stated otherwise, each feature disclosed is one example only of a generic series of equivalent or similar features.

Some embodiments can be in the form of methods and apparatuses for practicing those methods. Some embodiments can be in the form of program code encoded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing a corresponding method. Some embodiments can be in the form of program code, for example, stored in a non-transitory machine-readable storage medium including being loaded into and/or executed by a machine, wherein, when the program code is loaded into and executed by a machine, such as a computer, the machine becomes an apparatus for practicing a corresponding method. When implemented on a general-purpose processor, the program code segments combine with the processor to provide a unique device that operates analogously to specific logic circuits.

The invention claimed is:

1. Apparatus for displaying sequences of problem steps corresponding to solutions to math problems for teaching each user in a group of one or more users rules for solving the math problems in a lesson comprising multiple different math problems, the apparatus comprising:
   a visual display;
   a problem presentation unit configured to sequentially present math problems on the visual display to the user, wherein a correct solution for each math problem involves performance of a sequence of problem steps;
   one or more reasoning block units, each configured to present a sequence of reasoning blocks on the visual display for a presented math problem, wherein:
      each problem step in a math problem corresponds to a math sub-skill;
      each math problem involves multiple different math sub-skills;
      each reasoning block in the sequence corresponds to a different problem step in the solution for the presented math problem;
      each reasoning block unit is configured to (i) detect an incorrect user input for the math sub-skill associated with a reasoning block, (ii) determine a reason the user made the incorrect user input, and (iii) provide a mistake-specific prompt based on the determined reason for the incorrect user input;
      each reasoning block is configured to display on the visual display (i) an icon selected by the user from a plurality of corresponding available icons representing the rules for solving the math problems and (ii) an entry made by the user;
      each corresponding available icon on the visual display represents a type of problem step in solving math problems; and
      correct completion of the presented reasoning block by the user requires (i) the user to select a correct icon on the visual display for a current problem step and (ii) the user to make a correct entry for the current problem step into the presented reasoning block on the visual display; and
   an error unit configured to (i) detect whether the user made an error in either an icon selection on the visual display or an entry on the visual display and (ii) render an indication on the visual display indicating to the user whether or not an error was detected, wherein the apparatus implements a set of rules for solving math problems by the user as follows:
      for each presented math problem, the apparatus (i) requires the user to try to correctly complete the current reasoning block by making the correct entry for the current problem step into the current reasoning block on the visual display and (ii) requires correct completion of the current reasoning block on the visual display before presenting a next reasoning block on the visual display;
      for each reasoning block, the apparatus (i) requires the user to try to select the correct icon for the current problem step on the visual display and (ii) requires selection of the correct icon for the current problem step on the visual display before enabling the user to make an entry for the current problem step into the reasoning block on the visual display;
      the error unit (i) keeps track of an error rate made by each user in the group for each of multiple different math sub-skills over the multiple different math problems of the lesson, each problem involving a plurality of different math sub-skills and (ii) generates statistics that characterize the user's relative performance for each of the multiple different math sub-skills for presentation immediately after the lesson is completed;
      if the user selects the correct icon on the visual display for the current problem step, then the apparatus displays the correct icon in the reasoning block on the visual display for the current problem step;
      if the user selects an incorrect icon on the visual display for the current problem step, then the apparatus indicates to the user that the icon for the current problem step on the visual display selected by the user was incorrect;
      if the user makes a correct entry on the visual display for the current problem step, then the apparatus displays the correct entry in the reasoning block on the visual display for the current problem step and allows the user to proceed to the next problem step;
      if the user makes an incorrect entry for the current problem step on the visual display, then the apparatus prevents the user from proceeding to the next problem step;
      after the user makes one or more incorrect entries on the visual display for the current problem step without making the correct entry for the current problem step on the visual display, then the apparatus provides the correct entry for the current problem step on the visual display to the user;
      the apparatus prevents the user from selecting an icon on the visual display for the next reasoning block for the next problem step before the current problem step is correctly completed on the visual display;
      the apparatus prevents the user from making an entry into the current reasoning block on the visual display for the current problem step before the correct icon on the visual display is selected for the current problem step; and
   the one or more reasoning block units comprise:
      a numeric reasoning block unit configured to present a sequence of numeric reasoning blocks on the visual display for a presented free-form algebra math problem, wherein:
         each numeric reasoning block is configured to display (i) a numeric icon selected by the user from a plurality of available numeric icons and (ii) an alpha-numeric-symbolic entry made by the user; and
         each available numeric icon is an axiom, theorem, or procedural process for algebraic manipulation of a non-verbal mathematical expression in free-form algebra math problems;
      a text reasoning block unit configured to present a sequence of text reasoning blocks on the visual display for a presented word math problem, wherein:
         each text reasoning block is configured to display (i) a text icon selected by the user from a plurality of available text icons and (ii) a text entry made by the user; and
         each available text icon is an axiom or definition for classification of a verbal mathematical expression in word math problems; and
      a graphical reasoning block unit configured to present a sequence of graphical reasoning blocks on the visual display for a presented coordinate or non-coordinate geometry math problem, wherein:
    each graphical reasoning block is configured to display (i) a graphical icon selected by the user from a plurality of available graphical icons and (ii) a graphical entry made by the user; and
    each available graphical icon is an axiom, theorem, definition, or procedural concept for working with a graphical representation in geometry math problems.

2. The apparatus of claim 1, wherein the apparatus is configured to require the correct solution of the presented math problem before presenting a next math problem.

3. The apparatus of claim 1, wherein the apparatus is configured to automatically indicate the correct icon on the visual display after the user selects an incorrect icon for the current reasoning block a specified number of times.

4. The apparatus of claim 3, the apparatus is configured to require the user to select the correct icon for the current reasoning block after the apparatus automatically indicates the correct icon on the visual display.

5. The apparatus of claim 1, wherein the apparatus is configured to automatically make a correct entry for the current reasoning block, (i) after the selection of the correct icon for the current reasoning block and (ii) after the user subsequently makes a specified number of incorrect entries for the current reasoning block.

6. The apparatus of claim 1, wherein, for the current reasoning block, the apparatus is configured to (i) simultaneously display the plurality of corresponding available icons and (ii) enable the user to select one of the displayed corresponding available icons for the current reasoning block.

7. The apparatus of claim 6, wherein the apparatus is configured to (i) simultaneously display the plurality of corresponding available icons in a region of the visual display outside of the current reasoning block and (ii) enable the user to select one of the displayed corresponding available icons for the current reasoning block by dragging and dropping the selected icon into the current reasoning block.

8. The apparatus of claim 1, wherein, for at least one reasoning block of at least one presented math problem, the apparatus is configured to enable the user to make the entry for the reasoning block by typing a sequence of alpha-numeric-symbolic characters into the reasoning block.

9. The apparatus of claim 1, wherein, for at least one reasoning block of at least one presented math problem, the apparatus is configured to enable the user to make the entry for the reasoning block by dragging a graphical element from one location within the reasoning block to another location within the reasoning block.

10. The apparatus of claim 1, wherein, for at least one presented math problem, the apparatus is configured to enable the user to make the entry for a current reasoning block by selecting a portion of either (i) the entry for a previous reasoning block or (ii) the presented math problem.

11. The apparatus of claim 10, wherein the apparatus is configured to enable the user to select the portion by highlighting the portion using a computer mouse.

12. The apparatus of claim 1, further comprising an instructional video unit configured to display, for a presented math problem, a video demonstrating a correct solution of the presented math problem.

13. The apparatus of claim 1, wherein the error unit is configured to generate, store, and present statistics corresponding to the user's performance in solving the presented math problems.

14. The apparatus of claim 1, wherein, for a presented math problem, the apparatus is configured to simultaneously display a current reasoning block and each previous reasoning block.

15. The apparatus of claim 14, wherein, for the presented math problem, the apparatus is configured to (i) simultaneously display the one or more previous reasoning blocks and the current reasoning block in a stack of reasoning blocks arranged from oldest to newest and (ii) append a next reasoning block to the end of the stack upon correct completion of the current reasoning block.

16. The apparatus of claim 1, wherein the apparatus is configured to (i) enable the user to select a math problem type for a next math problem and (ii) generate and present the next math problem corresponding to the selected math problem type.

17. The apparatus of claim 1, wherein the apparatus is configured to generate the sequentially presented math problems based on a specified difficulty level corresponding to at least one of (i) a number of reasoning blocks for a presented math problem and (ii) types of reasoning blocks for the presented math problem.

18. The apparatus of claim 1, wherein the error unit is configured to keep track of multiple, different types of math errors made by the user.

19. The apparatus of claim 1, wherein:
    the apparatus is configured to require the correct solution of the presented math problem before presenting a next math problem;
    the apparatus is configured to automatically indicate the correct icon on the visual display after the user selects an incorrect icon for the current reasoning block a specified number of times;
    the apparatus is configured to require the user to select the correct icon for the current reasoning block after the apparatus automatically indicates the correct icon on the visual display;
    the apparatus is configured to automatically make a correct entry for the current reasoning block, (i) after the selection of the correct icon for the current reasoning block and (ii) after the user subsequently makes a specified number of incorrect entries for the current reasoning block;
    the one or more reasoning block units comprise:
        a numeric reasoning block unit configured to present a sequence of numeric reasoning blocks on the visual display for a presented free-form algebra math problem, wherein:
            each numeric reasoning block is configured to display (i) a numeric icon selected by the user from a plurality of available numeric icons and (ii) an alpha-numeric-symbolic entry made by the user; and
            each available numeric icon is an axiom, theorem, or procedural process for algebraic manipulation of a non-verbal mathematical expression in free-form algebra math problems;
        a text reasoning block unit configured to present a sequence of text reasoning blocks on the visual display for a presented word math problem, wherein:
            each text reasoning block is configured to display (i) a text icon selected by the user from a plurality of available text icons and (ii) a text entry made by the user; and
            each available text icon is an axiom or definition for classification of a verbal mathematical expression in word math problems; and a graphical reasoning block unit configured to present a sequence of graphical reasoning blocks on the visual display for a presented coordinate or non-coordinate geometry math problem, wherein:
   each graphical reasoning block is configured to display (i) a graphical icon selected by the user from a plurality of available graphical icons and (ii) a graphical entry made by the user; and
   each available graphical icon is an axiom, theorem, definition, or procedural concept for working with a graphical representation in geometry math problems;
for the current reasoning block, the apparatus is configured to (i) simultaneously display the plurality of corresponding available icons in a region of the visual display outside of the current reasoning block and (ii) enable the user to select one of the displayed corresponding available icons for the current reasoning block by dragging and dropping the selected icon into the current reasoning block;
for at least one reasoning block of at least one presented math problem, the apparatus is configured to enable the user to make the entry for the reasoning block by typing a sequence of alpha-numeric-symbolic characters into the reasoning block;
for at least one reasoning block of at least one presented math problem, the apparatus is configured to enable the user to make the entry for the reasoning block by dragging a graphical element from one location within the reasoning block to another location within the reasoning block;
for at least one presented math problem, the apparatus is configured to enable the user to make the entry for a current reasoning block by selecting a portion of either (i) the entry for a previous reasoning block or (ii) the presented math problem by highlighting the portion using a computer mouse;
the apparatus further comprises an instructional video unit configured to display, for a presented math problem, a video demonstrating a correct solution of the presented math problem;
the error unit is configured to generate, store, and present statistics corresponding to the user's performance in solving the presented math problems;
for a presented math problem, the apparatus is configured to (i) simultaneously display the one or more previous reasoning blocks and the current reasoning block in a stack of reasoning blocks arranged from oldest to newest and (ii) append a next reasoning block to the end of the stack upon correct completion of the current reasoning block;
the apparatus is configured to (i) enable the user to select a math problem type for a next math problem and (ii) generate and present the next math problem corresponding to the selected math problem type;
the apparatus is configured to generate the sequentially presented math problems based on a specified difficulty level corresponding to at least one of (i) a number of reasoning blocks for a presented math problem and (ii) types of reasoning blocks for the presented math problem; and
the error unit is configured to keep track of multiple, different types of math errors made by the user.

20. A method for displaying sequences of problem steps corresponding to solutions to math problems for teaching each user in a group of one or more users rules for solving the math problems in a lesson comprising multiple different math problems, using an apparatus comprising a visual display, the method comprising:
   the apparatus sequentially presenting math problems on the visual display to a user, wherein a correct solution for each math problem involves performance of a sequence of problem steps displayed on the visual display; and
   for each presented math problem on the visual display:
      the apparatus presenting a sequence of reasoning blocks on the visual display, wherein:
         each reasoning block in the sequence corresponds to a different problem step in the solution for the presented math problem;
         the apparatus comprises a reasoning block unit that (i) detects an incorrect user input for the math sub-skill associated with a reasoning block, (ii) determines a reason the user made the incorrect user input, and (iii) provides a mistake-specific prompt based on the determined reason for the incorrect user input;
         each reasoning block is configured to display on the visual display (i) an icon selected by the user from a plurality of corresponding available icons representing the rules for solving the math problems and (ii) an entry made by the user;
         correct completion by the user of the presented reasoning block requires (i) the user to select a correct icon on the visual display for a current problem step and (ii) the user to make a correct entry for the current problem step into the presented reasoning block on the visual display; and
         each corresponding available icon on the visual display represents a type of problem step in solving math problems; and
      the apparatus detecting whether the user made an error in either an icon selection on the visual display or an entry on the visual display;
      the apparatus rendering an indication on the visual display indicating to the user whether or not an error was detected, wherein:
         each problem step in a math problem corresponds to a math sub-skill; and
         each math problem involves multiple different math sub-skills; and
      the apparatus implements a set of rules for solving math problems by the user as follows:
         for each presented math problem on the visual display, the apparatus (i) requires the user to try to correctly complete the current reasoning block on the visual display by making the correct entry for the current problem step into the current reasoning block on the visual display and (ii) requires correct completion of the current reasoning block on the visual display before presenting a next reasoning block on the visual display;
         for each reasoning block on the visual display, the apparatus (i) requires the user to try to select the correct icon for the current problem step on the visual display and (ii) requires selection of the correct icon for the current problem step on the visual display before enabling the user to make an entry for the current problem step into the reasoning block on the visual display;
         the error unit (i) keeps track of an error rate made by each user in the group for each of multiple different math sub-skills over the multiple different math problems of the lesson, each problem involving a plurality of different math sub-skills and (ii) generates statistics that characterize the user's relative performance for each of the multiple different math sub-skills for presentation immediately after the lesson is completed;

if the user selects the correct icon on the visual display for the current problem step, then the apparatus displays the correct icon in the reasoning block on the visual display for the current problem step;

if the user selects an incorrect icon on the visual display for the current problem step, then the apparatus indicates to the user that the icon for the current problem step on the visual display selected by the user was incorrect;

if the user makes a correct entry on the visual display for the current problem step, then the apparatus displays the correct entry in the reasoning block on the visual display for the current problem step and allows the user to proceed to the next problem step;

if the user makes an incorrect entry for the current problem step on the visual display, then the apparatus prevents the user from proceeding to the next problem step;

after the user makes one or more incorrect entries on the visual display for the current problem step without making the correct entry for the current problem step on the visual display, then the apparatus provides the correct entry for the current problem step on the visual display to the user;

the apparatus prevents the user from selecting an icon on the visual display for the next reasoning block for the next problem step before the current problem step is correctly completed on the visual display;

the apparatus prevents the user from making an entry into the current reasoning block on the visual display for the current problem step before the correct icon on the visual display is selected for the current problem step; and the one or more reasoning block units comprise:
a numeric reasoning block unit configured to present a sequence of numeric reasoning blocks on the visual display for a presented free-form algebra math problem, wherein:
each numeric reasoning block is configured to display (i) a numeric icon selected by the user from a plurality of available numeric icons and (ii) an alpha-numeric-symbolic entry made by the user; and
each available numeric icon is an axiom, theorem, or procedural process for algebraic manipulation of a non-verbal mathematical expression in free-form algebra math problems;
a text reasoning block unit configured to present a sequence of text reasoning blocks on the visual display for a presented word math problem, wherein:
each text reasoning block is configured to display (i) a text icon selected by the user from a plurality of available text icons and (ii) a text entry made by the user; and
each available text icon is an axiom or definition for classification of a verbal mathematical expression in word math problems; and
a graphical reasoning block unit configured to present a sequence of graphical reasoning blocks on the visual display for a presented coordinate or non-coordinate geometry math problem, wherein:
each graphical reasoning block is configured to display (i) a graphical icon selected by the user from a plurality of available graphical icons and (ii) a graphical entry made by the user; and
each available graphical icon is an axiom, theorem, definition, or procedural concept for working with a graphical representation in geometry math problems.

21. The method of claim 20, wherein:
the apparatus requires the correct solution of the presented math problem before presenting a next math problem;
the apparatus automatically indicates the correct icon on the visual display after the user selects an incorrect icon for the current reasoning block a specified number of times;
the apparatus requires the user to select the correct icon for the current reasoning block after the apparatus automatically indicates the correct icon on the visual display;
the apparatus automatically makes a correct entry for the current reasoning block, (i) after the selection of the correct icon for the current reasoning block and (ii) after the user subsequently makes a specified number of incorrect entries for the current reasoning block;
the one or more reasoning block units comprise:
a numeric reasoning block unit that presents a sequence of numeric reasoning blocks on the visual display for a presented free-form algebra math problem, wherein:
each numeric reasoning block displays (i) a numeric icon selected by the user from a plurality of available numeric icons and (ii) an alpha-numeric-symbolic entry made by the user; and
each available numeric icon is an axiom, theorem, or procedural process for algebraic manipulation of a non-verbal mathematical expression in free-form algebra math problems;
a text reasoning block unit that presents a sequence of text reasoning blocks on the visual display for a presented word math problem, wherein:
each text reasoning block displays (i) a text icon selected by the user from a plurality of available text icons and (ii) a text entry made by the user; and
each available text icon is an axiom or definition for classification of a verbal mathematical expression in word math problems; and
a graphical reasoning block unit that presents a sequence of graphical reasoning blocks on the visual display for a presented coordinate or non-coordinate geometry math problem, wherein:
each graphical reasoning block displays (i) a graphical icon selected by the user from a plurality of available graphical icons and (ii) a graphical entry made by the user; and
each available graphical icon is an axiom, theorem, definition, or procedural concept for working with a graphical representation in geometry math problems;
for the current reasoning block, the apparatus (i) simultaneously displays the plurality of corresponding available icons in a region of the visual display outside of the current reasoning block and (ii) enables the user to select one of the displayed corresponding available icons for the current reasoning block by dragging and dropping the selected icon into the current reasoning block;

for at least one reasoning block of at least one presented math problem, the apparatus enables the user to make the entry for the reasoning block by typing a sequence of alpha-numeric-symbolic characters into the reasoning block;

for at least one reasoning block of at least one presented math problem, the apparatus enables the user to make the entry for the reasoning block by dragging a graphical element from one location within the reasoning block to another location within the reasoning block;

for at least one presented math problem, the apparatus enables the user to make the entry for a current reasoning block by selecting a portion of either (i) the entry for a previous reasoning block or (ii) the presented math problem by highlighting the portion using a computer mouse;

the apparatus further comprises an instructional video unit that displays, for a presented math problem, a video demonstrating a correct solution of the presented math problem;

the error unit generates, stores, and presents statistics corresponding to the user's performance in solving the presented math problems;

for a presented math problem, the apparatus (i) simultaneously displays the one or more previous reasoning blocks and the current reasoning block in a stack of reasoning blocks arranged from oldest to newest and (ii) appends a next reasoning block to the end of the stack upon correct completion of the current reasoning block;

the apparatus (i) enables the user to select a math problem type for a next math problem and (ii) generates and presents the next math problem corresponding to the selected math problem type;

the apparatus generates the sequentially presented math problems based on a specified difficulty level corresponding to at least one of (i) a number of reasoning blocks for a presented math problem and (ii) types of reasoning blocks for the presented math problem; and the error unit keeps track of multiple, different types of math errors made by the user.

22. A non-transitory machine-readable medium, having encoded thereon program code, wherein, when the program code is executed by an apparatus for displaying sequences of problem steps corresponding to solutions to math problems for teaching each user in a group of one or more users rules for solving the math problems in a lesson comprising multiple different math problems, the apparatus implements an apparatus-based method comprising:

the apparatus sequentially presenting math problems on the visual display to a user, wherein a correct solution for each math problem involves performance of a sequence of problem steps displayed on the visual display; and for each presented math problem on the visual display:
the apparatus presenting a sequence of reasoning blocks on the visual display, wherein:
each reasoning block in the sequence corresponds to a different problem step in the solution for the presented math problem;
the apparatus comprises a reasoning block unit that (i) detects an incorrect user input for the math sub-skill associated with a reasoning block, (ii) determines a reason the user made the incorrect user input, and (iii) provides a mistake-specific prompt based on the determined reason for the incorrect user input;
each reasoning block is configured to display on the visual display (i) an icon selected by the user from a plurality of corresponding available icons representing the rules for solving the math problems and (ii) an entry made by the user;
correct completion by the user of the presented reasoning block requires (i) the user to select a correct icon on the visual display for a current problem step and (ii) the user to make a correct entry for the current problem step into the presented reasoning block on the visual display; and
each corresponding available icon on the visual display represents a type of problem step in solving math problems; and
the apparatus detecting whether the user made an error in either an icon selection on the visual display or an entry on the visual display;
the apparatus rendering an indication on the visual display indicating to the user whether or not an error was detected, wherein:
each problem step in a math problem corresponds to a math sub-skill; and
each math problem involves multiple different math sub-skills; and
the apparatus implements a set of rules for solving math problems by the user as follows:
for each presented math problem on the visual display, the apparatus (i) requires the user to try to correctly complete the current reasoning block on the visual display by making the correct entry for the current problem step into the current reasoning block on the visual display and (ii) requires correct completion of the current reasoning block on the visual display before presenting a next reasoning block on the visual display;
for each reasoning block on the visual display, the apparatus (i) requires the user to try to select the correct icon for the current problem step on the visual display and (ii) requires selection of the correct icon for the current problem step on the visual display before enabling the user to make an entry for the current problem step into the reasoning block on the visual display;
the error unit (i) keeps track of an error rate made by each user in the group for each of multiple different math sub-skills over the multiple different math problems of the lesson, each problem involving a plurality of different math sub-skills and (ii) generates statistics that characterize the user's relative performance for each of the multiple different math sub-skills for presentation immediately after the lesson is completed;
if the user selects the correct icon on the visual display for the current problem step, then the apparatus displays the correct icon in the reasoning block on the visual display for the current problem step;
if the user selects an incorrect icon on the visual display for the current problem step, then the apparatus indicates to the user that the icon for the current problem step on the visual display selected by the user was incorrect;

if the user makes a correct entry on the visual display for the current problem step, then the apparatus displays the correct entry in the reasoning block on the visual display for the current problem step and allows the user to proceed to the next problem step;

if the user makes an incorrect entry for the current problem step on the visual display, then the apparatus prevents the user from proceeding to the next problem step;

after the user makes one or more incorrect entries on the visual display for the current problem step without making the correct entry for the current problem step on the visual display, then the apparatus provides the correct entry for the current problem step on the visual display to the user;

the apparatus prevents the user from selecting an icon on the visual display for the next reasoning block for the next problem step before the current problem step is correctly completed on the visual display;

the apparatus prevents the user from making an entry into the current reasoning block on the visual display for the current problem step before the correct icon on the visual display is selected for the current problem step; and the one or more reasoning block units comprise:
a numeric reasoning block unit configured to present a sequence of numeric reasoning blocks on the visual display for a presented free-form algebra math problem, wherein:
each numeric reasoning block is configured to display (i) a numeric icon selected by the user from a plurality of available numeric icons and (ii) an alpha-numeric-symbolic entry made by the user; and
each available numeric icon is an axiom, theorem, or procedural process for algebraic manipulation of a non-verbal mathematical expression in free-form algebra math problems;
a text reasoning block unit configured to present a sequence of text reasoning blocks on the visual display for a presented word math problem, wherein:
each text reasoning block is configured to display (i) a text icon selected by the user from a plurality of available text icons and (ii) a text entry made by the user; and
each available text icon is an axiom or definition for classification of a verbal mathematical expression in word math problems; and
a graphical reasoning block unit configured to present a sequence of graphical reasoning blocks on the visual display for a presented coordinate or non-coordinate geometry math problem, wherein:
each graphical reasoning block is configured to display (i) a graphical icon selected by the user from a plurality of available graphical icons and (ii) a graphical entry made by the user; and
each available graphical icon is an axiom, theorem, definition, or procedural concept for working with a graphical representation in geometry math problems.

23. The medium of claim 22, wherein:
the apparatus requires the correct solution of the presented math problem before presenting a next math problem;

the apparatus automatically indicates the correct icon on the visual display after the user selects an incorrect icon for the current reasoning block a specified number of times;

the apparatus requires the user to select the correct icon for the current reasoning block after the apparatus automatically indicates the correct icon on the visual display;

the apparatus automatically makes a correct entry for the current reasoning block, (i) after the selection of the correct icon for the current reasoning block and (ii) after the user subsequently makes a specified number of incorrect entries for the current reasoning block;

the one or more reasoning block units comprise:
a numeric reasoning block unit that presents a sequence of numeric reasoning blocks on the visual display for a presented free-form algebra math problem, wherein:
each numeric reasoning block displays (i) a numeric icon selected by the user from a plurality of available numeric icons and (ii) an alpha-numeric-symbolic entry made by the user; and
each available numeric icon is an axiom, theorem, or procedural process for algebraic manipulation of a non-verbal mathematical expression in free-form algebra math problems;
a text reasoning block unit that presents a sequence of text reasoning blocks on the visual display for a presented word math problem, wherein:
each text reasoning block displays (i) a text icon selected by the user from a plurality of available text icons and (ii) a text entry made by the user; and
each available text icon is an axiom or definition for classification of a verbal mathematical expression in word math problems; and
a graphical reasoning block unit that presents a sequence of graphical reasoning blocks on the visual display for a presented coordinate or non-coordinate geometry math problem, wherein:
each graphical reasoning block displays (i) a graphical icon selected by the user from a plurality of available graphical icons and (ii) a graphical entry made by the user; and
each available graphical icon is an axiom, theorem, definition, or procedural concept for working with a graphical representation in geometry math problems;

for the current reasoning block, the apparatus (i) simultaneously displays the plurality of corresponding available icons in a region of the visual display outside of the current reasoning block and (ii) enables the user to select one of the displayed corresponding available icons for the current reasoning block by dragging and dropping the selected icon into the current reasoning block;

for at least one reasoning block of at least one presented math problem, the apparatus enables the user to make the entry for the reasoning block by typing a sequence of alpha-numeric-symbolic characters into the reasoning block;

for at least one reasoning block of at least one presented math problem, the apparatus enables the user to make the entry for the reasoning block by dragging a graphical element from one location within the reasoning block to another location within the reasoning block;

for at least one presented math problem, the apparatus enables the user to make the entry for a current reasoning block by selecting a portion of either (i) the entry for a previous reasoning block or (ii) the presented math problem by highlighting the portion using a computer mouse;

the apparatus further comprises an instructional video unit that displays, for a presented math problem, a video demonstrating a correct solution of the presented math problem;

the error unit generates, stores, and presents statistics corresponding to the user's performance in solving the presented math problems;

for a presented math problem, the apparatus (i) simultaneously displays the one or more previous reasoning blocks and the current reasoning block in a stack of reasoning blocks arranged from oldest to newest and (ii) appends a next reasoning block to the end of the stack upon correct completion of the current reasoning block;

the apparatus (i) enables the user to select a math problem type for a next math problem and (ii) generates and presents the next math problem corresponding to the selected math problem type;

the apparatus generates the sequentially presented math problems based on a specified difficulty level corresponding to at least one of (i) a number of reasoning blocks for a presented math problem and (ii) types of reasoning blocks for the presented math problem; and the error unit keeps track of multiple, different types of math errors made by the user.

24. The apparatus of claim 1, wherein the error unit is configured to (i) keep track of the error rates for at least 13 different math sub-skills for each user in the group over the multiple different math problems of the lesson, each problem involving a plurality of different math sub-skills and (ii) generate the statistics that characterize each user's relative performance for each of the at least 13 different math sub-skills for presentation immediately after the lesson is completed.

25. The apparatus of claim 24, wherein:
the lesson comprises multiple different math problems for each student in a classroom of students; and
the error unit is configured to (i) keep track of an error rate made by each student in the classroom for each of the at least 13 different math sub-skills over the multiple different math problems of the lesson, each problem involving a plurality of different math sub-skills and (ii) generate statistics that characterize the relative performance of each student in the classroom for each of the at least 13 different math sub-skills for presentation immediately after the lesson is completed.

26. The method of claim 20, wherein the error unit (i) keeps track of the error rates for at least 13 different math sub-skills for each user in the group over the multiple different math problems of the lesson, each problem involving a plurality of different math sub-skills and (ii) generates the statistics that characterize each user's relative performance for each of the at least 13 different math sub-skills for presentation immediately after the lesson is completed.

27. The method of claim 26, wherein:
the lesson comprises multiple different math problems for each student in a classroom of students; and
the error unit (i) keeps track of an error rate made by each student in the classroom for each of the at least 13 different math sub-skills over the multiple different math problems of the lesson, each problem involving a plurality of different math sub-skills and (ii) generates statistics that characterize the relative performance of each student in the classroom for each of the at least 13 different math sub-skills for presentation immediately after the lesson is completed.

28. The medium of claim 22, wherein the error unit is configured to (i) keep track of the error rates for at least 13 different math sub-skills for each user in the group over the multiple different math problems of the lesson, each problem involving a plurality of different math sub-skills and (ii) generate the statistics that characterize each user's relative performance for each of the at least 13 different math sub-skills for presentation immediately after the lesson is completed.

29. The medium of claim 28, wherein:
the lesson comprises multiple different math problems for each student in a classroom of students; and
the error unit (i) keeps track of an error rate made by each student in the classroom for each of the at least 13 different math sub-skills over the multiple different math problems of the lesson, each problem involving a plurality of different math sub-skills and (ii) generates statistics that characterize the relative performance of each student in the classroom for each of the at least 13 different math sub-skills for presentation immediately after the lesson is completed.

* * * * *